(12) United States Patent
Digonnet et al.

(10) Patent No.: US 8,797,540 B2
(45) Date of Patent: Aug. 5, 2014

(54) SLOW-LIGHT FIBER BRAGG GRATING SENSOR

(75) Inventors: Michel J. F. Digonnet, Palo Alto, CA (US); Shanhui Fan, Stanford, CA (US); He Wen, Menlo Park, CA (US); Matthew Terrel, Los Altos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 368 days.

(21) Appl. No.: 13/224,985

(22) Filed: Sep. 2, 2011

(65) Prior Publication Data

US 2012/0086934 A1      Apr. 12, 2012

Related U.S. Application Data

(60) Provisional application No. 61/381,032, filed on Sep. 8, 2010.

(51) Int. Cl.
*G01B 9/02*      (2006.01)

(52) U.S. Cl.
USPC ............................................ 356/477; 356/32

(58) Field of Classification Search
USPC .................................... 356/32, 477, 478, 480
See application file for complete search history.

(56) References Cited

U.S. PATENT DOCUMENTS

| | | |
|---|---|---|
| 3,102,953 A | 9/1963 | Wallace |
| 4,273,445 A | 6/1981 | Thompson et al. |
| 5,363,192 A | 11/1994 | Diels et al. |
| 6,163,632 A | 12/2000 | Rickman et al. |
| 6,246,048 B1 | 6/2001 | Ramos et al. |
| 6,466,364 B1 | 10/2002 | Vakoc et al. |
| 6,917,431 B2 | 7/2005 | Soljacic et al. |
| 7,116,864 B2 | 10/2006 | Yanik et al. |
| 7,268,884 B2 | 9/2007 | Kringlebotn et al. |

(Continued)

FOREIGN PATENT DOCUMENTS

| | | |
|---|---|---|
| DE | 102 10 787 | 10/2003 |
| EP | 1391693 | 2/2004 |

(Continued)

OTHER PUBLICATIONS

Arditty et al., Sagnac effect in fiber gyroscopes, Optics Letters, 1981, vol. 6, Issue 8, pp. 401-403.

(Continued)

*Primary Examiner* — Jonathan Hansen

(74) *Attorney, Agent, or Firm* — Knobbe, Martens, Olson & Bear LLP

(57) ABSTRACT

In certain embodiments, an optical device and a method of use is provided. The optical device can include a fiber Bragg grating and a narrowband optical source. The narrowband optical source can be configured to generate light. A first portion of light can be transmitted along a first optical path extending along and through the length of the fiber Bragg grating at a group velocity. The light can have a wavelength at or in the vicinity of a wavelength at which one or more of the following quantities is at a maximum value: (a) the product of the group index spectrum and a square root of the power transmission spectrum, (b) the slope of a product of the group index spectrum and one minus the power transmission spectrum, and (c) the slope of a product of the group index spectrum and the power transmission spectrum.

28 Claims, 53 Drawing Sheets

(56) References Cited

U.S. PATENT DOCUMENTS

| | | | |
|---|---|---|---|
| 7,277,179 | B2 | 10/2007 | Deng et al. |
| 7,385,177 | B2 | 6/2008 | Steinberg et al. |
| 7,746,476 | B2 | 6/2010 | Demers et al. |
| 7,911,622 | B2 | 3/2011 | Terrel et al. |
| 8,031,343 | B2 | 10/2011 | Carothers et al. |
| 8,068,232 | B2 | 11/2011 | Terrel et al. |
| 8,300,231 | B2 | 10/2012 | Terrel et al. |
| 2003/0081875 | A1 | 5/2003 | Kochergin et al. |
| 2003/0112442 | A1* | 6/2003 | Baney et al. .................. 356/477 |
| 2003/0142319 | A1* | 7/2003 | Ronnekleiv et al. .......... 356/477 |
| 2004/0061863 | A1 | 4/2004 | Digonnet |
| 2004/0263856 | A1 | 12/2004 | Willig et al. |
| 2006/0164648 | A1 | 7/2006 | Howard |
| 2007/0086015 | A1 | 4/2007 | Sanders et al. |
| 2007/0242276 | A1 | 10/2007 | Hughes et al. |
| 2009/0027754 | A1 | 1/2009 | Steinberg et al. |
| 2010/0024551 | A1* | 2/2010 | Maguire et al. ............ 73/514.26 |
| 2011/0001981 | A1 | 1/2011 | Digonnet |
| 2011/0134432 | A1 | 6/2011 | Terrel et al. |
| 2012/0069346 | A1 | 3/2012 | Terrel et al. |

FOREIGN PATENT DOCUMENTS

| | | | |
|---|---|---|---|
| EP | 1 783 456 | A1 | 5/2007 |
| EP | 2 259 037 | | 12/2010 |
| EP | 1 906 146 | B1 | 12/2012 |
| JP | 08-233583 | | 9/1996 |
| JP | 09-181383 | | 7/1997 |
| JP | 09-318367 | | 12/1997 |
| JP | 2004-132963 | | 4/2004 |
| JP | 2005-087879 | | 4/2005 |
| WO | WO 2006/083691 | A1 | 8/2006 |
| WO | WO 2008/157405 | | 12/2008 |

OTHER PUBLICATIONS

Chow, J.H. et al., Phase-sensitive interrogation of fiber Bragg grating resonators for sensing applications, J. Lightwave Technol., May 2005, vol. 23, Issue 5, pp. 1881-1889.

Dangui et al., Phase sensitivity to temperature of the fundamental mode in air-guiding photonic-bandgap fibers, Optics Express, 2005, vol. 13, Issue 18, pp. 6669-6684.

Deladi et al., Carving fiber-top optomechanical transducers from an optical fiber, Journal of Micromechanics and Microengineering, 2006, vol. 16, pp. 886-889.

Erdogan, T., Fiber grating spectra, J. of Lightwave Technology, 1997, vol. 15, No. 8, pp. 1277-1294.

Examination Report dated Aug. 3, 2010, for European Application No. 08771079.4.

Gatti, D. et al., Fiber strain sensor based on a π-phase-shifted Bragg grating and the Pound-Drever-Hall technique, Optics Express, Feb. 4, 2008, vol. 16, Issue 3, pp. 1945-1950.

Grudinin et al., Ultrahigh optical Q factors of crystalline resonators in the linear regime, Phys. Rev. A 74, 063806, 2006.

Harris, Stephen, Electromagnetically induced transparency, Physics Today, 1997, pp. 36-42.

Hocker, G.B., Fiber-optic sensing of pressure and temperature, Applied Optics, 1979, vol. 18, Issue 9, pp. 1445-1459.

Hoo et al., Evenescent-wave gas sensing using microstructure fiber, Optical Engineering, 2002, vol. 41(1), pp. 8-9.

International Search Report and Written Opinion re PCT Application No. PCT/US2008/066986, mailed Dec. 2, 2008.

Johlen, D. et al., UV-induced absorption, scattering and transition losses in UV side-written fibers, Optical Fiber Communication Conference and the International Conference on Integrated Optics and Optical Fiber Communication, 1999 OSA Technical Digest Series (Optical Society of America, Washington, D.C.), paper ThD1, 1999, pp. 50-52.

Kersey et al., Fiber grating sensors, Journal of Lightwave Technology, 1997, vol. 15, Issue 8, pp. 1442-1463.

Kersey, A.D. et al., High resolution fibre-grating based strain sensor with interferometric wavelength-shift detection, Electronic Letters, Jan. 1992, vol. 28, Issue 3, pp. 236-238.

Koo, K.P. et al., Bragg grating-based laser sensors systems with interferometric interrogation and wavelength division multiplexing, J. Lightwave Technol., Jul. 1995, vol. 13, Issue 7, pp. 1243-1249.

Lee, M. et al., Improved slow-light delay performance of a broadband stimulated Brillouin scattering system using fiber Bragg gratings, Applied Optics, Dec. 1, 2008, vol. 47, Issue 34, pp. 6404-6415.

Leeb et al., Optical fiber gyroscopes: Sagnac or Fizeau effect?, Applied Optics, 1979, vol. 18, Issue 9, pp. 1293-1295.

Lefevre, The Fiber-Optic Gyroscope, Ch. 11, Artech House, 1993, Boston.

Lefevre, The Fiber-Optic Gyroscope, Ch. 2, Artech House, 1993, Boston.

Lefevre, The Fiber-Optic Gyroscope, Ch. 3, Artech House, 1993, pp. 30-43, Boston.

Lefevre, The Fiber-Optic Gyroscope, Ch. 6, Artech House, 1993, Boston.

Lemaire, P.J. et al., High pressure $H_2$ loading as a technique for achieving ultrahigh UV photosensitivity and thermal sensitivity in $GeO_2$ doped optical fibres, Electronic Letters, Jun. 1993, vol. 29, Issue 13, pp. 1191-1193.

Leonhart et al., Ultrahigh sensitivity of slow-light gyroscope, Physical Review A, 2000, vol. 62, 055801, pp. 1-2.

Lin et al., Zero dispersion slow light with low leakage loss in defect Bragg fiber, Applied Physics Letters, 2007, vol. 90, Issue 3, 031109, pp. 1-3.

Liu, Y. et al Transmission loss of phase-shifted fiber Bragg gratings in lossy materials: a theoretical and experimental investigation, Applied Optics, 2007, pp. 6770-6773.

Matsko et al., Erratum to optical gyroscope with whispering gallery mode optical cavities, Optics Communications, 2006, vol. 259, pp. 393-394.

Matsko et al., Optical gyroscope with whispering gallery mode optical cavities, Optics Communications, 2004, vol. 233, pp. 107-112.

Misas, C.J. et al., Slowing of pulses to c/10 with subwatt power levels and low latency using brillouin amplification in a bismuth-oxide optical fiber, J. of Lightwave Technology, Jan. 2007, vol. 25, No. 1, pp. 216-221.

Mok, Joe T., Dispersionless slow light using gap solitons, Nature Physics, Nov. 2006, vol. 21, pp. 775-780.

Ouellette, F. et al., Broadband and WDM dispersion compensation using chirped sample fibre Bragg gratings, Electronic Letters, May 1995, vol. 31, Issue 11, pp. 899-901.

Parker et al., A fully distributed simultaneous strain and temperature sensor using spontaneous brillouin backscatter, IEEE Photonics Technology Letters, 1997, vol. 9, Issue 7, pp. 979-981.

Pavlath, Fiber optic gyros: the vision realized, 18th International Optical Fiber Sensors Conference Technical Digest (Optical Society of America, Washington DC, 2006) MA3.

Peng et al., Optical gyroscope based on a coupled resonator with the alloptical analogous property of electromagnetically induced transparency, Optics Express, Apr. 2, 2007, vol. 15, Issue 7, pp. 3864-3875.

Peng et al., Rotation sensing based on a slow-light resonating structure with high group dispersion, Applied Optics, Jul. 2007, vol. 46, Issue 19, pp. 4125-4131.

Peng, Chao et al., "Slow light" gyroscope based on a coupled resonator waveguide structure, Poster Session 3, P79, Nano-Optoelectronics Workshop, i-NOW, 2007, pp. 232-233.

Post, E.J., Sagnac effect, Reviews of Modern Physics, 1967, vol. 39, Issue 2, pp. 475-493.

Purves, G. et al., Sagnac interferometry in a slow-light medium, Physical Review A 74, 023805, 2006, pp. 1-4.

Rao, Y.J., In-fibre Bragg grating sensors, Meas. Sci. Technol., 1997, vol. 8, pp. 355-375.

Sandhu et al., Dynamically tuned coupled-resonator delay lines can be nearly dispersion free, Optics Letters, 2006, vol. 31, Issue 13, pp. 1985-1987.

Scheuer et al., Sagnac effect in coupled-resonator slow-light waveguide structures, Phys. Rev. Lett., 2006, vol. 96, 053901.

(56) References Cited

OTHER PUBLICATIONS

Shahriar, M.S. et al., Ultrahigh enhancement in absolute and relative rotation sensing using fast and slow light, Physical Review A 75, 053807, 2007, pp. 1-10.

Shi, et al.: "Enhancing the Spectral Sensitivity and Resolution of Interferometers Using Slow-Light Media", Quantum Electronics and Laser Science Conference, 1007. QELS '07, IEEE, PI, May 6, 2007, pp. 1-2.

Shi, et al.: "Enhancing the Spectral Sensitivity of Interferometers Using Slow-Light Media", Optics Letters, OSA, Optical Society of America, Washington, DC, vol. 32, No. 8, Apr. 15, 2007, pp. 913-917.

Soljacic, et al.: "Photonic-crystal slow-light enhancement of nonlinear phase sensitivity", Journal of the Optical Society of America, Washington, DC, vol. 19, No. 9, Sep. 1, 2002, pp. 2052-2059.

Steinberg et al., Rotation induced super structure in slow-light waveguides with mode degeneracy: optical gyroscopes with exponential sensitivity, JOSA B, May 2007, vol. 24(5), pp. 1216-1224.

Terrel et al., Performance limitation of a coupled resonant optical waveguide gyroscope, J. Lightwave Tech., 2009, vol. 27, Issue 1, pp. 47-54.

Yanik et al., Stopping and storing light coherently, Physical Review A 71, 013803, 2005, pp. 1-10.

Yanik et al., Stopping light all optically, Physical Review Letters, 2004, vol. 92, Issue 8, 183901, pp. 1-4.

Yanik et al., Stopping light in a waveguide with an all-optical analog of electromagnetically induced transparency, Physical Review Letters, 2004, vol. PRL 93, 233903, pp. 1-4.

Yariv et al., Coupled-resonator optical waveguide: a proposal and analysis, Optics Letters, 1999, vol. 24, Issue 11, pp. 711-713.

Yariv, A. et al., Optical waves in crystals: propagation and control of laser radiation, Wiley, 1984, pp. 155-214, New York.

Zimmer et al., Sagnac interferometry based on ultraslow polaritons in cold atomic vapors, Physical Review Letters, 2004, vol. 92, Issue 25, 253201, pp. 1-4.

Digonnet, M.J.F., "New technologies in fiber sensors", Lasers and Electro-Optics, 2007 and The International Quantum Electron ICS Conference on Jun. 1, 2007, 1 page.

International Report on Patentability re PCT Application No. PCT/US2008/066986, mailed Dec. 30, 2009.

International Search Report and Written Opinion re PCT Application No. PCT/US2011/050444, dated Jan. 9, 2012.

Lissak et al., Highly sensitive dynamic strain measurements by locking lasers to fiber Bragg gratings, Optics Letters, Dec. 15, 1998, vol. 23, No. 24, pp. 1930-1932.

Wen et al., "Sensing With Slow Light in fiber Bragg Gratings", IEEE Sensors Journal, vol. 12, No. 1, Jan. 2012, pp. 156-163.

Yong et al., "Research on high sensitivity optical fiber interference sensing due to slow light", Photonics and Optoelectronics, 2009 IEEE, 4 pages.

Janner et al., "Light slowing-down in superstructure fiber Bragg gratings," Technical Digest CD-ROM/Conference on Lasers and Electro-Optics, Quantum Electronics and Laser Science Conference, Conference on Photonic Applications, Systems and Technologies, Long Beach, CA USA, May 21, 2006. XP031395297.

Shi, Z. et al., "Enhancing the spectral sensitivity and resolution of interferometers using slow-light media," Optical Society of America, CTuT2, 2006.

International Search Report and Written Opinion for International Application No. PCT/US2013/022298, dated Feb. 7, 2014.

* cited by examiner

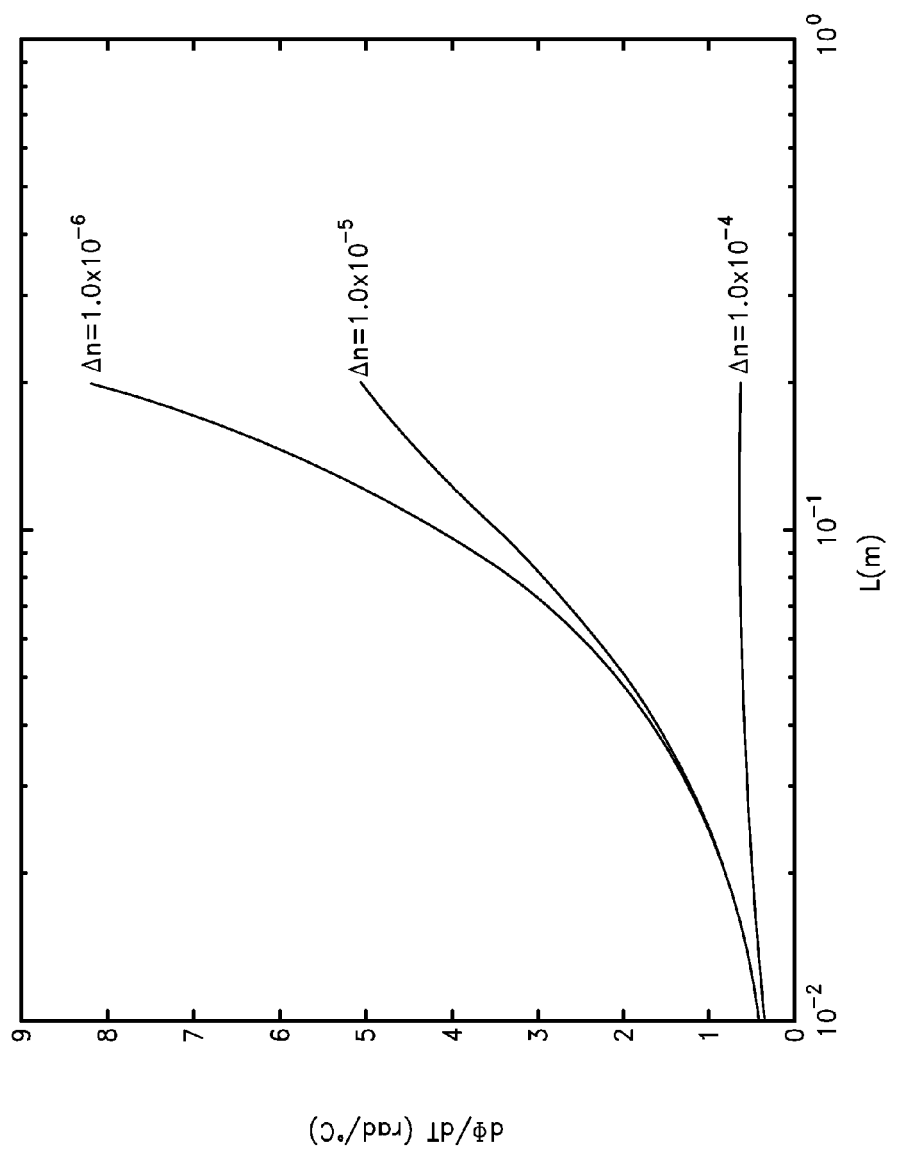

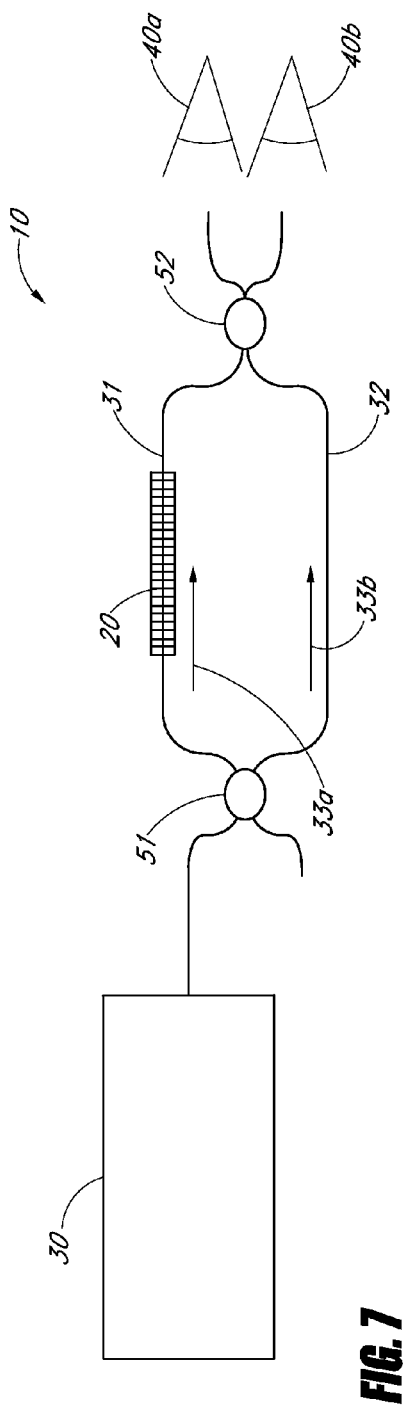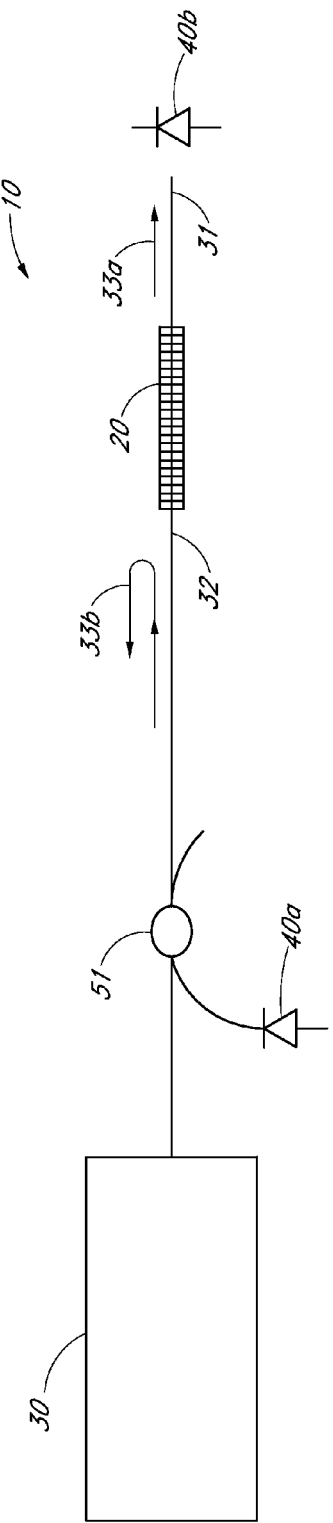
FIG. 7
FIG. 8

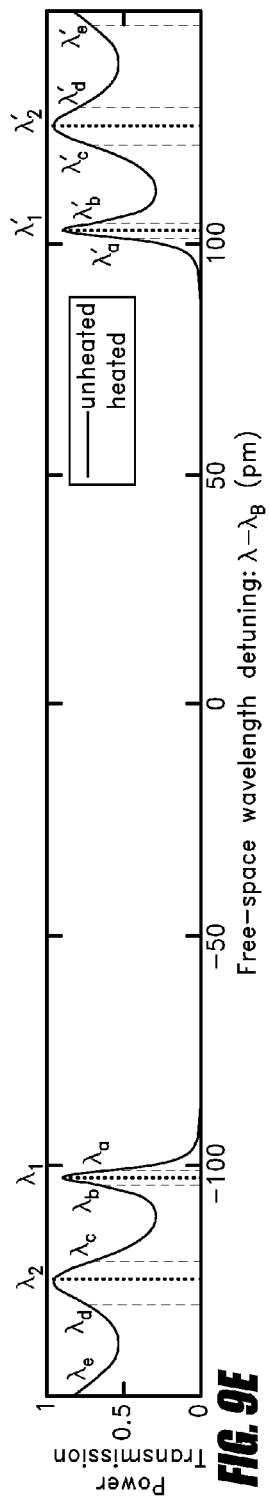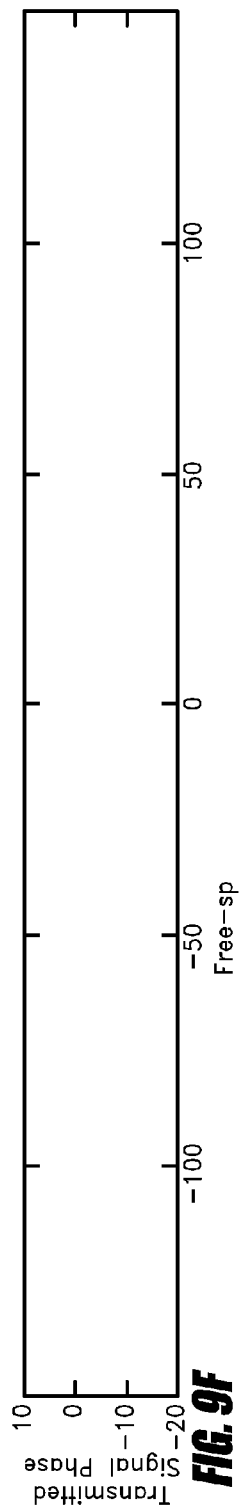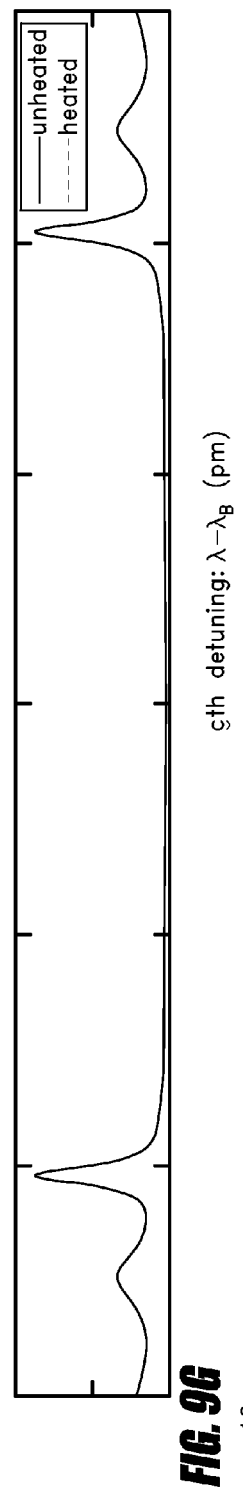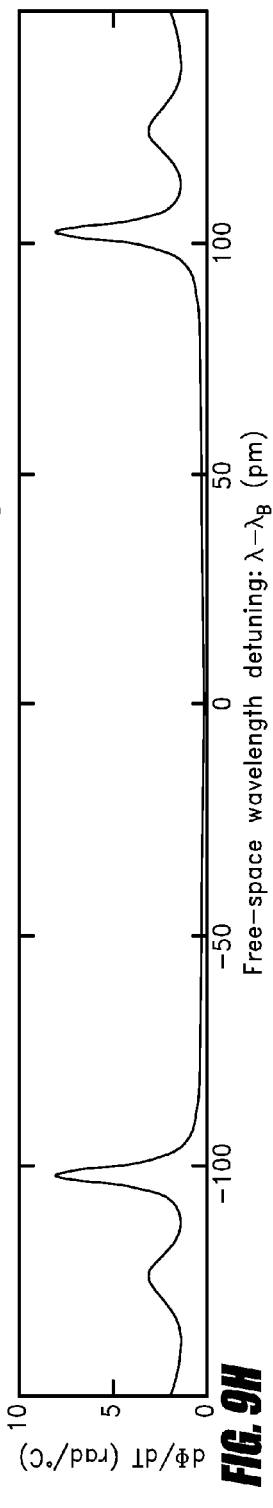

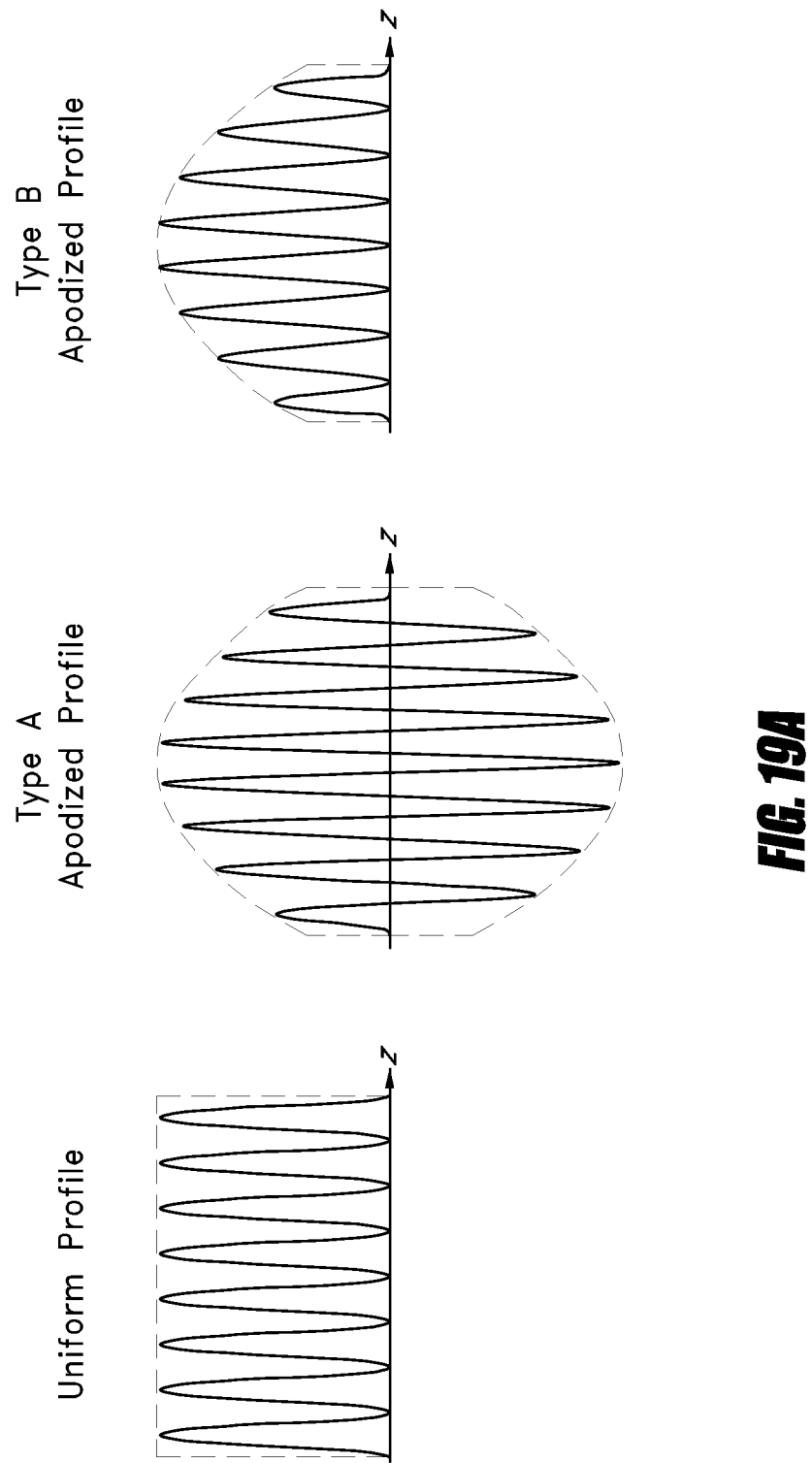

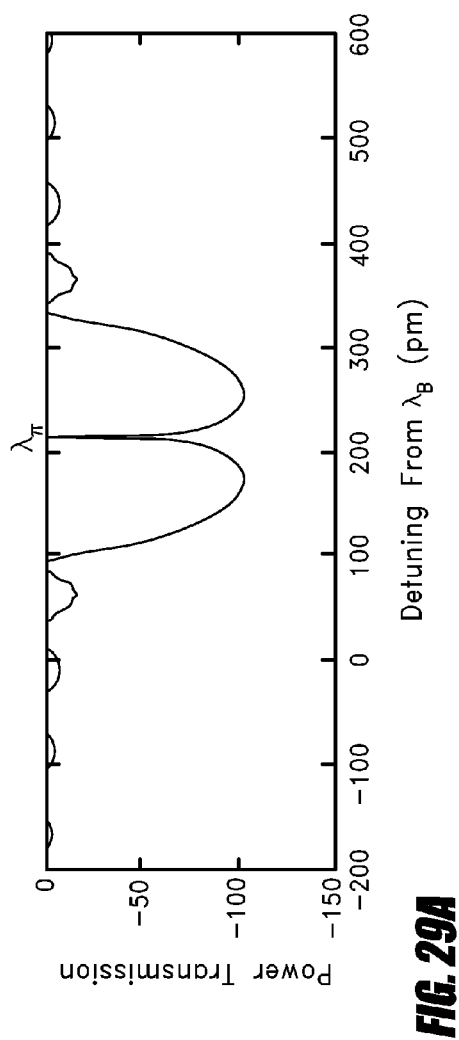
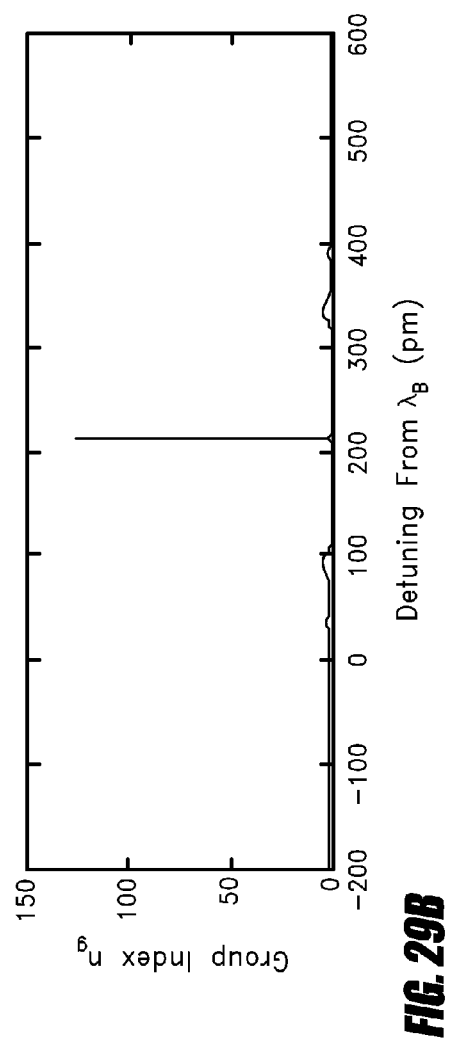
FIG. 29A
FIG. 29B

SLOW-LIGHT FIBER BRAGG GRATING SENSOR

CLAIM OF PRIORITY

The present application claims the benefit of priority to U.S. Provisional Patent Application No. 61/381,032, filed on Sep. 8, 2010, and incorporated in its entirety by reference herein.

RELATED APPLICATIONS

This application is related to U.S. patent application Ser. No. 12/792,631, filed Jun. 2, 2010, which is incorporated in its entirety by reference herein.

BACKGROUND OF THE INVENTION

1. Field of the Invention

This application relates generally to optical devices utilizing fiber Bragg gratings and slow light, and more particularly, to optical sensors utilizing fiber Bragg gratings and slow light.

2. Description of the Related Art

Fiber Bragg gratings (FBGs) are used extensively in research and in industry for a large number of photonics applications, in particular in communication systems, in fiber lasers, and in fiber sensors. They are used as filters, high or partial reflectors, dispersion compensators, frequency standards, frequency stabilizers, spectrum analyzers, etc. In the field of fiber sensors, which is the main area germane to certain embodiments described herein, FBGs are used to sense changes to a number of perturbations applied individually or simultaneously to the FBG, mostly strain and temperature. For example, when a temperature change is applied to an FBG, three of the FBG parameters change, namely its length (through thermal expansion) and therefore the period of the grating, the effective index of the mode propagating in the core (through the thermo-optic effect), and the dimension of the fiber core (again through thermal expansion). Of these three effects, the one with the largest contribution to the performance of the FBG is typically the thermo-optic effect. Combined, these three changes result in a change in the Bragg wavelength, which can be measured to recover the temperature change applied to the grating. A similar principle is commonly used to measure a longitudinal strain applied to an FBG: when the fiber is strained, the three parameters mentioned above also change, which causes a shift in the Bragg wavelength. FBGs are undoubtedly the most widely used optical sensing component in the field of fiber sensors, largely because of their compactness, their ease of manufacturing, and their relative stability, considering that they are, after all, a very sensitive multi-wave interferometer.

SUMMARY

In certain embodiments, an optical device comprises a fiber Bragg grating comprising a substantially periodic refractive index modulation along a length of the fiber Bragg grating. The fiber Bragg grating has a power transmission spectrum as a function of wavelength comprising a plurality of local transmission maxima. The local transmission maxima each have a maximum power at a transmission peak wavelength. The fiber Bragg grating has a group index spectrum as a function of wavelength. The device further comprises a narrowband optical source in optical communication with a first optical path and a second optical path. The narrowband optical source is configured to generate light. The device is configured to split the light into a first portion and a second portion, the first portion transmitted along the first optical path extending along and through the length of the fiber Bragg grating at a group velocity. The light has a wavelength at or in the vicinity of a wavelength at which one or more of the following quantities is at a maximum value: (a) the product of the group index spectrum and a square root of the power transmission spectrum, (b) the slope of a product of the group index spectrum and one minus the power transmission spectrum, and (c) the slope of a product of the group index spectrum and the power transmission spectrum.

In certain embodiments, a method of using a fiber Bragg grating comprises providing a fiber Bragg grating comprising a substantially periodic refractive index modulation along a length of the fiber Bragg grating. The fiber Bragg grating has a power transmission spectrum as a function of wavelength comprising a plurality of local transmission maxima. The local transmission maxima each have a maximum power at a transmission peak wavelength. The fiber Bragg grating has a group index spectrum as a function of wavelength. The method further comprises generating light from a narrowband optical source. The narrowband optical source is in optical communication with a first optical path and a second optical path, wherein the light is split into a first portion and a second portion. The method further comprises transmitting the first portion of light along the first optical path extending along and through the length of the fiber Bragg grating at a group velocity. The light has a wavelength at or in the vicinity of a wavelength at which one or more of the following quantities is at a maximum value: (a) the product of the group index spectrum and a square root of the power transmission spectrum, (b) the slope of a product of the group index spectrum and one minus the power transmission spectrum, and (c) the slope of a product of the group index spectrum and the power transmission spectrum.

BRIEF DESCRIPTION OF THE DRAWINGS

FIG. 5 illustrates the calculated maximum sensitivity to temperature of the Bragg-reflection-mode FBG sensor of FIG. 2 as a function of FBG lengths for various index contrasts for a wavelength of 1.55 microns, calculated assuming a lossless grating.

FIG. 7 shows a diagram of an example implementation of an apparatus utilizing an FBG used in the slow-light transmission mode in accordance with certain embodiments described herein.

FIG. 8 shows a diagram of an example implementation of an apparatus utilizing an FBG used in the slow-light reflection mode in accordance with certain embodiments described herein.

FIGS. 9A and 9E illustrate the calculated power transmission spectrum for an example FBG used in transmission for wavelengths of 1.064 microns and 1.55 microns, respectively, in accordance with certain embodiments described herein, calculated assuming a lossless grating. (The "unheated" curve shows the case without thermal perturbation, the "heated" curve with thermal perturbation.)

FIGS. 9B and 9F illustrate the calculated transmitted signal phase as a function of wavelength for an example FBG used in transmission for wavelengths of 1.064 microns and 1.55 microns, respectively, in accordance with certain embodiments described herein, calculated assuming a lossless grating.

FIGS. 9C and 9G illustrate the calculated group index as a function of wavelength for an example FBG used in transmission for wavelengths of 1.064 microns and 1.55 microns, respectively, in accordance with certain embodiments described herein, calculated assuming a lossless grating.

FIGS. 9D and 9H illustrate the calculated temperature sensitivity for an example FBG used in transmission for wavelengths of 1.064 microns and 1.55 microns, respectively, in accordance with certain embodiments described herein, calculated assuming a lossless grating.

FIG. 19A shows the index profiles for FBGs with a uniform profile, a Type A apodized profile, and a Type B apodized profile.

FIG. 29A shows the transmission spectrum of a π-shifted grating.

FIG. 29B shows the group index spectrum of a π-shifted grating used in FIG. 29A.

DETAILED DESCRIPTION

Figure 1:
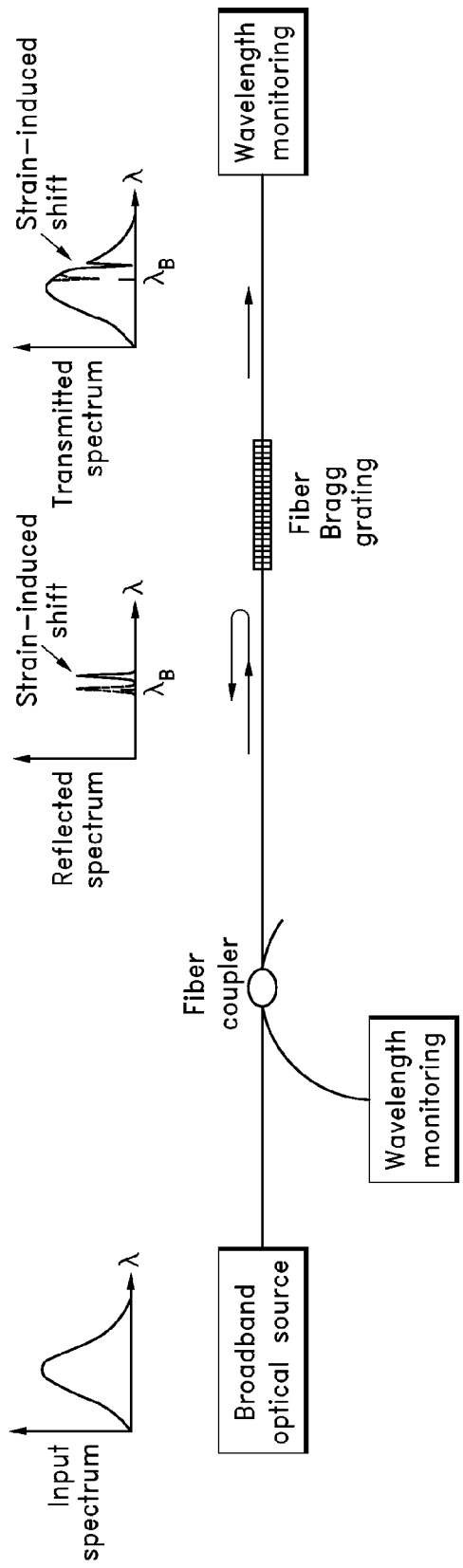
FIG. 1 shows a schematic of a generic apparatus used to measure the shift in Bragg wavelength.

Although fiber Bragg gratings (FBGs) can take many forms that differ in their details, an FBG typically includes of a periodic index grating of period $\Lambda$ fabricated along the guiding region of an optical fiber. The presence of a periodic structure in the waveguiding region of an FBG induces a photonic bandgap, namely a band of finite bandwidth in the optical frequency space where light is not allowed to propagate forward through the grating. The central wavelength of this bandgap is known as the Bragg wavelength, $\lambda_{Bragg}$. When light of wavelengths in the vicinity of $\lambda_{Bragg}$ is injected into the core of an FBG, it is substantially reflected from the FBG, while light of wavelengths sufficiently far away from $\lambda_{Bragg}$ is substantially transmitted along the length of the FBG. A physical explanation for this reflection is that each ripple in the index of the core region reflects a small fraction of the incident light into the backward-propagating fundamental mode of the fiber. This reflection is physically due to Fresnel reflection occurring at the interface between two dielectric media of different refractive indices. The fraction of light (in terms of electric field) that is reflected at each ripple is therefore proportional to $\Delta n$, which is a very small number. However, an FBG typically contains tens of thousands of periods, so all these reflections can add up to a sizeable total reflection. At the Bragg wavelength, the grating period $\Lambda$ is such that substantially all the individual reflections are in phase with each other. All reflections then add constructively into the backward-propagating mode, which can end up carrying a large fraction of the incident light's power. In an FBG with a sufficiently long length and strong index modulation $\Delta n$, essentially 100% of the incident light can be reflected In the field of fiber sensors, most FBGs to date have been used in what is referred to herein as the Bragg-reflection mode. A schematic of this mode of operation is shown in FIG. 1. Light (for example from a broadband light source) is launched into the FBG through a fiber coupler. The portion of the light spectrum centered around $\lambda_{Bragg}$ that is reflected from the FBG is split by the same coupler and directed toward a wavelength-monitoring instrument, for example an optical spectrum analyzer (OSA), which measures $\lambda_{Bragg}$. Alternatively, the portion of the light spectrum that is transmitted by the FBG can be measured by a second wavelength-monitoring instrument, again for example an OSA, which also provides a measured value of $\lambda_{Bragg}$. When a temperature change is applied to the FBG, $\lambda_{Bragg}$ changes, this change of $\lambda_{Bragg}$ (or the changed value of $\lambda_{Bragg}$) is measured by one or both of the wavelength-monitoring instruments, and the absolute value of the temperature change can then be calculated from the measured change of $\lambda_{Bragg}$ (or the changed value of $\lambda_{Bragg}$). The same principle is used to measure the absolute (or relative) magnitude of any other perturbation applied to the FBG that modifies $\lambda_{Bragg}$, such as a strain an train or acceleration. Many examples of this mode of operation of FBGs as sensors are described in the literature. All of them have this point in common that they rely on a measurement of the Bragg wavelength $\lambda_{Bragg}$ (or the changed value of $\lambda_{Bragg}$) to recover the measurand.

In order to improve the sensitivity of an FBG used in the Bragg-reflection mode, it is essential to improve the ability to measure extremely small changes in wavelength, e.g., changes of less than $10^{-13}$ meters. This can be accomplished by utilizing an OSA with a high resolution. Commercial OSAs are available with a sufficiently high wavelength resolution. For example, Yokogawa Electric Company of Tokyo, Japan markets an OSA which has a resolution of 0.05 nm, and Anritsu Corporation of Atsugi, Japan offers an OSA with a resolution of 0.07 nm.

Another solution, which provides a much higher wavelength resolution, e.g., a resolution of $10^{-12}$ m, than a conventional OSA, is to use an imbalanced Mach-Zehnder (MZ) interferometer to monitor the wavelength. See, e.g., A. D. Kersey, T. A. Berkoff, and W. W. Morey, "High resolution fibre-grating based strain sensor with interferometric wavelength-shift detection," *Electronic Letters*, Vol. 28, No. 3. (January 1992). A diagram of a generic implementation, of this concept in shown in FIG. 2. The signal reflected from the FBG, which has a wavelength $\lambda_{Bragg}$ to be measured, goes through the two arms of the MZ interferometer. Because the two arms have different length $L_1$ and $L_2$, e.g., 50 cm for $L_1$ and 51 cm for $L_2$, with proper phase biasing, the signal coming out of one output port of the MZ interferometer is proportional to $\sin(\Delta\phi/2)$, where $\Delta\phi=2\pi n\Delta L_{Bragg}$, n is the mode effective index in the MZ fiber, and $\Delta L=L_1-L_2$. If, as a result of a perturbation applied to the FBG, the Bragg wavelength of the FBG varies by $\delta\lambda_{Bragg}$, then the phase difference between the two arms of the MZ interferometer will vary by $$|\delta\Delta\phi|=-2\pi n\Delta L\delta\lambda_{Bragg}/\lambda_{Bragg}^2 \qquad (1)$$

With suitable phase bias of the MZ interferometer, the detected power in the presence of the perturbation is proportional to $\sin(\Delta\phi/2)$, and thus it varies by $\sin(\pi n\Delta L\delta\lambda_B/\lambda_B^2)$, and $\delta\lambda_{Bragg}$ can be recovered by measuring this variation in power. For a small perturbation, $\delta\lambda_{Bragg}$ is small, and so is $\delta\Delta\phi$ so the power change is then proportional to $\Delta L\delta\lambda_{Bragg}/\lambda_{Bragg}^2$. Hence, this technique can give, in principle, a very high resolution in $\delta\lambda_{Bragg}$ by increasing $\Delta L$ to a very high value, which is easy to do because an optical fiber typically has very low loss (so a long length can be used without the penalty of increased signal loss and thus reduced signal-to-noise ratio) and is inexpensive.

Figure 2:
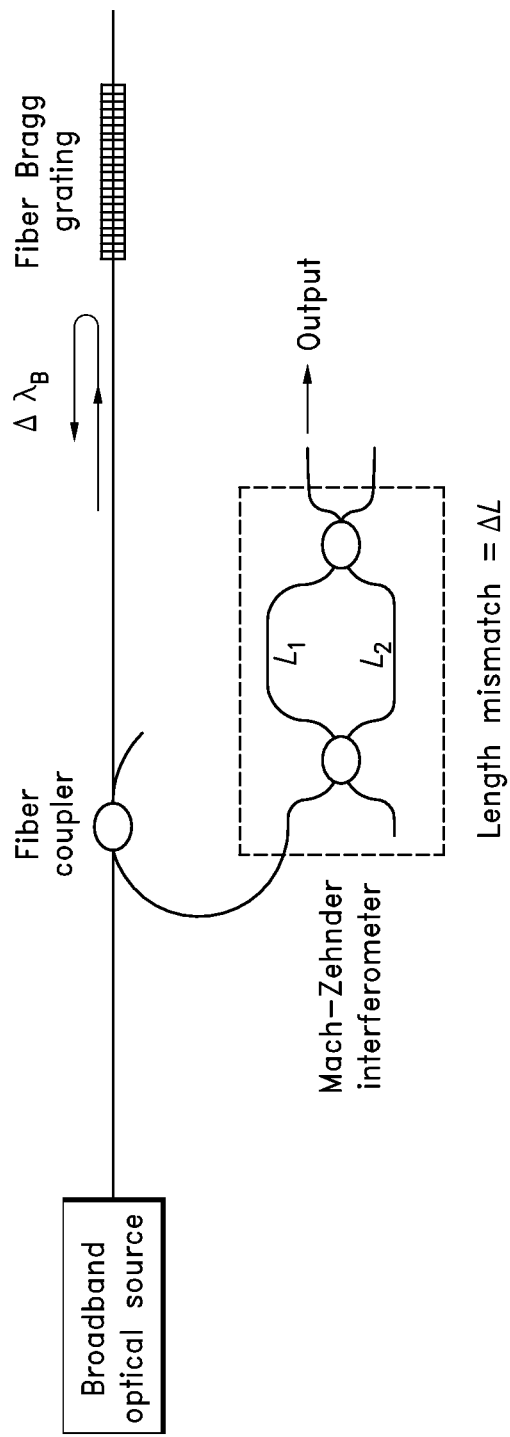
FIG. 2 shows a diagram of a generic implementation of signal processing utilizing a Mach-Zehnder interferometer with a fiber Bragg grating sensor.

The approach of FIG. 2 has two main limitations. The first one is that the imbalance $\Delta L$ cannot be increased indefinitely. The basic operation of an MZ interferometer requires that the two signals are recombined (e.g., at the second coupler in the MZ interferometer) with a high degree of temporal coherence, so that they can interfere. This means that the optical length mismatch $\Delta L$ is selected to not exceed approximately the coherence length $L_c$ of the signal traveling through the MZ interferometer. This coherence length is related to the frequency linewidth $\Delta v$ (or wavelength linewidth $\Delta\lambda$) of the signal that is reflected by the FBG by:

$$L_c = \frac{c}{\pi\Delta v} = \frac{\lambda^2}{\pi\Delta\lambda} \quad (2)$$

In turn, the linewidth of the light reflected from a grating is approximately given by:

$$\Delta\lambda = \lambda_{Bragg}\sqrt{\left(\frac{\Delta n}{2n}\right)^2 + \left(\frac{1}{N}\right)^2} \quad (3)$$

where $N=L/\Lambda$ is the number of periods in the grating, and L is the FBG length. See, for example, Y. J. Rao, "In-fibre Bragg grating sensors," *Meas. Sci. Technol.* Vol. 8, 355-375 (1997). The second condition (a narrow reflected linewidth) can therefore be met by decreasing the index modulation of the FBG, and/or increasing the number of periods, e.g., increasing the length of the FBG.

If the linewidth of the reflected signal is narrow, the signal coherence length is long, a large length imbalance can be used in the MZ interferometer, and the sensitivity can be high. However, the linewidth of the reflected signal cannot be made arbitrarily narrow. The linewidth is constrained, through Eq. 3, by the grating, namely by the number of periods N and the relative index contrast $\Delta n/n$. To be able to use a large path mismatch $\Delta L$, one can use a very weak grating (very small relative index contrast (or modulation) $\Delta n/n$ and a very long grating). For example, to use a 1-m path mismatch at a wavelength of 1.55 µm, a coherence length of 1 m is used or, according to Eq. (3), for example a relative index contrast of $\sim 10^{-5}$ and a grating length greater than 16 cm.

Figure 3:
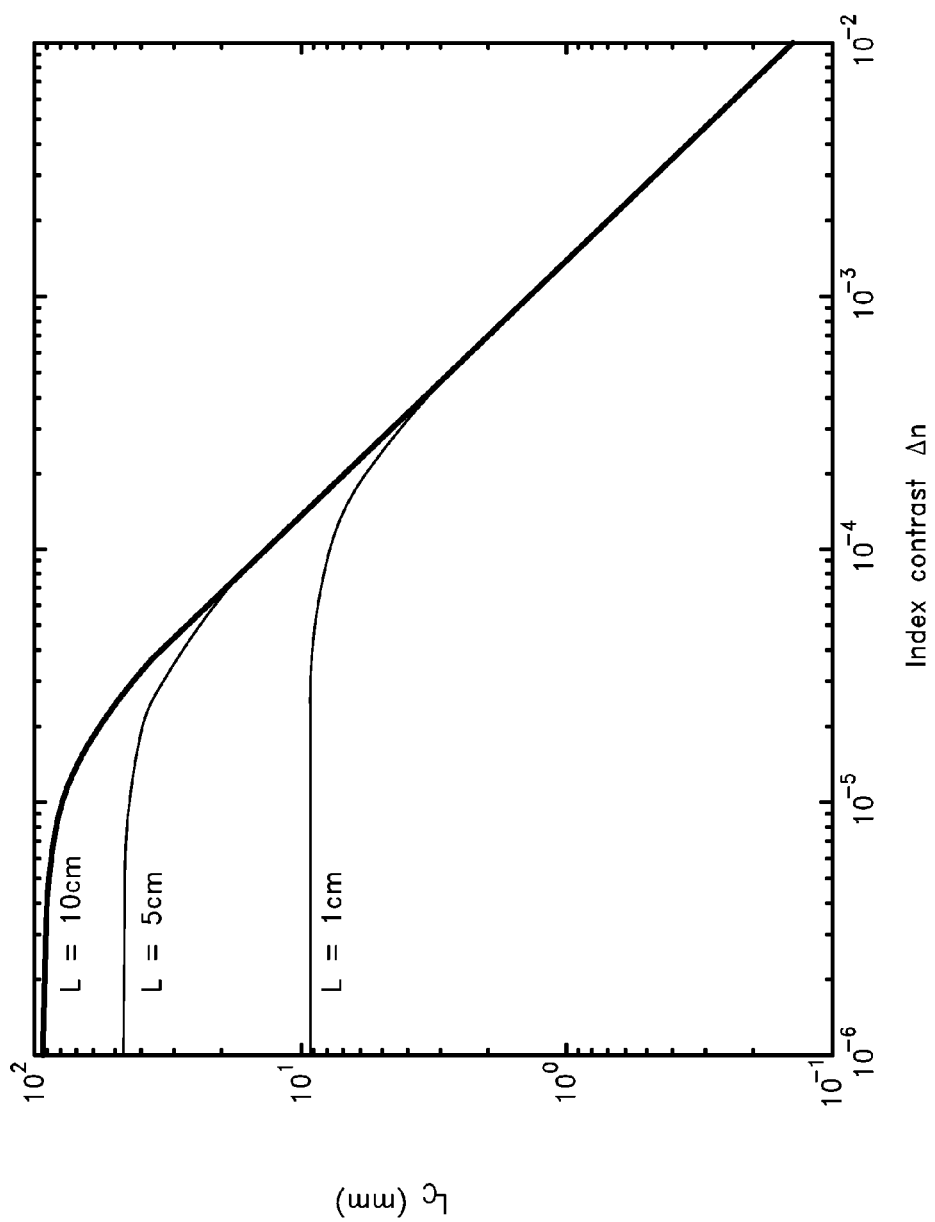
FIG. 3 illustrates the coherence length of light reflected by an FBG as a function of the FBG's index contrast for three different FBG lengths for a wavelength of 1.55 microns, calculated assuming a lossless grating.

FIG. 3 illustrates the coherence length of light reflected from an FBG as a function of its index contrast $\Delta n$ for three different FBG lengths for a wavelength of 1.064 microns, calculated assuming a lossless grating. For a given FBG length, as the index contrast decreases, the coherence length increases up to some maximum value. This maximum value increases as the grating length is increased. This maximum coherence length is approximately equal to the grating length (see FIG. 3). This result is expected from Eq. (2) and Eq. (3): in the limit of negligible $\Delta n/n$, $\Delta\lambda$ approaches $\lambda_{Bragg}/N$, and therefore $L_c$ approaches $$L_c = \frac{\lambda_{Bragg}^2}{\pi\Delta\lambda} = \frac{\lambda_{Bragg}}{\pi}N = \frac{2n\Lambda}{\pi}N = \frac{2n}{\pi}L \quad (4)$$

where the expression of the Bragg wavelength of an FBG, $\lambda_{Bragg}=2n\Lambda$, has been used. In a silica fiber, $n\approx 1.45$, hence $2n/\pi$ in Eq. (4) is equal to 0.92, so $L_c$ is close to L, as predicted in FIG. 3. For a given index contrast, as the length increases, the coherence length also reaches a plateau, beyond which further increasing the FBG length does not increase the coherence length in any significant manner. Thus, to get long coherence lengths, one can use a grating with a low contrast and a long length. However, for typical contrast values ($10^{-4}$ to $10^{-6}$, $10^{-5}$ being about the most typical) even for FBG lengths exceeding typical reasonable values (a few cm), the coherence length is only of the order of 10 cm or less. This is consistent with the report of Kersey et al., in which a length mismatch of 10 mm was used in the MZ interferometer that processed the reflected signal from an FBG with a linewidth $\Delta\lambda=0.2$ nm (corresponding to a coherence length of ~3.8 mm according to Equation 2).

Based on the foregoing, the sensitivity of the Bragg-reflection configuration of FIG. 2 is limited by the length mismatch, which is itself limited by the coherence length of the reflected signal, which itself is imposed by $\Delta n$ and L according to FIG. 3. For a length mismatch $\Delta L$, the change in the phase difference $\Delta\phi$ between the two arms of the MZ interferometer resulting from a change in the wavelength $\delta\lambda_{Bragg}$ reflected by the FBG is given by Equation 1. Assuming to first order that this change in wavelength is primarily due to a change of fiber index with temperature (e.g., neglecting the effect of the change in FBG length and fiber transverse dimension), the sensitivity of the sensor of FIG. 2 can be written explicitly as $$\frac{\partial\phi(\lambda)}{\partial T} = \frac{2\pi n\Delta L}{\lambda}\left(\frac{1}{\lambda}\frac{\partial\lambda}{\partial T}\right) \approx \frac{2\pi\Delta L}{\lambda}\left(\frac{\partial n}{\partial T}\right) \quad (5)$$

The sensitivity is a simple linear function of $\Delta L$. For a silica fiber, $dn/dT \approx 1.1\times 10^{-5}$ °C.$^{-1}$. For the exemplary maximum length mismatch of 10 cm used in FIG. 3, and for a Bragg wavelength around 1.064 µm, Equation 5 states that the phase sensitivity to temperature is about 6.5 rad/° C. If the minimum phase change detectable at the output of the MZ interferometer is 1 µrad (a typical good value), the minimum detectable temperature change $10^{-6}/6.5 \approx 1.54\times 10^{-7}$° C.

Figure 4:
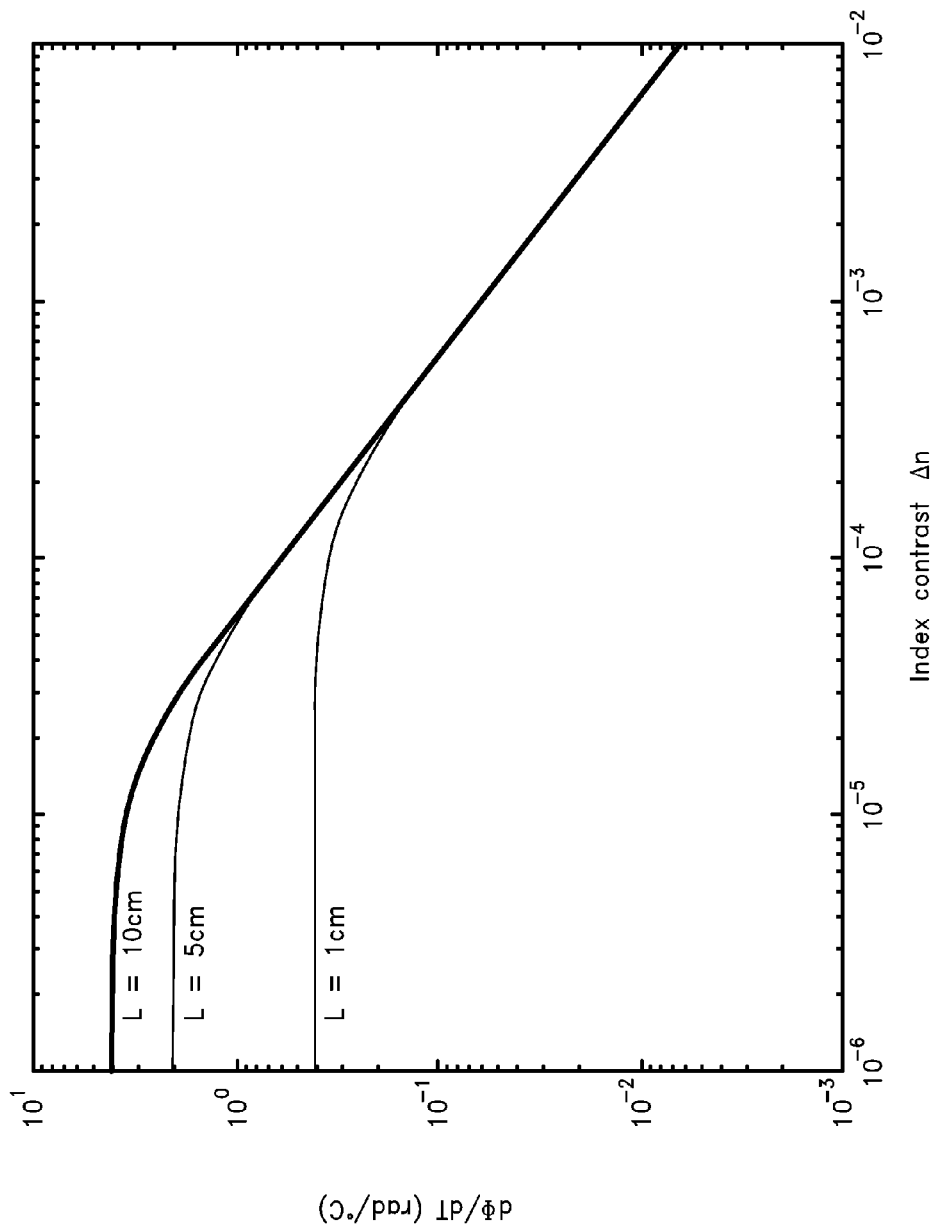
FIG. 4 illustrates the calculated maximum sensitivity to temperature of the Bragg-reflection-mode FBG sensor of FIG. 2 as a function of index contrast for various FBG lengths for a wavelength of 1.55 microns, calculated assuming a lossless grating.

The discussion above assumes a certain arm length mismatch of 10 cm (which is applicable, for example, for a grating length of about 10 cm and a contrast below $10^{-5}$, see FIG. 3). In practice, the maximum possible imbalance is determined by the FBG's index contrast and length, according to FIG. 3, and it is less than 10 cm. FIG. 4 illustrates the sensitivity to temperature plotted as a function of index contrast for different grating lengths for a wavelength of 1.064 microns, calculated assuming a lossless grating. For a given grating length, the sensitivity increases as the index contrast decreases, up to an asymptotic maximum. This asymptotic maximum increases as the grating length increases. FIG. 4 shows that much smaller sensitivities result when a high contrast is used, even if the length of the device is increased.

FIG. 5 illustrates the sensitivity to temperature plotted as a function of grating length for different index contrast for a wavelength of 1.064 microns, calculated assuming a lossless grating. The phase sensitivity increases as the length of the grating increases, up to an asymptotic maximum. To achieve a high sensitivity in the Bragg-reflection mode, the FBG's index contrast can be selected to be low, and its length can be selected to be long. In addition, the maximum practical sensitivity is of the order of 10 rad/° C. (see FIG. 5), or a minimum detectable temperature of the order of $10^{-7}$° C.). Smaller values can be obtained by further reducing the index contrast and increasing the length, but at the price of a longer device.

The second limitation of the approach of FIG. 2 is that an imbalanced MZ interferometer is highly sensitive to temperature variations, and more so as the imbalance increases. As the signal propagates through each arm, it experiences a phase shift proportional to the length of this arm (e.g., $\phi_1=2\pi n L_1/\lambda_{Bragg}$ for arm 1). If the entire MZ interferometer is inadvertently subjected to a temperature change $\Delta T$, the phase of the signals in arm 1 and in arm 2 will vary by different amounts, and as a result the phase bias of the MZ interferometer will change. It is desirable to not allow this phase bias to vary too much, otherwise the sensitivity of the MZ interferometer will vary over time between the optimum value (for the optimum bias) and zero. Therefore, it is desirable to stabilize the temperature of the MZ interferometer. For larger length mismatches ΔL, this temperature control is desirably more tight, which is difficult to implement in practice. For example, consider the example of a fiber made of silica, with a signal wavelength of 1.064 μm, and an arm length mismatch of 10 cm. For the phase difference between the two arms to remain below ±0.02 rad (a reasonable bias stability requirement), the temperature could desirably be controlled to about ±0.003° C. This can be a significant engineering task, which increases the complexity, power consumption, and cost of the ultimate sensor system.

This same approach has also been used in other ways, for example by placing the FBG inside a laser cavity, as described in K. P. Koo and A. D. Kersey, "Bragg grating-based laser sensors systems with interferometric interrogation and wavelength division multiplexing," *J. Lightwave Technol.*, Vol. 13, Issue 7 (July 1995), to increase the dependence of the wavelength shift on the perturbation applied to the FBG. However, the difficulty arising from the desire to stabilize the temperature of the imbalanced MZ interferometer remains the same. To summarize, a greater discrimination in variations of $\lambda_{Bragg}$ can be actuated by increasing the length mismatch, but this comes at the price of a greater instability in the MZ interferometer.

Certain embodiments described herein advantageously utilize new modes of operation of an FBG sensor. These new modes provide several substantial benefits over the previous utilization of FBGs as sensors in the Bragg-reflection mode, the largest of which being a greatly increased sensitivity to a measurand (example, a strain) for a given FBG length, and/or a greatly reduced FBG length for a given sensitivity. In certain embodiments, the sensitivity increase and/or the length reduction are in the range of a factor of 1 to several orders of magnitude.

Figure 6A:
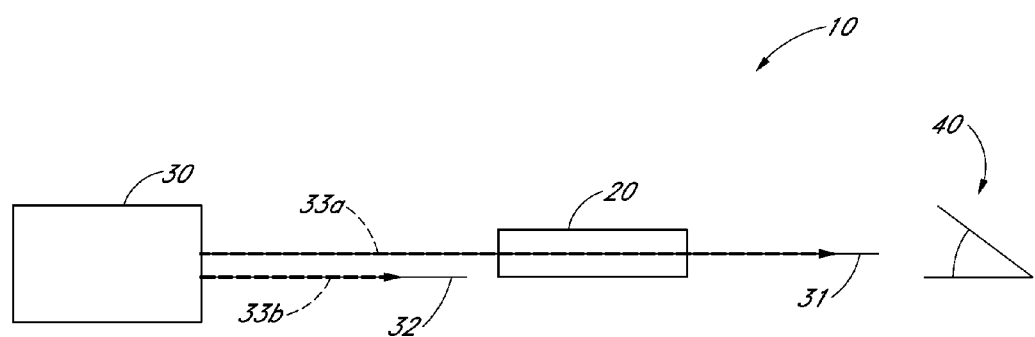
FIG. 6A is a schematic of an optical sensor in accordance with certain embodiments described herein.
Figure 6B:
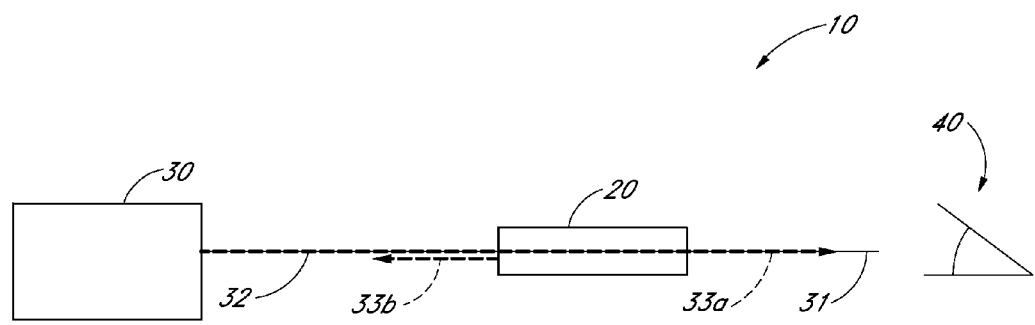
FIG. 6B is a schematic of an optical sensor in accordance with certain embodiments described herein.

Two example optical devices 10 in accordance with certain embodiments described herein are shown schematically in FIGS. 6A and 6B. In each of FIGS. 6A and 6B, an optical device 10 comprises an FBG 20 comprising a substantially periodic refractive index modulation along the length of the FBG 20. The FBG 20 has a power transmission spectrum comprising a plurality of local transmission minima. Each pair of neighboring local transmission minima has a local transmission maximum therebetween. The local transmission maximum has a maximum power at a transmission peak wavelength. The optical device 10 comprises a narrowband optical source 30 in optical communication with a first optical path 31 and a second optical path 32. The narrowband optical source 30 is configured to generate light having a wavelength between two neighboring local transmission minima. The wavelength is at or in the vicinity of a local transmission maximum, or is at or in the vicinity of a wavelength at which the power transmission spectrum has a maximum slope between a local transmission maximum and either one of the two local transmission minima neighboring the local transmission maximum.

As used herein, the term "at or in the vicinity of" with regard to a particular wavelength has its broadest reasonable interpretation, including but not limited to, at the particular wavelength or at a wavelength sufficiently close to the particular wavelength such that the performance of the optical device 10 is substantially equivalent to the performance of the optical device 10 at the particular wavelength. For example, for a wavelength to be "at or in the vicinity of" a particular wavelength can mean that the wavelength is within quantity Δ of the particular target wavelength, where Δ is a fraction of the FWHM linewidth of the transmission peak. This fraction can be, for example 1%, or 5%, or 10%, or 20%, depending on the application requirement. For example, for Δ=10%, if the FWHM linewidth is 2 pm, a wavelength within 0.2 pm of a particular target wavelength is considered to be in the vicinity of this target wavelength, and a wavelength that is 2 pm away from this target wavelength is not considered to be in the vicinity of this target wavelength.

In certain embodiments, the optical device 10 is an optical sensor and further comprises at least one optical detector 40 in optical communication with the FBG 20. The light generated by the narrowband optical source 30 is split into a first portion 33a and a second portion 33b. The first portion 33a is transmitted along the first optical path 31 extending along and through the length of the FBG 20. In certain embodiments, the at least one optical detector 40 is configured to receive the first portion 33a, the second portion 33b, or both the first and second portions 33a, 33b.

In certain embodiments, the wavelength of the light generated by the narrowband optical source 30 is at or in the vicinity of a transmission peak wavelength of a local transmission maximum such that the FBG 20 transmits a substantial fraction of the incident light from the narrowband optical source 30. In certain such embodiments, as schematically illustrated by FIG. 6A, the first portion 33a comprises light incident on the FBG 20 from the narrowband optical source 30 and transmitted along the FBG 20, and the second portion 33b comprises light which does not substantially interact with the FBG 20. The first portion 33a therefore is substantially affected by perturbations applied to the FBG 20 while the first portion 33a is transmitted along the FBG 20, while the second portion 33b is substantially unaffected by the perturbations applied to the FBG 20.

In certain other embodiments, the wavelength of the light generated by the narrowband optical source 30 is between a local transmission maximum and one of the two neighboring local transmission minima on either side of the local transmission maximum, such that the FBG 20 transmits a substantial fraction of the incident light from the narrowband optical source 30 and reflects a substantial fraction of the incident light from the narrowband optical source 30. In certain such embodiments, as schematically illustrated by FIG. 6B, the first portion 33a comprises light incident on the FBG 20 from the narrowband optical source 30 and transmitted along the FBG 20, and the second portion 33b comprises light which is reflected from the FBG 20. In certain embodiments, the first portion 33a therefore is substantially affected by perturbations applied to the FBG 20 while the first portion 33a is transmitted along the FBG 20, and the second portion 33b is substantially affected by the perturbations applied to the FBG 20 while the second portion 33b is reflected from the FBG 20.

As described more fully below, the light generated by the narrowband optical source 30 is selected to be at a wavelength at which the light transmitted along the FBG 20 has a slower group velocity than does light at most other wavelengths propagating through the FBG 20. For example, in certain embodiments, the wavelength of the light generated by the narrowband optical source 30 can be selected such that the ratio of the speed of light in vacuum (about $3 \times 10^5$ km/s) to the group velocity of the light transmitted through the FBG 20 is greater than 5, greater than 10, greater than 30, greater than 50, greater than 100, greater than 300, greater than 500, greater than 1,000, greater than 3,000, greater than 5,000, greater than 10,000, greater than 30,000, greater than 50,000, greater than 100,000, greater than 300,000, greater than 500,000, or greater than 1,000,000. In certain other embodiments, the wavelength of the light generated by the narrowband optical source 30 can be selected such that the ratio of the speed of light in vacuum (about 3×10⁵ km/s) to the group velocity of the light transmitted through the FBG 20 is between 5 and 10, between 5 and 30, between 10 and 50, between 30 and 100, between 50 and 300, between 100 and 500, between 300 and 1,000, between 500 and 3,000, between 1,000 and 5,000, between 3,000 and 10,000, between 5,000 and 30,000, between 10,000 and 50,000, between 30,000 and 100,000, between 50,000 and 300,000, between 100,000 and 500,000, between 300,000 and 1,000,000, between 500,000 and 3,000,000, or between 1,000,000 and 5,000,000.

In certain embodiments, the substantially periodic refractive index modulation in the FBG 20 has a constant period along the length of the FBG 20. In certain other embodiments, the substantially periodic refractive index modulation has a period that varies along the length of the FBG 20, as in chirped gratings. In some embodiments, the amplitude of the index modulation can vary along the length, as in apodized gratings.

The FBG 20 can be fabricated by exposing the core of an optical fiber to a spatially modulated UV beam, or by many other means. The index modulation can be sinusoidal, or take any number of other spatial distributions. In certain embodiments, the optical fiber is a conventional single-mode fiber such as the SMF-28® optical fiber available from Corning, Inc. of Corning, N.Y. However, the fiber in other embodiments is a multimode fiber. In certain other embodiments, the fiber is doped with special elements to make it substantially photosensitive (e.g., substantially responsive to UV light) such that exposure to a spatially varying light induces a desired modulation in the refractive index. The fiber can be made of silica, hydrogen-loaded silica, phosphate glass, chalcogenide glasses, or other materials.

The index perturbation or modulation of the grating in the FBG 20 can be weak (e.g., $\Delta n \approx 10^{-5}$) or very high (e.g., $\Delta n \approx 0.015$). The index grating of the FBG 20 is usually confined to the core, although in some cases it also extends into the cladding immediately surrounding the core. The FBG 20 is typically a few mm to a few cm in length, although the FBG 20 in excess of 1 meter in length or as short as 1 mm have been made.

In certain embodiments, the narrowband optical source 30 comprises a semiconductor laser, e.g., Er—Yb-doped fiber lasers with a wavelength range between 1530 nm-1565 nm from NP Photonics in Tucson, Ariz. In other embodiments, the narrowband optical source 30 comprises a Nd:YAG laser with a wavelength at 1064.2 nm. In certain embodiments, the narrowband optical source 30 has a linewidth less than or equal to $10^{-13}$ meters. Other wavelengths (e.g., 1.3 microns) and other linewidths are also compatible with certain embodiments described herein.

In certain embodiments, the light generated by the narrowband optical source 30 is split into a first portion 33a and a second portion 33b. The first portion 33a is transmitted along the first optical path 31 extending along the length of the FBG 20. The second portion 33b is transmitted along the second optical path 32 not extending along the length of the FBG 20. In certain embodiments, as shown in FIG. 6A, the first optical path 31 is different from the second optical path 32. For example, as shown in FIG. 6A, the first optical path 31 does not overlap the second optical path 32. For certain other embodiments, the first optical path 31 and the second optical path 32 may overlap one another. For example, as shown in FIG. 6B, the first optical path 31 and the second optical path 32 both include a common portion between the narrowband optical source 30 and the FBG 20. In certain embodiments, the first optical path 31 and/or second optical path 32 may transverse free space or various optical elements. For example, one or both of the first optical path 31 and the second optical path 32 could transverse an optical element, e.g., a fiber coupler as described more fully below. In certain embodiments, the first optical path 31 and/or the second optical path 32 may transverse regions with different refractive indices. For example, in FIG. 6A, the first optical path 31 transverses the FBG 20 having a substantially periodic refractive index modulation along the length of the FBG 20.

In certain embodiments, the optical device 10 comprises at least one optical detector 40 in optical communication with the FBG 20. The at least one optical detector 40 is configured to receive the first portion 33a of light, the second portion 33b of light, or both the first and second portions 33a, 33b of light. In certain embodiments, the optical detector 40 is a New Focus general purpose photodetector Model 1811, low-noise photodetector. However, the optical detector 40 may be one of a variety of low-noise photodetectors well known in the art, although detectors yet to be devised may be used as well.

In certain embodiments, a mode of operation, referred to herein as the slow-light transmission mode, can be used (e.g., with the structure schematically illustrated by FIGS. 6A and 7). In these embodiments, light with a narrowband spectrum is launched into the FBG 20, with a wavelength at (e.g., on or near) a wavelength where the FBG 20 mostly transmits, rather than mostly reflects, light. For example, the wavelength of the light is selected to be at (e.g., on or near) a transmission peak wavelength corresponding to a local transmission maximum of the power transmission spectrum of the FBG 20. The possible locations of these two wavelengths, referred to herein as $\lambda_1$ and $\lambda'_1$, is discussed in greater detail below, in particular in relation to FIGS. 9A-9H. At these wavelengths, light experiences a significant group delay, i.e., it travels with a much slower group velocity than the group velocity of light at wavelengths further away from the bandgap of the FBG 20. For example, slow-light group velocities can be as low as 300 km/s, while non-slow-light group velocities are typically around 207,000 km/s for light traveling in silica. Light with this slower group velocity in the vicinity of the edges of the bandgap of the FBG 20 is referred to herein as slow light. Slow light has been investigated previously in other contexts, in particular, to evaluate the potential use of an FBG for dispersion compensation, for example in optical communication systems. See, e.g., F. Ouellette, P. A. Krug, T. Stephens, G. Dhosi, and B. Eggleton, "Broadband and WDM dispersion compensation using chirped sample fibre Bragg gratings," *Electronic Letters*, Vol. 31, No. 11 (May 1995).

In certain embodiments, a benefit of the slow-light transmission mode of operation is that in the vicinity of a slow-light wavelength, e.g., $\lambda_1$ or $\lambda'_1$, the power transmission has a local maximum (e.g., it can be close to or equal to 1). Consequently, the loss experienced by the signal as it propagates along or through the FBG 20 is small. In certain embodiments, another benefit is that at or in the vicinity of either one of the slow-light wavelengths $\lambda_1$ and $\lambda'_1$, a perturbation (e.g., a strain) applied to the FBG 20 on light traveling through the FBG 20 modifies the phase of the light traveling through the FBG 20, not its amplitude. To be more exact, in certain embodiments, the perturbation modifies to first order the phase of light, and to second order the amplitude of the light. This is in contrast to the Bragg-reflection mode of an FBG, in which the perturbation to the FBG modifies the frequency of the light that is maximally reflected. Consequently, in certain embodiments using the slow-light transmission mode (e.g., FIGS. 6A and 7), the FBG 20 can serve as a phase sensor, e.g., it can be placed directly in one of any number of interferometers to convert the phase modulation induced by the perturbation (the measurand) into a power change (which is the quantity the user measures).

FIG. 7 schematically illustrates an example configuration comprising a nominally balanced MZ interferometer. The configuration of FIG. 7 is an example of the general configuration schematically shown in FIG. 6A. In FIG. 7, the optical device or sensor 10 comprises a first fiber coupler 51 in optical communication with the narrowband light source 30, the first optical path 31, and a second optical path 32 not extending along and through the FBG 20. The light generated by the narrowband optical source 30 is split by the first fiber coupler 51, e.g., with a 3-dB power-splitting ratio, into the first portion 33a and the second portion 33b. In this embodiment, the first portion 33a is transmitted along the first optical path 31, and the second portion 33b is transmitted along the second optical path 32. The first portion 33a propagates along the FBG 20 while the second portion 33b does not substantially interact with the FBG 20. In this embodiment, the first portion 33a includes information regarding the perturbation of the FBG 20, while the second portion 33b remains unaffected by such perturbation.

In FIG. 7, the optical sensor 10 further comprises a second fiber coupler 52, e.g, with a 3-dB power-splitting ratio, in optical communication with the first optical path 31 and the second optical path 32. The first portion 33a and the second portion 33b are recombined by the second fiber coupler 52 and transmitted to the at least one optical detector 40. This recombination allows the first portion 33a and the second portion 33b to interfere with one another, producing a combined signal that contains information regarding the phase difference between the first portion 33a and the second portion 33b. In certain embodiments, the at least one optical detector 40 comprises a single optical detector at one of the output ports of the second fiber coupler 52. In certain other embodiments, as schematically illustrated by FIG. 7, the at least one optical detector 40 comprises a first optical detector 40a at one output port of the second fiber coupler 52 and a second optical detector 40b at the other output port of the second fiber coupler 52. The signals detected by these two optical detectors 40a, 40b vary in opposite directions from one another (e.g., when the detected power at one output port of the second fiber coupler 52 increases, the detected power at the other output port of the second fiber coupler 52 decreases) and the difference between the outputs from the two optical detectors 40a, 40b can be used as the sensor signal. Such a detection scheme can provide various advantages, including common mode rejection and a higher signal. In certain embodiments, the phase difference is indicative of an amount of strain applied to the FBG 20. In certain other embodiments, the phase difference is indicative of a temperature of the FBG 20.

In certain embodiments, using a balanced MZ interferometer configuration with slow light, as schematically illustrated by FIG. 7, allows precise detection and measurement of the perturbation applied to the FBG by detecting and measuring the phase difference between the first portion 33a and the second portion 33b. In contrast, in the Bragg-reflection mode, a wavelength (or frequency) change is detected (e.g., as shown in FIG. 1) or is converted into a power change, which, for high precision, can be done by stabilizing an imbalanced interferometer (e.g., as shown in FIG. 2). Also, in certain embodiments, use of a balanced MZ interferometer in the slow-light transmission mode advantageously avoids the high sensitivity to temperature of an imbalanced MZ interferometer, resulting in a great improvement in the temperature stability of the MZ interferometer, and therefore of its phase bias. This also simplifies engineering considerably by reducing the amount of temperature control to be used.

When light travels through a medium and the group velocity is low, the matter-field interaction is increased. Since it takes a longer time for the light to travel through the medium, the compression of the local energy density gives rise to enhanced physical effects, including phase shift. The induced phase dependence on dk shift is significantly enhanced when the group velocity $v_g = d\omega/dk$ is small. As shown in M. Soljačić, S. G. Johnson, S. Fan, M. Ibanescu, E. Ippen, and J. D. Joannopoulos, "Photonic-crystal slow-light enhancement of nonlinear phase sensitivity," *JOSA B*, Vol. 19, Issue 9 (September 2002), this effect can be quantified by relating the phase shift to the group velocity:

$$\delta\phi = L \times \delta k \approx L^* \delta\omega(d\omega/dk) \qquad (6)$$

This relationship states that the phase shift is inversely proportional to the group velocity $v_g = d\omega/dk$, or is proportional to the group index $n_g = c/v_g$, where c is the speed of light in vacuum. The main benefit of operating in this slow-light transmission mode in accordance with certain embodiments described herein, as stated without demonstration earlier, is that everything else being the same, a given perturbation will induce a much larger phase perturbation in a device in which light has a low group velocity than in a device in which light has a high group velocity. As demonstrated below with numerical simulations, an optical sensor 10 comprising an FBG 20 operated in the slow-light transmission mode in accordance with certain embodiments described herein can therefore exhibit a far greater sensitivity to any measurand that alters the phase of a signal traveling in the grating.

The Mach-Zehnder (MZ) interferometer in the configuration of FIG. 7 is only one of many interferometers that can be used to convert the phase shift induced by the perturbation on light traveling along the FBG 20 into an intensity change. Any interferometer that converts a phase modulation into an amplitude modulation can be used instead of a MZ interferometer. For example the interferometer can be a Michelson interferometer, a Fabry-Perot interferometer, or a Sagnac interferometer (if the perturbation is time-dependent). For example, in certain embodiments, the optical sensor 10 comprises a fiber loop (e.g., a Sagnac interferometric loop) comprising the fiber Bragg grating which is located asymmetrically. The first optical path extends in a first direction along the fiber loop, and the second optical path extends in a second direction along the fiber loop, the second direction opposite to the first direction. In certain such embodiments, the optical sensor 10 further comprises at least one fiber coupler optically coupled to the narrowband optical source and the fiber loop, wherein the light generated by the narrowband optical source is split by the at least one fiber coupler into the first portion and the second portion such that the first portion propagates along the first optical path and the second portion propagates along the second optical path. The first portion and the second portion are recombined by the at least one fiber coupler after propagating along and through the length of the fiber Bragg grating. The at least one optical detector comprises an optical phase detector configured to receive the recombined first and second portions and to detect the phase difference between the first portion and the second portion. Such a Sagnac configuration can be used to detect time-varying perturbations to the FBG 20. In certain embodiments, the at least one fiber coupler is configured to allow detection of the power at the reciprocal output port.

FIGS. 6B and 8 schematically illustrate a second mode of operation disclosed and referred to herein as the slow-light reflection mode. The configuration of FIG. 8 is an example of the general configuration schematically shown in FIG. 6B. The optical device 10 comprises an FBG 20. The FBG 20 comprises a substantially periodic refractive index modulation along a length of the FBG 20. The FBG 20 has a power transmission spectrum comprising a plurality of local transmission minima. Each pair of neighboring local transmission minima has a local transmission maximum therebetween. The local transmission maximum has a maximum power at a transmission peak wavelength. The optical sensor 10 comprises a narrowband optical source 30 in optical communication with a first optical path 31 and a second optical path 32. The narrowband optical source 30 is configured to generate light having a wavelength between two neighboring local transmission minima (e.g., between a local transmission maximum and a local transmission minimum next to the local transmission maximum). In certain embodiments, the optical device 10 is an optical sensor further comprising at least one optical detector 40a, 40b in optical communication with the FBG 20. The light generated by the narrowband optical source 30 is split by the FBG 20 into a first portion 33a and a second portion 33b. The first portion 33a is transmitted along the first optical path 31 extending along the length of the FBG 20. The second portion 33b is transmitted along the second optical path 32 and reflected from the FBG 20 and thus not extending along the length of the FBG 20, as schematically illustrated by FIG. 8. In certain embodiments, at least one optical detector 40a 40b is configured to receive the first portion 33a, the second portion 33b, or both the first and second portions 33a, 33b.

In the embodiment shown in FIG. 8, the light generated by the narrowband optical source 30 transverses a fiber coupler 51. However, unlike the embodiment shown in FIG. 7, the first optical path 31 and the second optical path 32 overlap one another. The first optical path 31 of FIG. 8 extends from the narrowband optical source 30, through the fiber coupler 51, and along and through the length of the FBG 20. The second optical path 32 of FIG. 8 extends from the narrowband optical source 30, through the fiber coupler 51, to the FBG 20 where the light is reflected back towards the fiber coupler 51. The transmitted first portion 33a is formed by light incident on the FBG 20 in a first direction and upon interacting with the FBG 20, some of this incident light constructively interferes forward (in the first direction). The reflected second portion 33b is formed by light incident on the FBG 20 in a first direction and upon interacting with the FBG 20, some of this incident light constructively interferes backwards (in a second direction opposite to the first direction). In this embodiment, the second portion 33b does not propagate along the FBG 20 because it is reflected from the FBG 20. The optical detector 40b is configured to receive the first portion 33a, while the optical detector 40a is configured to receive the second portion 33b after the second portion 33b transverses back through the fiber coupler 51.

In certain embodiments, the FBG 20 is interrogated with a narrowband laser 30 and the first portion 33a is transmitted along the FBG 20 and the second portion 33b is reflected from the FBG 20. The wavelength of the light interrogating the FBG 20 is selected to be between a local transmission maximum of the power transmission spectrum (e.g., $\lambda_1, \lambda_2, \lambda_3, \lambda'_1, \lambda'_2, \lambda'_3$, or $\lambda_i$ or $\lambda'_i$ with $i \geq 1$, referring to FIGS. 9A and 9E, discussed more fully below) and a local transmission minimum next to the local transmission maximum. In certain such embodiments, the light incident on the FBG 20 has a wavelength $\lambda_A$ and $\lambda'_A$ at or in the vicinity of the steepest portion of the FBG 20 reflection peak (e.g., $\lambda_a, \lambda_b, \lambda_c, \lambda_d, \lambda_e, \lambda_f, \lambda'_a, \lambda'_b,$ $\lambda'_c, \lambda'_d, \lambda'_e, \lambda'_f$, or other such wavelengths between the wavelengths $\lambda'_i$ with $i \geq 1$, referring to FIGS. 9A and 9E, discussed more fully below).

For example, in certain embodiments, the FBG 20 reflects light in a range of wavelengths encompassing the Bragg wavelength from a first edge wavelength (e.g., the transmission peak wavelength $\lambda_1$ of a first local transmission maximum, discussed more fully below) to a second edge wavelength (e.g., the transmission peak wavelength $\lambda'_1$ of a second local transmission maximum, discussed more fully below). The reflected light has a maximum intensity at a reflection peak wavelength (e.g., the Bragg wavelength) within the bandgap (e.g., between the first edge wavelength and the second edge wavelength). The region between the two transmission peak wavelengths $\lambda_1$ and $\lambda'_1$ can be considered to be a local transmission minimum of the power transmission spectrum of the FBG 20. In certain such embodiments, the wavelengths can be selected to be on the edge of the resonance or slow-light peaks at which the power transmission is a selected fraction (e.g., about one-half, or in a range between ⅕ and ⅘) of the maximum value of the power transmission at the transmission peak wavelengths $\lambda_1$ and $\lambda'_1$ of the first or second local transmission maxima.

When an external perturbation is applied to the FBG 20, the reflection peak shifts in wavelength. This shift of $\lambda_{Bragg}$ results in a change in the first portion 33a transmitted by the FBG 20 and in the second portion 33b reflected by the FBG 20, for example, in the power of the reflected light at the wavelength of the light incident on the FBG 20. In certain embodiments, the at least one optical detector 40 comprises a photodiode 40a configured to receive and to detect the optical power of the second portion 33b. As shown in FIG. 8, the second portion 33b of the laser signal reflected by the FBG 20 is separated from the FBG's input port by a fiber coupler 51 (e.g., a fiber coupler with about a 3-dB power-splitting ratio), and the optical power of the second portion 33b is measured by a photodetector 40a. In certain embodiments, the at least one optical detector 40 comprises a photodiode 40b configured to receive and to detect the optical power of the first portion 33a. In FIG. 8, the change in power can be detected at the output of the FBG 20 with a photodetector 40b in optical communication with the output of the FBG 20.

In certain embodiments, the detected optical power is indicative of an amount of strain applied to the FBG 20. In certain other embodiments, the detected optical power is indicative of a temperature of the FBG 20.

In certain embodiments operating in a slow-light reflection mode, the signal experiences a slow group velocity as it travels through the FBG 20, although not quite as slow as certain embodiments in the slow-light transmission mode of FIG. 7. Certain such embodiments therefore also advantageously provide a greatly increased sensitivity over an FBG operated in the Bragg-reflection mode. In addition, because the slow-light reflection mode does not involve measuring a wavelength shift, unlike the Bragg-reflection mode (e.g., FIG. 2), it does not utilize an imbalanced MZ interferometer, thereby eliminating the issue of MZ interferometer thermal stability and simplifying the design significantly. In the slow-light reflection mode of operation, in accordance with certain embodiments described herein, the power transmission of the FBG 20 is not as high as in certain embodiments in the slow-light transmission mode. However, the transmission is still high (~70%, excluding losses, depending on details of the design), so that the loss experienced by the signal as it propagates through the FBG 20 is still small. Therefore, in certain embodiments, the optical power transmitted by the FBG 20 can be detected and measured (e.g., by the photodiode 40b) to measure the perturbation applied to the FBG 20.

The sensitivity of certain embodiments of an optical sensor 10 operated in one of the new reflection and transmission modes described herein depends directly on how slow the group velocity of the light can be made in the FBG 20. A number of computer simulations described below illustrate this principle and quantify the magnitude of the sensitivity improvement brought about by certain embodiments of these new modes of operation. For comparison, these simulations also model the sensitivity of an FBG, in the Bragg-reflection mode outlined above to a particular measurand, namely temperature. The results would have been substantially the same had the simulation modeled the effect of another measurand, such as a strain. These simulations utilized well-known expressions for the phase of a signal traveling through a grating of known parameters (see, e.g., A. Yariv and P. Yeh, *Optical waves in crystals: propagation and control of laser radiation*, pp. 155-214 (New York: Wiley 1984)), namely a sinusoidal index modulation with a period $\Lambda$ and an amplitude $\Delta n$, a grating length L, and a uniform, small temperature change $\Delta T$.

Figure 9A:
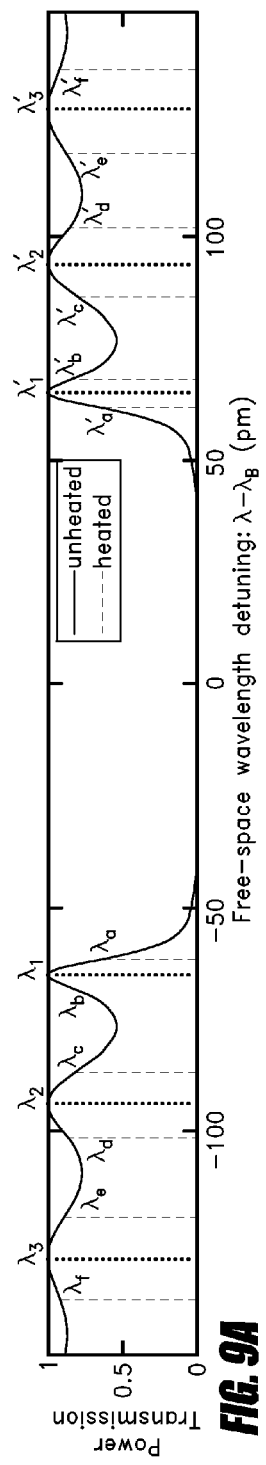

FIGS. 9A-9D show the calculated properties of a temperature sensor using a sinusoidal FBG with the following parameter values: $\Delta n=1.5\times10^{-4}$, L=1 cm, and $\Lambda=0.37$ µm (which gives a Bragg wavelength $\lambda_{Bragg}$ around 1.064 µm), calculated assuming a lossless grating. FIGS. 9E-9H show the calculated properties of a temperature sensor with a sinusoidal FBG with $\Delta n=2.0\times10^{-4}$, L=2 cm, loss=1 m$^{-1}$, and $\Lambda=0.53$ µm (which gives a Bragg wavelength $\lambda_{Bragg}$ around 1.55 µm), calculated assuming a lossless grating. FIGS. 9A and 9E illustrate the power transmission of this grating in the vicinity of $\lambda_{Bragg}$, calculated at two temperatures, namely room temperature (300K) (denoted in FIGS. 9A-9C and 9E-9G as unheated). For the Bragg wavelength of 1.064 microns shown in FIGS. 9A-9C, the heated curve corresponds to room temperature plus $\Delta T=0.01°$ C. For the Bragg wavelength of 1.55 microns shown in FIGS. 9A-9C, the heated curve corresponds to room temperature plus $\Delta T=0.01°$ C. Because the temperature change is very small, the heated and unheated curves of FIGS. 9A-9C and 9E-9G are so close to each other that they cannot be distinguished on the graphs. FIGS. 9A-9C and 9E-9G illustrate the wavelength dependence of the FBG power transmission, phase, and group index for the Bragg wavelengths of 1.064 microns and 1.55 microns, respectively. In the vicinity of $\lambda_{Bragg}$, the FBG acts as a reflector, and its transmission is expectedly close to zero, as shown by FIGS. 9A and 9E. This low transmittance region, where the reflectivity is high, constitutes approximately the bandgap of the FBG. The full width at half maximum (FWHM) of the bandgap of this grating for $\lambda_{Bragg}=1.064$ µm is approximately 126 pm, as shown by FIG. 9A, and the FWHM of the bandgap for $\lambda_{Bragg}=1.55$ µm is approximately 202 pm, as shown by FIG. 9E. Outside this bandgap region, the transmission reaches a first resonance peak, then it is oscillatory, with diminishing amplitudes, further away from $\lambda_{Bragg}$. Far enough from $\lambda_{Bragg}$ (outside the range shown in the figures), the transmission goes asymptotically to near unity.

As mentioned earlier, the first wavelength where the transmission reaches short a resonance peak is referred to herein as $\lambda_1$ (on the short wavelength side of $\lambda_{Bragg}$) and $\lambda'_1$ (on the long wavelength side $\lambda_{Bragg}$). The higher order wavelengths where the transmission reaches a resonance peak are referred to as $\lambda_i$ (on the short wavelength side of $\lambda_{Bragg}$) and $\lambda'_i$ (on the long wavelength side $\lambda_{Bragg}$), where i≥2. In certain embodiments, the narrowband optical source generates light having a wavelength at or in the vicinity of one of the local transmission maxima (e.g., also referred to herein as resonance peaks or slow-light peaks, and which can be denoted by $\lambda_1, \lambda_2, \lambda_3, \lambda_4$, etc., and $\lambda'_1, \lambda'_2, \lambda'_3, \lambda'_4$, etc.). In certain embodiments, the narrowband optical source generates light having a wavelength (denoted by $\lambda_a, \lambda_b, \lambda_d$, etc., and $\lambda'_a, \lambda'_b, \lambda'_c, \lambda'_d$, etc.) between one of the local transmission maxima (e.g., also referred to herein as resonance peaks or slow-light peaks, and which can be denoted by $\lambda_1, \lambda_2, \lambda_3, \lambda_4$, etc., and $\lambda'_1, \lambda'_2, \lambda'_3, \lambda'_4$, etc.) and a neighboring local transmission minimum.

For example, in certain embodiments in which the power transmission spectrum has a first local transmission maximum $\lambda_1$ between a first local transmission minimum comprising the Bragg wavelength and a second local transmission minimum on a short wavelength side of the Bragg wavelength, and a second local transmission maximum $\lambda_2$ between the second local transmission minimum and a third local transmission minimum on the short wavelength side of the Bragg wavelength, the wavelength of the light generated by the narrowband optical source can be selected to be between the first local transmission minimum and the second local transmission minimum, at the first local transmission maximum, between the first local transmission maximum $\lambda_1$ and either the first local transmission minimum or the second local transmission minimum, between the second local transmission minimum and the third local transmission minimum, at the second local transmission maximum, or between the second local transmission maximum and either the second local transmission minimum or the third local transmission minimum. Similarly, the wavelength can be selected to be on the short wavelength side of the Bragg wavelength at the third local transmission maximum, the fourth local transmission maximum, or between either the third or fourth local transmission maximum and a neighboring local transmission minimum.

As another example, in certain embodiments in which the power transmission spectrum has a first local transmission maximum $\lambda'_1$ between a first local transmission minimum comprising the Bragg wavelength and a second local transmission minimum on a long wavelength side of the Bragg wavelength, and a second local transmission maximum $\lambda'_2$ between the second local transmission minimum and a third local transmission minimum on the long wavelength side of the Bragg wavelength, the wavelength of the light generated by the narrowband optical source can be selected to be between the first local transmission minimum and the second local transmission minimum, at the first local transmission maximum, between the first local transmission maximum and either the first local transmission minimum or the second local transmission minimum, between the second local transmission minimum and the third local transmission minimum, at the second local transmission maximum, or between the second local transmission maximum and either the second local transmission minimum or the third local transmission minimum. Similarly, the wavelength can be selected to be on the long wavelength side of the Bragg wavelength at the third local transmission maximum, the fourth local transmission maximum, or between either the third or fourth local transmission maximum and a neighboring local transmission minimum.

Figure 9B:
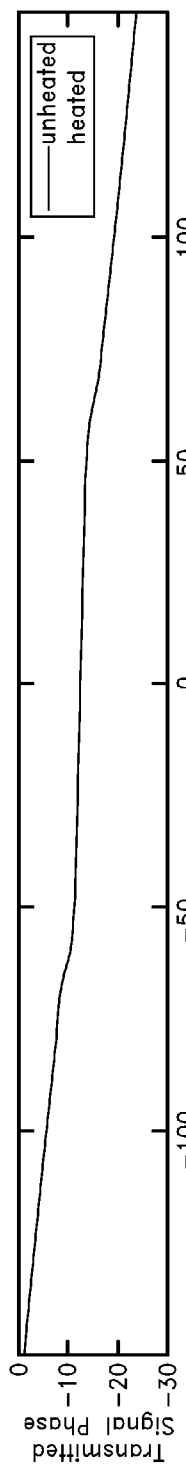

FIGS. 9B and 9F illustrate the calculated phase of a narrowband signal after it has traveled through this grating, as a function of wavelength. This calculation was again conducted for the temperatures used for FIGS. 9A and 9E. Around the particular wavelengths $\lambda_1$ and $\lambda'_1$, and $\lambda_2$ and $\lambda'_2$, the phase varies more rapidly with wavelength than around the center of the curve (around $\lambda_{Bragg}$, where the FBG reflects strongly). This increased dependence of phase on wavelength at or near the edge wavelength is the result of a larger group delay of the signal as it travels through the grating. In other words, in the vicinity, e.g., ±5 pm, of these two wavelengths the grating supports slow light.

Figure 9C:
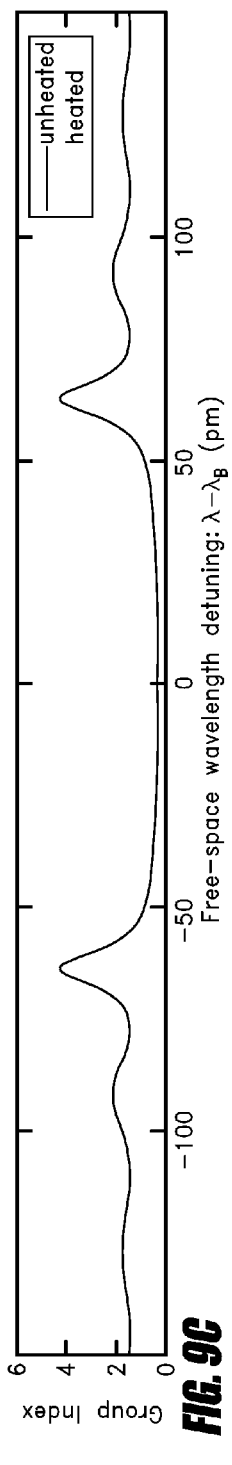

FIGS. 9C and 9G plot the group index of light traveling through this FBG calculated as a function of wavelength by applying Equation 6 to the phase dependence on wavelength of FIGS. 9B and 9F. FIGS. 9C and 9G illustrate that in the vicinity of $\lambda_1$ and $\lambda'_1$, the group index $n_g$ increases markedly. The same is true in the vicinity of other transmission resonances, such as $\lambda_2$ and $\lambda'_2$ shown in the figures, but also of other resonances $\lambda_i$ and $\lambda'_i$ outside of the range of wavelengths shown in the figures. Specifically, in the example grating with $\lambda_{Bragg}=1.064$ µm, $n_g$ reaches a value of about 4.2 at or near the edge wavelength. In the fiber, and in the FBG for wavelengths far from $\lambda_{Bragg}$, the group index of light is approximately c/n, or about 207,000 km/s (this value depends weakly on optical wavelengths). In contrast, around the two edge wavelengths, the group index is only about a factor of 4.2 smaller than the speed of light in free space, or about 71,400 km/s. In another example grating with $\lambda_{Bragg}=1.55$ µm, $n_g$ reaches a value of about 8.7 at or near the edge wavelength or a group velocity of about 34,500 km/s.

The power transmission spectrum, transmitted phase, and group index of an FBG with a sinusoidal index perturbation exhibiting the general behavior outlined in FIGS. 9A-9C had been previously reported in a different context. See M. Lee et al, "Improved slow-light delay performance of a broadband stimulated Brillouin scattering system using fiber Bragg gratings," *Applied Optics* Vol. 47, No. 34, pp. 6404-6415, Dec. 1, 2008. In this reference, the authors modeled, through numerical simulations, an FBG with similar parameters as used in FIGS. 9A-9C, namely a sinusoidal index modulation with a length L=2.67 cm, an index contrast $\Delta n$ of $10^{-4}$, and a grating period $\Lambda=533$ nm (a Bragg wavelength of 1550 nm). Their conclusion was that the light traveling through the FBG exhibits a group delay higher than normal when the frequency of the light is centered in the vicinity of the first transmission peak on the side of the Bragg wavelength reflection peak. This property was used in that reference to increase the group delay in an SBS-based optical delay line without increasing the power consumption, by adding one or two FBGs to the SBS delay line. However, this reference fails to recognize or teach that the group delay increases nonlinearly with length. In fact, the reference discloses that the group delay doubles when using two gratings instead of one, in contrast to aspects of certain embodiments described herein. In particular, as described more fully below, the group delay increases as a high power of the grating length. In addition, this reference remains silent on various aspects described herein, including but not limited to: (1) the desirability of increasing the index contrast in order to increase the group delay, (2) the phase accumulating faster at this wavelength, (3) the existence of other resonant wavelengths (where the grating transmission exhibits a local maximum) and the possibility of operating at these wavelengths, and (4) the use of an FBG as a sensor in the slow-light mode and its benefits, as well as means of optimizing its performance characteristics.

In certain embodiments described herein, the FBG is designed or configured to produce extremely large group delays, or equivalently, extremely large group indices, which results in extremely high sensitivity when this FBG is used as a sensor in one of the slow-light modes of operation described herein. In comparison, previous research on FBGs has produced relatively small group indices. For example, in M. Lee et al, previously cited, the maximum group index calculated from FIG. 2(a) in that reference is about 3.3. As another example, in Joe T. Mok et al, "Dispersionless slow light using gap solitons," *Nature Physics*, Vol. 21, pp. 775-780, November 2006, a group index of about 5 is reported in an apodized FBG of 10 cm length with an index contrast $\Delta n=1.53 \times 10^{-4}$. In contrast, certain embodiments described herein utilize a revolutionary concept that enables the production of FBGs with group indices in the range of several hundred, if not much higher, as described more fully below.

Certain embodiments described herein advantageously provide FBGs with considerably larger group index, in the range of 10 s to 100 s, or more. Such gratings can be used for producing fiber sensors with significantly increased sensitivity, with improvements of tens to hundreds, or more, compared to existing FBG-based sensors, for most measurands, as described below. They can also be used for any application utilizing or benefiting from a large group index, or a large group delay, including, but not limited to, solitons, group delay lines, dispersion compensation, and optical filters.

Figure 9D:
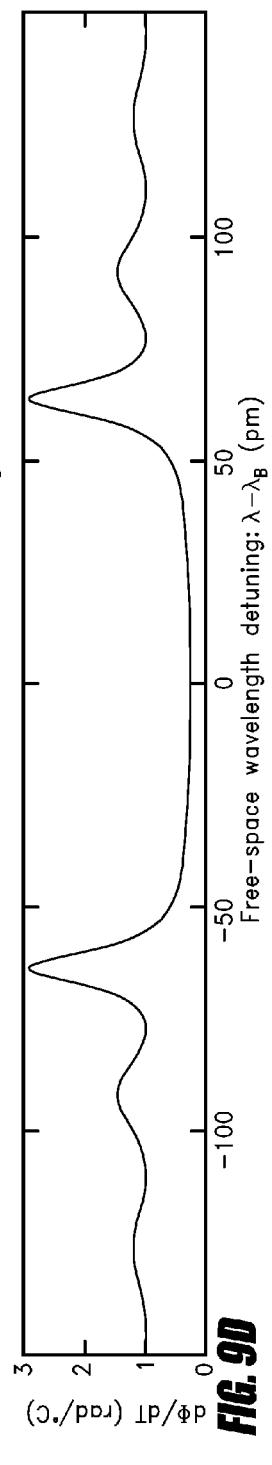

Based on Equation 6, and in the light of the group index value of about 4.2 that can be achieved with the FBG of FIGS. 9A-9C, or the group index value of about 8.7 that can be achieved with the FBG of FIGS. 9E-9G, the sensitivity of the slow-light FBG sensor in accordance with certain embodiments described herein is significantly greater than when this same FBG is used in the Bragg-transmission mode. FIGS. 9A-9C each show two curves for $\lambda_{Bragg}=1.064$ µm, each one calculated at two temperatures spaced by $\Delta T=0.01°$ C. and FIGS. 9E-9G each show two curves for $\lambda_{Bragg}=1.55$ µm, each one calculated at two temperatures spaced by $\Delta T=0.01°$ C. By taking the difference between the two phase curves of FIG. 9B and dividing by $\Delta T$, since $\Delta T$ is small, one obtains a close approximation of the derivative of the phase with respect to temperature $d\phi/dT$ for $\lambda_{Bragg}=1.064$ µm, as shown in FIG. 9D. Similarly, the difference between the two phase curves of FIG. 9F can be divided by $\Delta T$ to obtain a close approximation of the derivative of the phase with respect to temperature $d\phi/dT$ for $\lambda_{Bragg}=1.55$ µm, as shown in FIG. 9H. The maximum sensitivity occurs in the vicinity of $\lambda_1$ and $\lambda'_1$. At either of these wavelengths, the group index is 4.2 and the sensitivity $d\phi/dT$ is 2.9 rad/° C. for $\lambda_{Bragg}=1.064$ µm, and the group index is 8.7 and the sensitivity $d\phi/dT$ is 8.1 rad/° C. for $\lambda_{Bragg}=1.55$ µm. Hence at these slow-light wavelengths, the sensitivity to temperature is quite large.

Figure 10A:
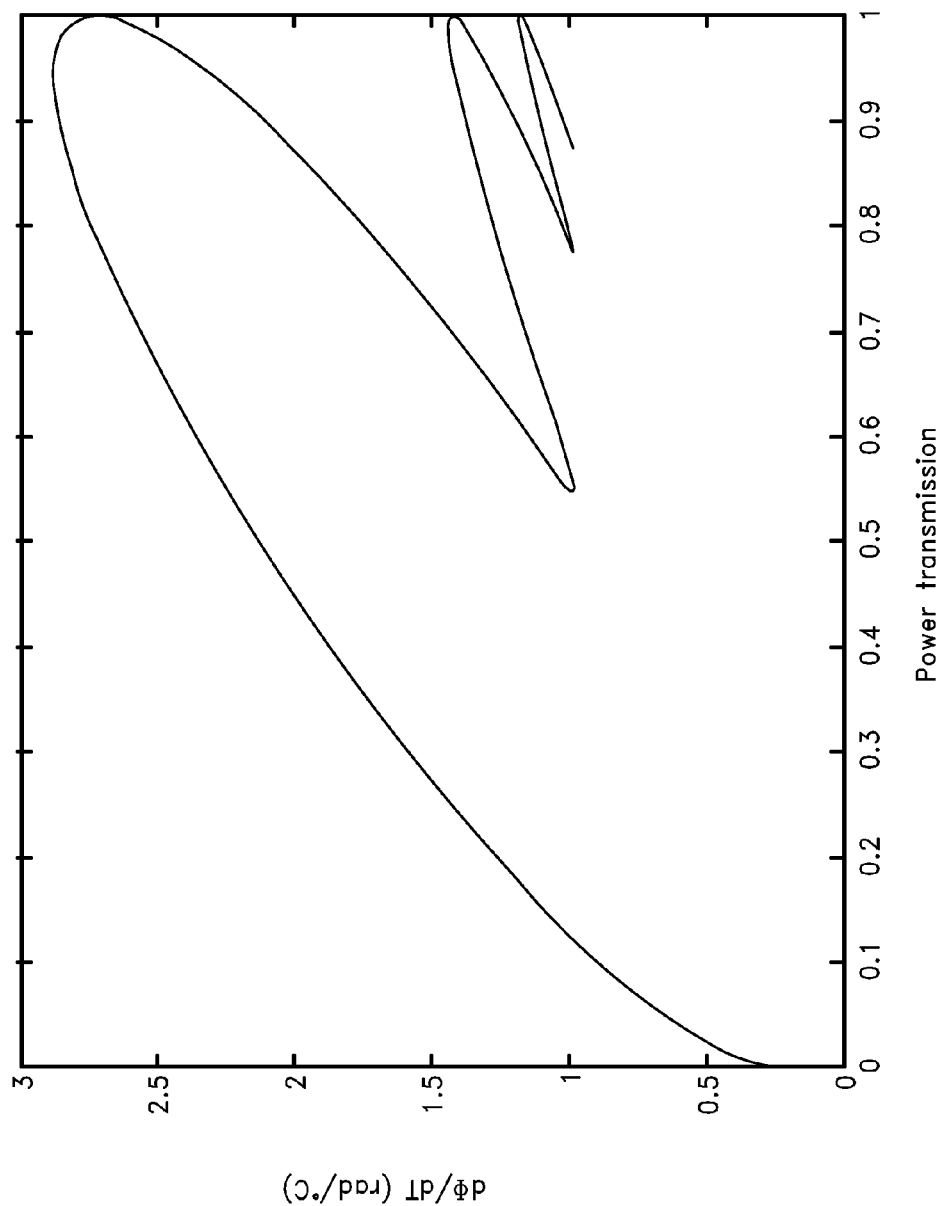
FIGS. 10A and 10B illustrate the relationship between phase sensitivity to temperature as a function of power transmission for an example FBG used in the transmission mode for $\lambda_{Bragg}$=1.064 μm and for $\lambda_{Bragg}$=1.55 μm, respectively, in accordance with certain embodiments described herein in the vicinity of slow-light wavelengths, calculated assuming a lossless grating.
Figure 10B:
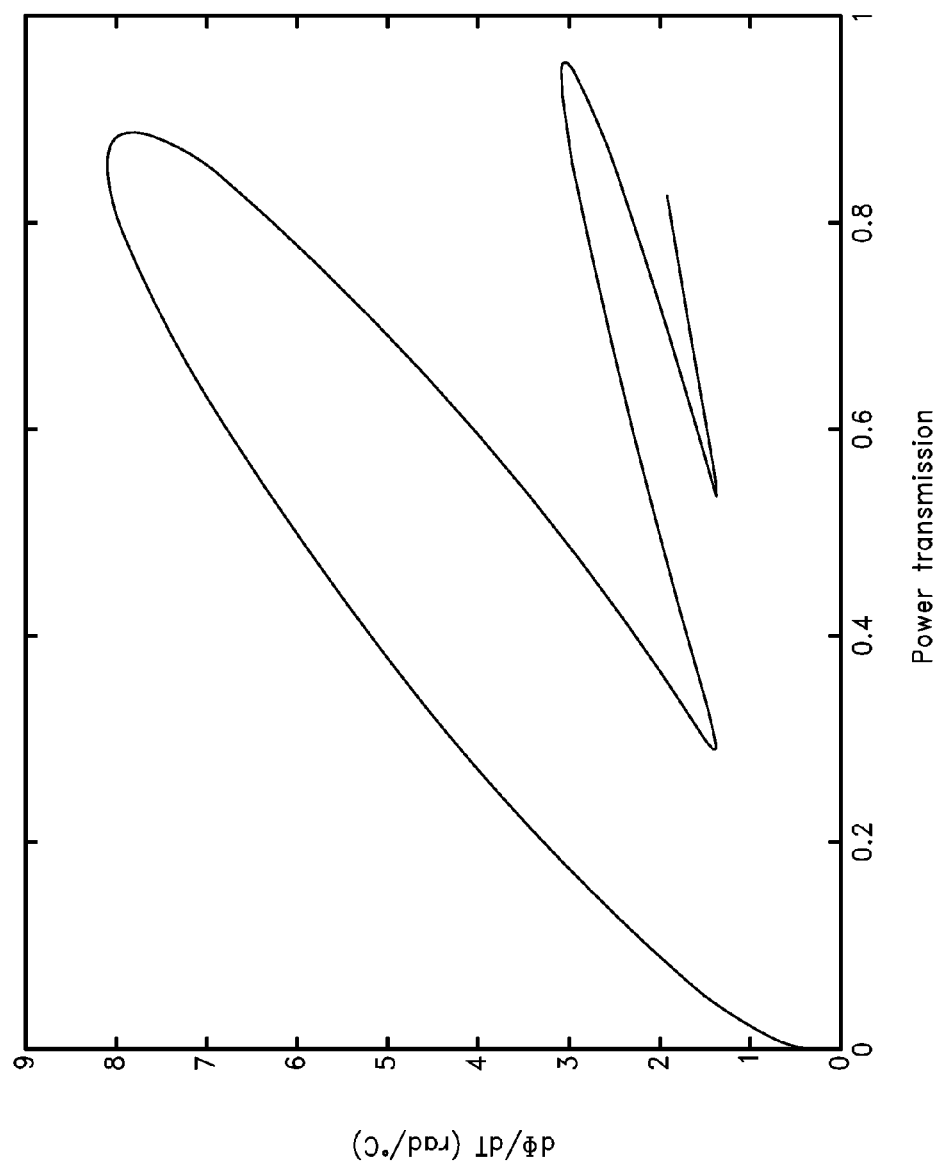

FIGS. 10A and 10B illustrate in greater detail the relationship between the phase sensitivity and the transmission for $\lambda_B=1.064$ µm and for $\lambda_B=1.55$ µm, respectively, calculated assuming a lossless grating. It shows that the sensitivity is maximum not exactly at $\lambda_1$ and $\lambda'_1$ (where the power transmission is equal to one), but in their vicinity. Since the transmission is by definition maximum (and equal to unity) at these two wavelengths, FIGS. 10A and 10B illustrate that (at least in these examples) there is not a single wavelength that maximizes both the transmission (which is desirable to minimize the loss experienced by the signal as it travels through the grating) and the group index (which is desirable to maximize the sensitivity). However, the wavelengths at which the transmission and group index are maximized are in the vicinity of one another, so the compromise to be made is relatively small. For example, for $\lambda_{Bragg}=1.064$ µm, at the first transmission resonance peak, the transmission is unity, the group index is 4.0, and the sensitivity $d\phi/dT$ is 2.6 rad/° C. At the wavelength where the group index is maximum (and equal to 4.2) the sensitivity is 2.85 rad/° C. and the transmission is equal to 94%. As another example, for $\lambda_{Bragg}=1.55$ µm, at the first resonance peak (transmission≈89%) the group index is 8.38, and the sensitivity $d\phi/dT$ is 7.84 rad/° C. At the wavelength where the group index is maximum (and equal to 8.7) the sensitivity is 8.1 rad/° C., and the transmission is equal to 85%. When loss is considered, the resonance peaks do not reach 100% power transmission. These values differ from their respective maxima by less than 10%, so in certain embodiments, the wavelength can be selected to maximize either the transmission or the group index, depending on criteria imposed by the specific application targeted. Regardless of the exact operating point, both the transmission and the group index (and thus sensitivity) are near their respective maximum over a comparatively broad range of wavelengths, which is a useful feature in certain embodiments, on both counts. This qualitative conclusion is valid for a very wide range of FBG parameter values, even for values that produce considerably higher group indices (for example, $10^5$) than are used in this particular numerical example.

Figure 11A:
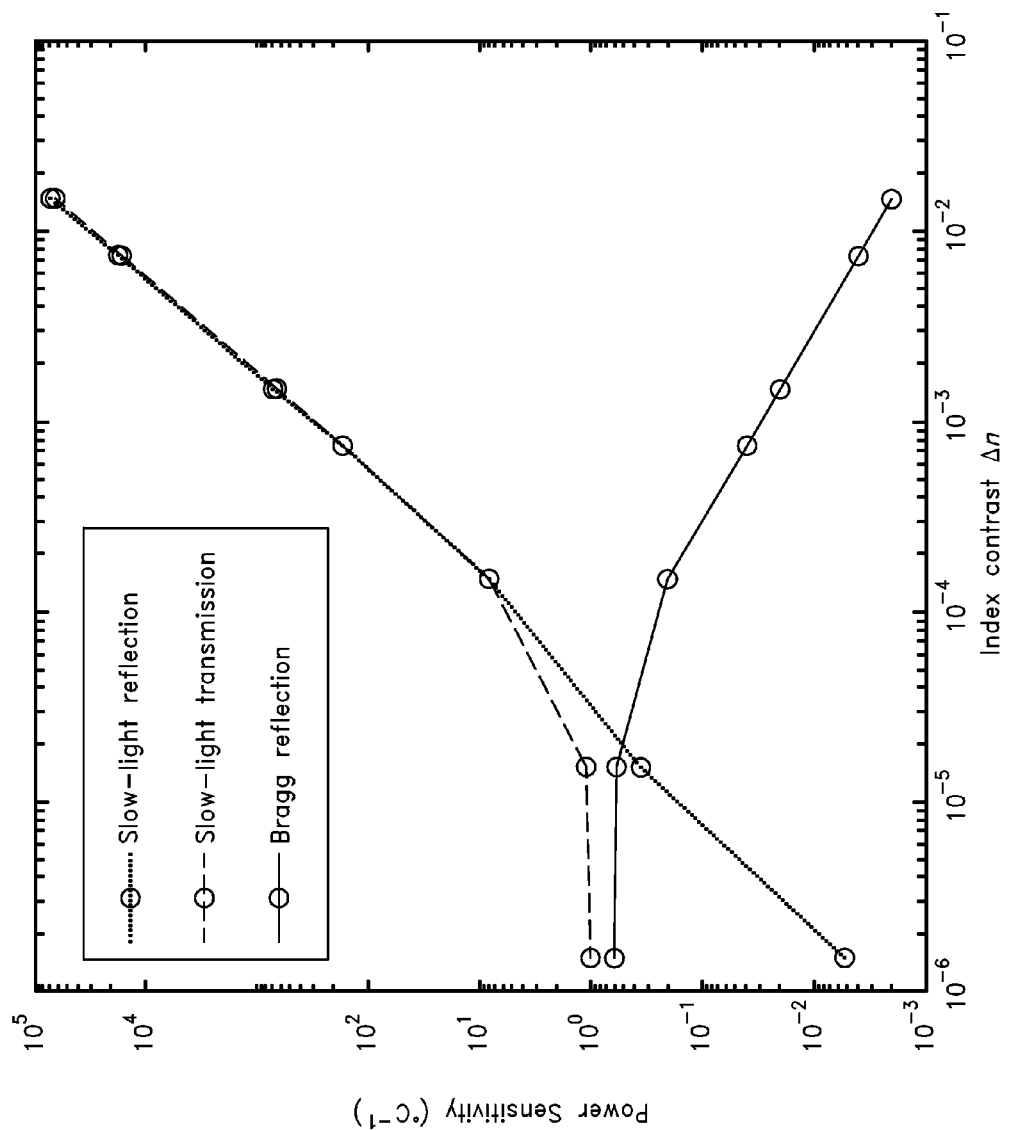
FIGS. 11A and 11B illustrate the relationship between power sensitivity to temperature as a function of index contrast for FBGs of fixed length (e.g., 2 cm) used in the slow-light transmission mode (dashed line) for $\lambda_{Bragg}$=1.064 μm and for $\lambda_{Bragg}$=1.55 μm, respectively, in accordance with certain embodiments described herein, in the slow-light reflection mode (dotted line) in accordance with certain embodiments described herein, and in the Bragg-reflection mode (solid line), calculated assuming a lossless grating.

The figures discussed above were generated by modeling an FBG with a given index contrast ($\Delta n=1.5\times 10^{-4}$ for $\lambda_{Bragg}=1.064$ μm and $\Delta n=2.0\times 10^{-4}$ for $\lambda_{Bragg}=1.55$ μm). As the index contrast is increased, the group delay increases further, and according to Eq. 6 the sensitivity to the measurand also increases. Since the $\Delta n$ of an FBG can be considerably higher than this modeled value, for example when the FBG is fabricated in a hydrogen-loaded fiber (e.g., $\Delta n$ of 0.015, see, e.g., P. J. Lemaire, R. M. Atkins, V. Mizrahi, and W. A. Reed, "High pressure $H_2$ loading as a technique for achieving ultrahigh UV photosensitivity and thermal sensitivity in $GeO_2$ doped optical fibres," *Electronic Letters*, Vol. 29, No. 13 (June 1993)), a substantial increase in group delay and sensitivity results from increasing $\Delta n$. To quantify this improvement, the sensitivity was computed as a function of index contrast for a grating used in the slow-light transmission configuration in accordance with certain embodiments described herein. The gratings are assumed to have zero loss in both wavelengths to illustrate dependence of group index and sensitivity on index modulation and length only. FIGS. 11A (for $\lambda_{Bragg}=1.064$ μm) and 11B (for $\lambda_{Bragg}=1.55$ μm) plot (i) this sensitivity of the slow-light transmission configuration at $\lambda_1$ or equivalently $\lambda'_1$ along with (ii) the sensitivity for a grating used in the slow-light reflection configuration at $\lambda_a$ or equivalently $\lambda'_a$ in accordance with certain embodiments described herein, and (iii) for a grating used in the Bragg-reflection configuration, calculated assuming a lossless grating. All three curves for each of FIGS. 11A and 11B were computed for an exemplary grating length L=2 cm. In order to perform this comparison, the phase sensitivity was converted into a power sensitivity in the slow-light transmission scheme as follows. When the MZ interferometer is phase biased for maximum sensitivity, the output power at one of the output powers of the interferometer is given as $P=P_0 \sin(\Delta\phi/2)$, when $P_0$ is the total output power (including both ports) and $\Delta\phi$ is the phase difference between the two arms. When a small perturbation $\delta\Delta\phi$ is applied to the FBG placed in one of the two arms of the MZ interferometer, the output power varies by $\delta P \approx P_0 \delta\Delta\phi/2$. Hence the power sensitivity of the sensor is, by definition:

$$\frac{1}{P_0}\frac{dP}{dT} = \frac{1}{2}\frac{d\phi}{dT} \quad (7)$$

In other words, it is equal to half the phase sensitivity used above as the metric for sensitivity.

In the slow-light transmission configuration, for a given grating length, below a certain index contrast, the sensitivity is constant. When the index contrast is large enough (typically above about $10^{-4}$), the sensitivity increases as a higher power of $\Delta n$. For example, for a grating length of 2 cm operating at 1.064 μm, the power sensitivity to temperature scales as $\Delta n^{1.95}$. As another example, for a grating length of 2 cm operating at 1.55 μm, the power sensitivity to temperature scales as $\Delta n^{1.99}$. In comparison, in the slow-light reflection configuration, the sensitivity grows monotonically as the index contrast is increased (see FIGS. 11A and 11B). For an index contrast above about $10^{-4}$ in this example, the sensitivity of the two slow-light schemes are extremely close to each other.

In contrast, FIGS. 11A (1.064 μm) and 11B (1.55 μm) also show that in the Bragg-reflection mode, below a certain index contrast (about $10^{-5}$ for this particular grating length) the sensitivity is constant, just as in the case of the slow-light transmission scheme. Above this index contrast, the sensitivity decreases. The reason for this decrease was discussed above. In these simulations, the sensitivity of the Bragg-reflection configuration was maximized by maximizing the length imbalance $\Delta L$ of the MZ interferometer (e.g., by making the length imbalance equal to the coherence length of the light reflected by the FBG). Since this coherence length depends on the index contrast of the FBG (see Equations 2 and 3), this value was adjusted for each value of $\Delta n$ used in the simulations. As the index contrast increases, the coherence length of the reflected light decreases, and the length imbalance $\Delta L$ decreases, therefore the sensitivity decreases (see Equation 5).

Figure 11B:
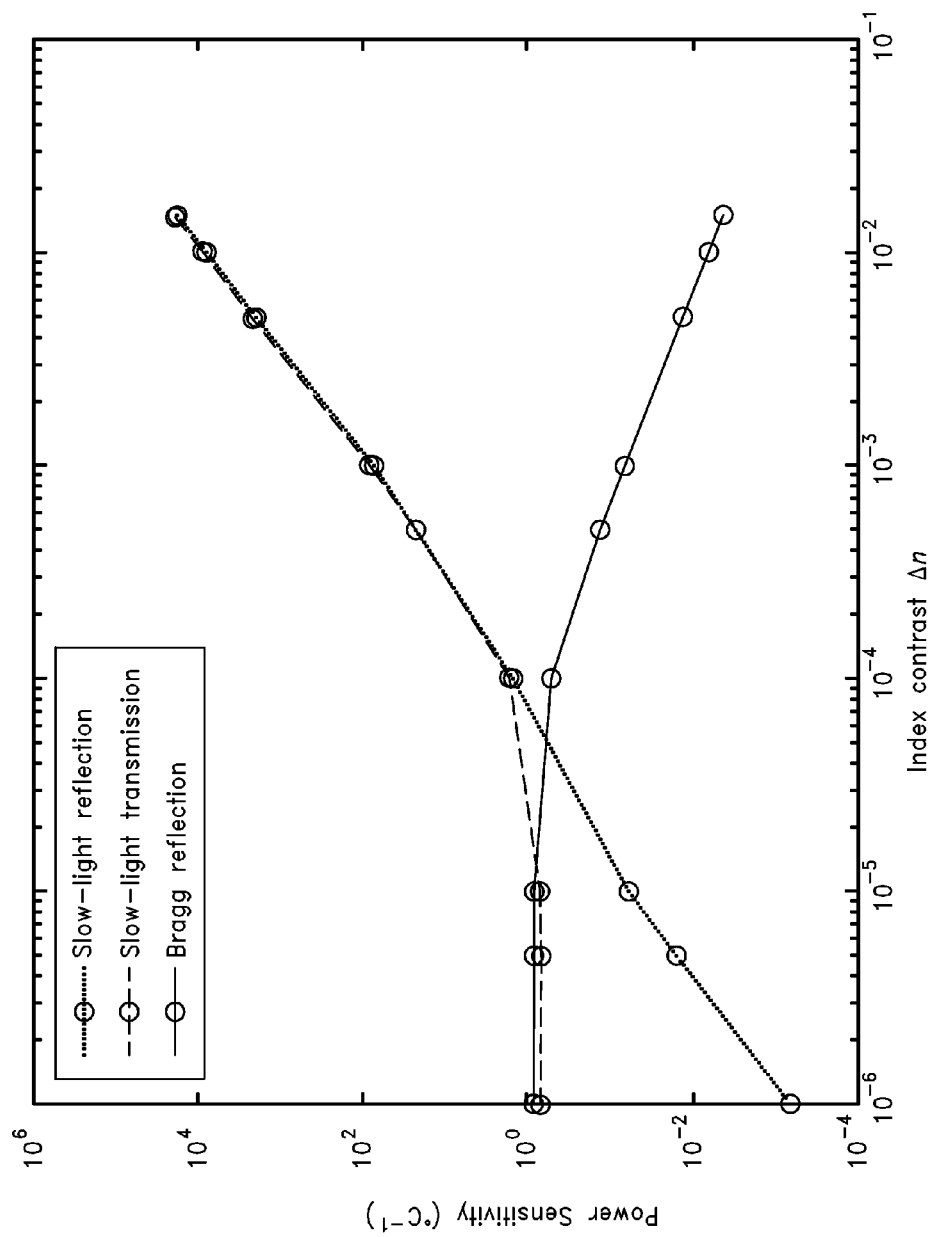

FIG. 11A shows that for $\Delta n$ of $1.5\times 10^{-2}$, which again is attainable in practice, (see, e.g. Lemaire et al.) the power sensitivity in the slow-light transmission and slow-light reflection schemes for $\lambda_{Bragg}=1.064$ μm is as high as $\sim 6.5\times 10^{4\circ}$ C.$^{-1}$ (upper end of the curve), corresponding to a phase sensitivity of $1.3\times 10^5$ rad/° C. This is nearly 110,000 times higher than the best value predicted for a grating (L=2 cm, $\Delta n=10^{-5}$) operated in the Bragg-reflection mode (1.18 rad/° C.). FIG. 11B shows that for $\Delta n$ of $1.5\times 10^{-2}$, the power sensitivity in the slow-light transmission and slow-light reflection schemes for $\lambda_{Bragg}=1.55$ μm is as high as $\sim 1.9\times 10^{4\circ}$ C.$^{-1}$, corresponding to a phase sensitivity of $3.8\times 10^4$ rad/° C. This is $\sim 46,000$ times higher than the best value predicted value for a grating (L=2 cm, $\Delta n=10^{-5}$) operated in the Bragg-reflection mode (0.82 rad/° C.).

Figure 12A:
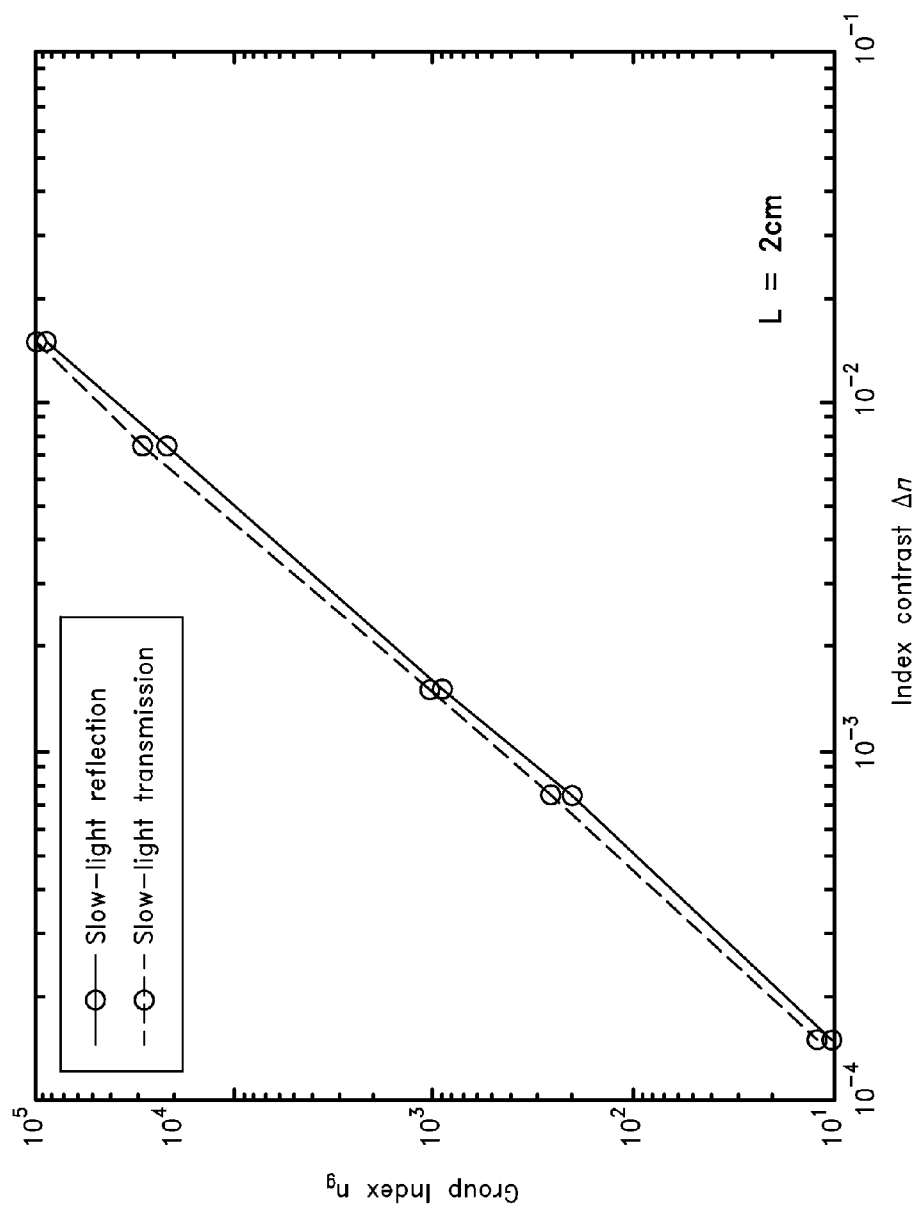
FIGS. 12A and 12B illustrate the group index calculated as a function of index contrast Δn for an FBG of fixed length (2 cm) used in the slow-light reflection mode (solid line) and the slow-light transmission mode (dashed line) for $\lambda_{Bragg}$=1.064 μm and for $\lambda_{Bragg}$=1.55 μm, respectively, in accordance with certain embodiments described herein, calculated assuming a lossless grating.
Figure 12B:
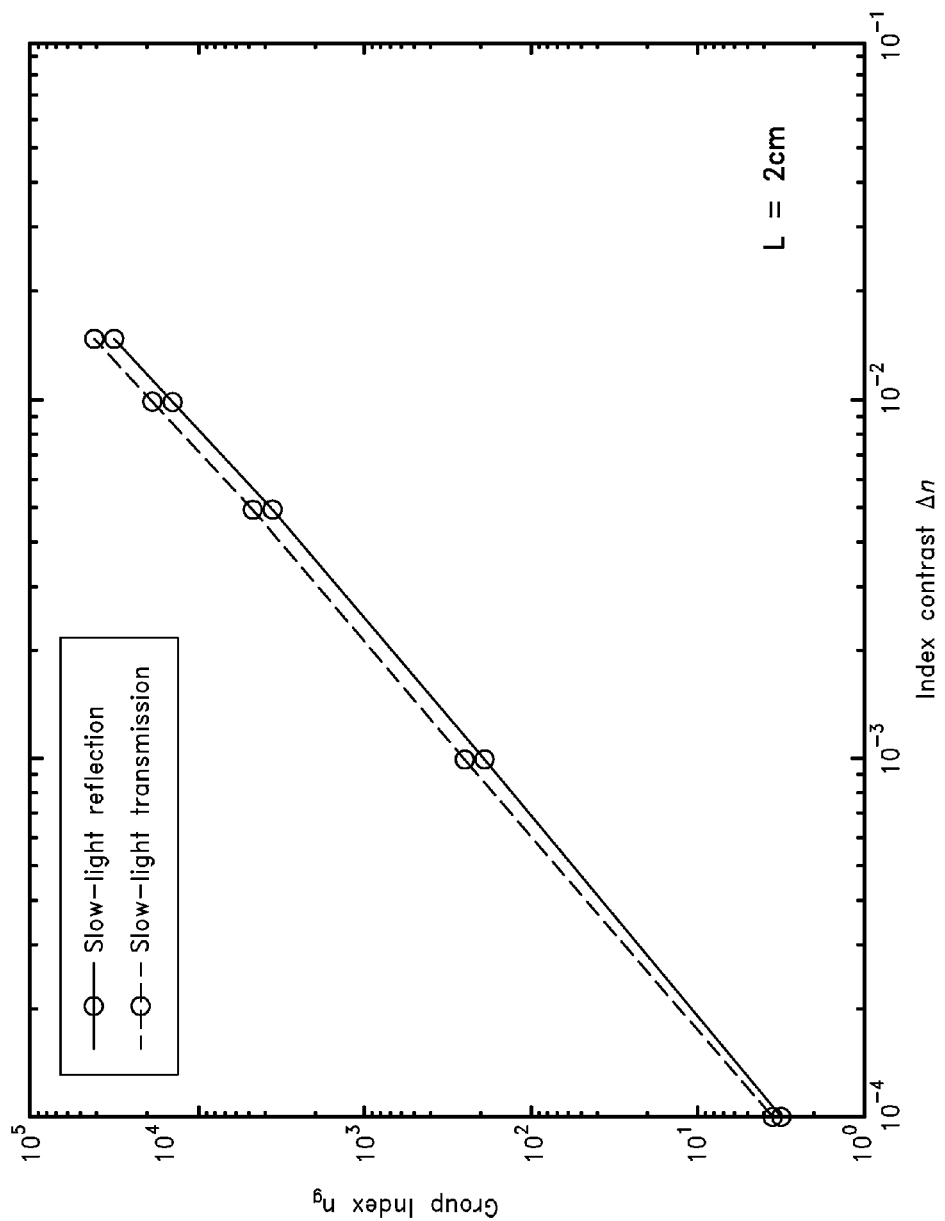

The reason why the two slow-light configurations exhibit almost the same sensitivity for large $\Delta n$ (see FIGS. 11A and 11B) is that the group index of light used at wavelength $\lambda_1$ (or $\lambda'_1$) in the slow-light transmission configuration and light used at $\lambda_2$ (or $\lambda'_2$) in the slow-light reflection configuration are almost the same. This can be seen in FIGS. 12A (1.064 μm) and 12B (1.55 μm), which plot the group index calculated as a function of $\Delta n$ for an FBG of length L=2 cm, calculated assuming a lossless grating. These plots were again computed at $\lambda_1$ (or equivalently $\lambda'_1$) for the transmission mode, and $\lambda_a$ (or equivalently $\lambda'_a$) for the reflection mode. The slow-light reflection and slow-light transmission configurations produce almost the same group index, the latter being only slightly smaller for the reflection configuration. In both schemes, the group index increases with $\Delta n$ approximately as $\Delta n^{1.95}$. In the slow-light reflection scheme, the signal wavelength is more strongly detuned from the wavelength that produces the slowest light than it is in the slow-light transmission scheme. FIG. 12A also demonstrates that it is possible to achieve extremely slow light in an optical fiber grating with $\lambda_{Bragg}=1.064$ μm. In this example, the maximum practical $n_g$, which occurs for an FBG with a $\Delta n$ of 0.015 (hydrogen-loaded FBG), is around $10^5$. This corresponds to a group velocity of only 3,000 m/s. It is about 20,000 times slower than previously demonstrated in an FBG, experimentally or through simulations. By increasing the FBG length from 2 cm (the value used in this simulation) to 10 cm, this group-index figure is increased by approximately $5^{1.99} \approx 25$, to 2.5 million—a group velocity of 120 m/s. In the example shown in FIG. 12B for $\lambda_{Bragg}=1.55$ µm, again for both schemes the group index increases with $\Delta n$ approximately as $\Delta n^{1.99}$. The maximum practical $n_g$, which occurs for an FBG with a $\Delta n$ of 0.015 (hydrogen-loaded FBG), is around $4.2 \times 10^4$. This corresponds to a group velocity of only 7,100 m/s. It is about 8,000 times slower than previously demonstrated in an FBG, experimentally or through simulations. By increasing the FBG length from 2 cm to 10 cm, this figure is increased to approximately one million—a group velocity of 300 m/s. This property has tremendous implications for a large number of applications, including all of the aforementioned applications (e.g., including but not limited to, optical data storage, optical buffers, delays of optical data or pulses). Thus, in certain embodiments, the optical device 10 is an optical data storage device, an optical buffer, or an optical delay device.

Figure 13A:
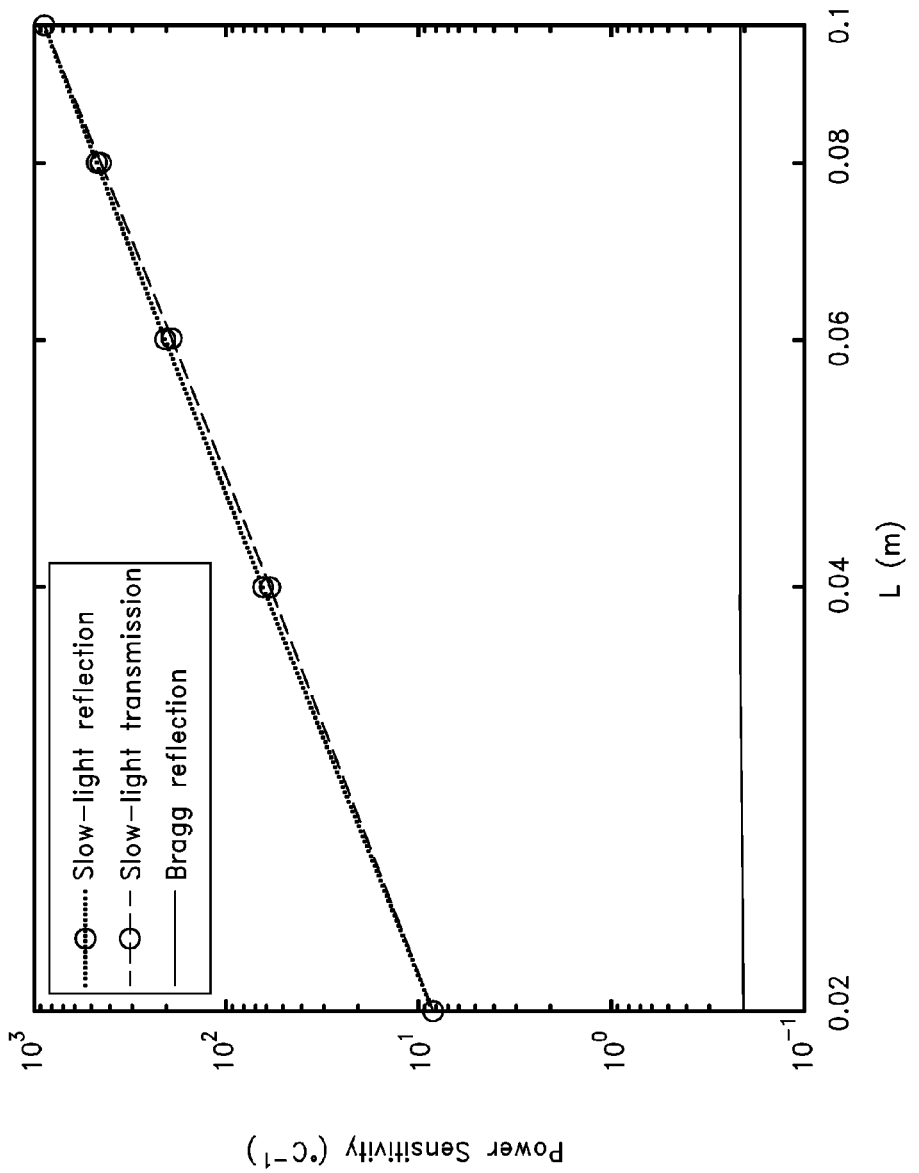
FIGS. 13A and 13B illustrate the relationship between the power sensitivity to temperature as a function of length for an FBG of fixed index contrast ($1.5\times10^{-4}$) for the slow-light reflection mode (dotted line) and the slow-light transmission mode (dashed line) for $\lambda_{Bragg}$=1.064 μm and for $\lambda_{Bragg}$=1.55 μm, respectively, in accordance with certain embodiments described herein, and the Bragg reflection mode (solid line), calculated assuming a lossless grating.

To determine the effect of the length of the FBG on the sensitivity, FIGS. 13A (1.064 µm) and 13B (1.55 µm) were generated showing the power sensitivity versus grating length for a fixed $\Delta n$ of $1.5 \times 10^{-4}$ in accordance with certain embodiments described herein, calculated assuming a lossless grating. For the slow-light transmission scheme (evaluated here again at $\lambda_1$ or equivalently $\lambda'_1$), the phase sensitivity for operation at 1.064 µm scales approximately as $L^{2.35}$. This dependence is not exactly universal, but close. For example, identical simulations (e.g., using the calculation scheme of Yariv and Yeh) carried out with a $\Delta n=7.5 \times 10^{-4}$ yielded a sensitivity that varied as $L^{2.98}$. When $\Delta n$ is further increased to $1.5 \times 10^{-3}$, the sensitivity grows as $L^{2.97}$. These figures also depend on the exact spatial profile of the index modulation (sinusoidal, square, etc.). The conclusion is nevertheless that the sensitivity depends rapidly on length. For operation of the slow-light transmission scheme at 1.55 µm, the phase sensitivity scales approximately as $L^{2.89}$. For the slow-light reflection scheme (evaluated here again at $\lambda_a$ or equivalently $\lambda'_a$) at 1.064 µm, the sensitivity also grows as $L^{2.91}$, which is similar to the relationship seen in the slow-light transmission scheme. For the slow-light reflection scheme at 1.55 µm, the sensitivity also grows as $L^{2.85}$.

Figure 13B:
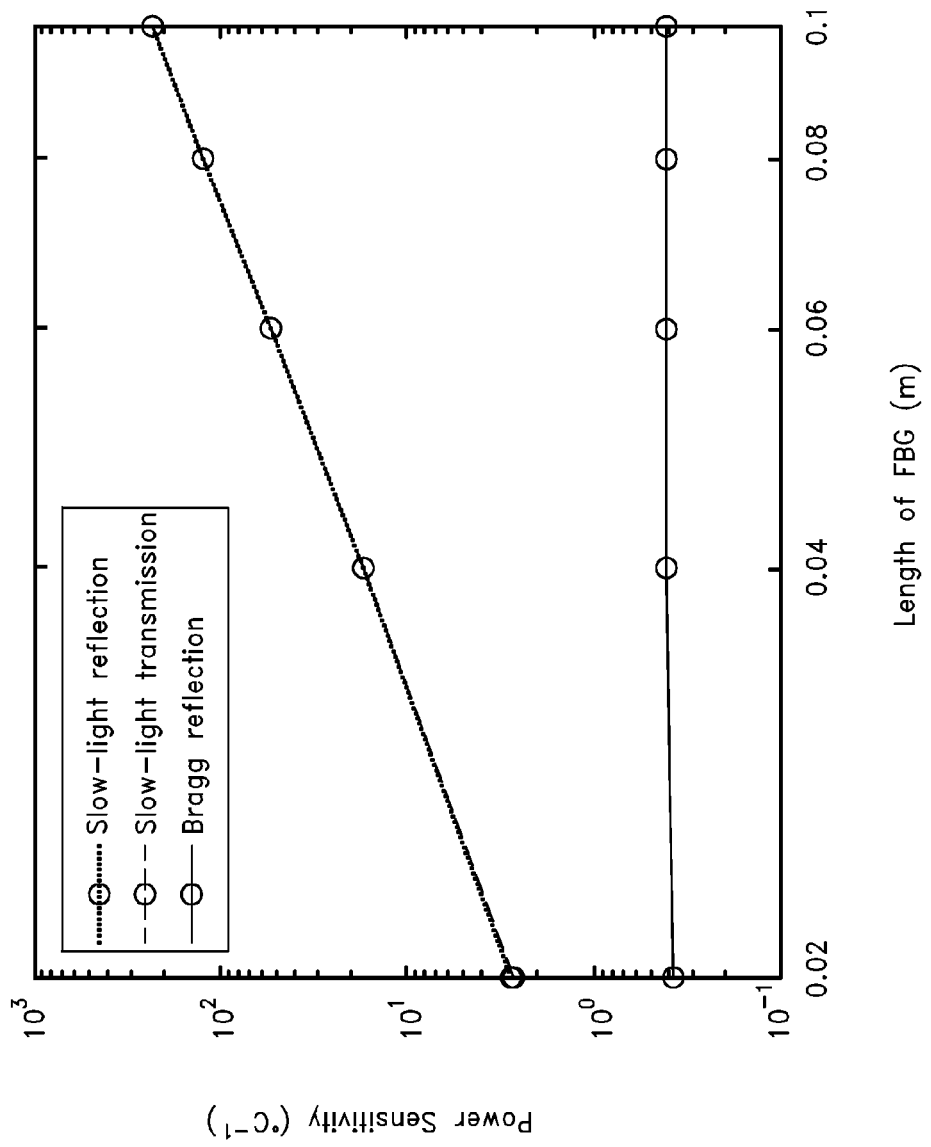

In the above example of an FBG with $\lambda_{Bragg}=1.064$ µm, $\Delta n$ of $1.5 \times 10^{-4}$, and a length of 2 cm, the power sensitivity in the slow-light transmission mode was $\sim 8°$ C.$^{-1}$. FIG. 13A shows that when increasing the length of this grating from 2 cm to 10 cm (an example high value deemed reasonable to use in a reflection grating, see FIG. 4), this power sensitivity increases to 877° C.$^{-1}$. These figures illustrate the dramatic improvement in sensitivity that can be obtained by increasing the length and/or the index contrast of an FBG operated in the slow-light transmission mode in accordance with certain embodiments described herein. For the other example at 1.550 µm shown in FIG. 13B, for an FBG with a $\Delta n$ of $1.5 \times 10^{-4}$ and a length of 2 cm, the power sensitivity in the slow-light transmission mode was $\sim 2.7°$ C.$^{-1}$. FIG. 13B shows that when increasing the length of this grating from 2 cm to 10 cm, this power sensitivity increases to 243° C.$^{-1}$.

In certain embodiments the length L and index contrast $\Delta n$ can be selected to provide a group index $n_g$ greater than 10, greater than 20, greater than 30, greater than 40, greater than 50, greater than 100, greater than 500, greater than 1,000, greater than 5,000, or greater than 10,000.

In one embodiment, the FBG is placed in one arm of a MZ interferometer, for example made of optical fiber, as depicted in FIG. 7. The MZ interferometer of certain embodiments is substantially balanced, except for the purpose of biasing the two arms (e.g., $\pi/2$) and maximizing the sensitivity to a small phase change. When a small temperature change is applied to the FBG, the phase of the signal traveling through the FBG changes, whereas the phase of the signal traveling through the reference arm does not. When these two signals are recombined at the second coupler of the MZ interferometer, the signals interfere in a manner that depends on their relative phase shift, which is $\pi/2+\delta\phi$, where $\delta\phi=(d\phi/dT)\Delta T$ and $d\phi/dT$ is the sensitivity previously discussed and calculated (for example, in FIGS. 10A and 10B). As a result of this relative phase shift, the signal output power at either port of the MZ interferometer changes by an amount proportional to $\delta\phi$.

A fiber MZ interferometer typically has a minimum detectable phase (MDP) of the order of 0.1 to 1 µrad. As an example, for a MZ interferometer with an MDP of 1 µrad, an index contrast of 0.015, and a grating length of 10 cm operating at 1.55 microns, the phase sensitivity is $4.8 \times 10^6$ rad/°C. Since the MPD is 1 µrad, this MZ-slow-light-sensor arrangement can detect a temperature change as small as $2.1 \times 10^{-13}$ °C. This is, once again, nearly 5 million times greater than that of an optimized reflection FBG of same length.

Figure 14A:
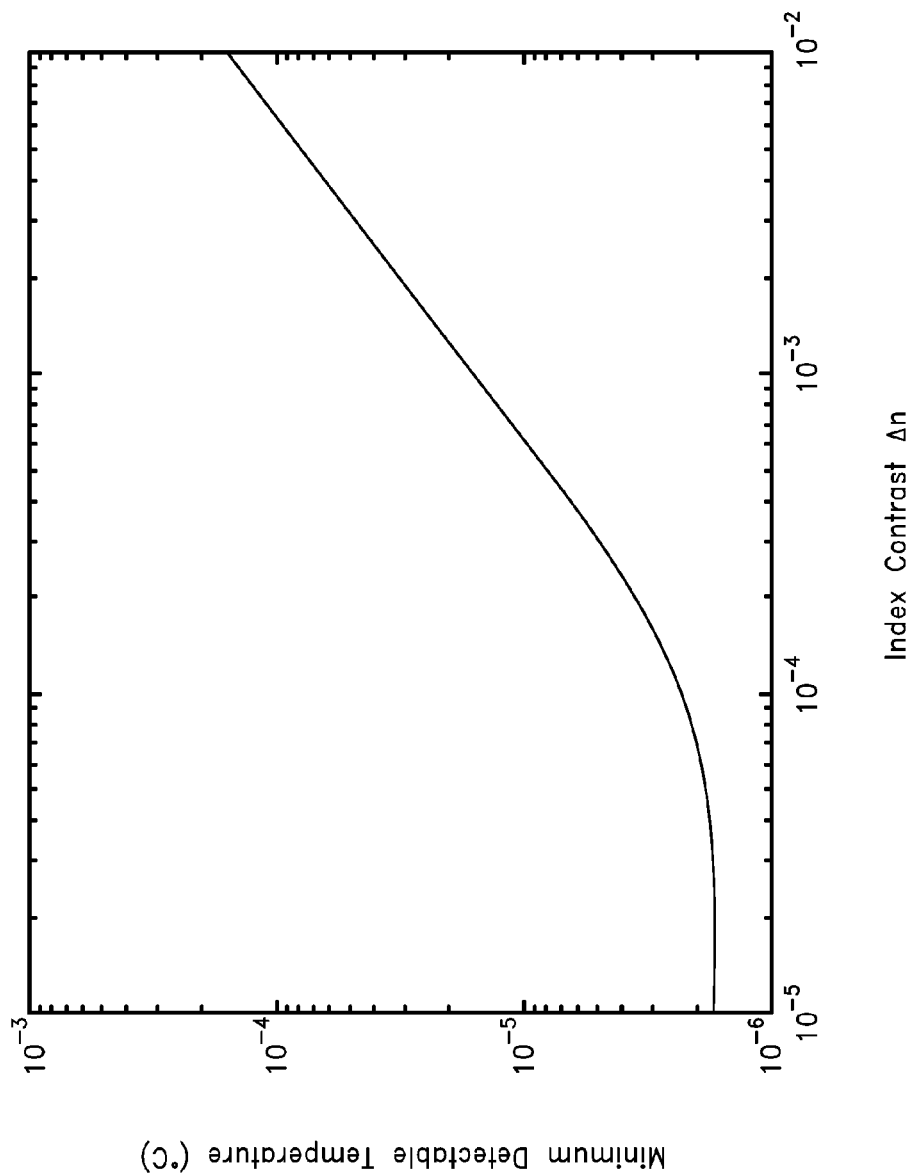
FIGS. 14A and 14B illustrate the calculated minimum detectable temperature change for an FBG of 1 cm in length for $\lambda_{Bragg}$=1.064 μm and 2 cm in length for $\lambda_{Bragg}$=1.55 μm used in the Bragg-reflection mode as a function of index contrast Δn, calculated assuming a lossless grating.
Figure 14B:
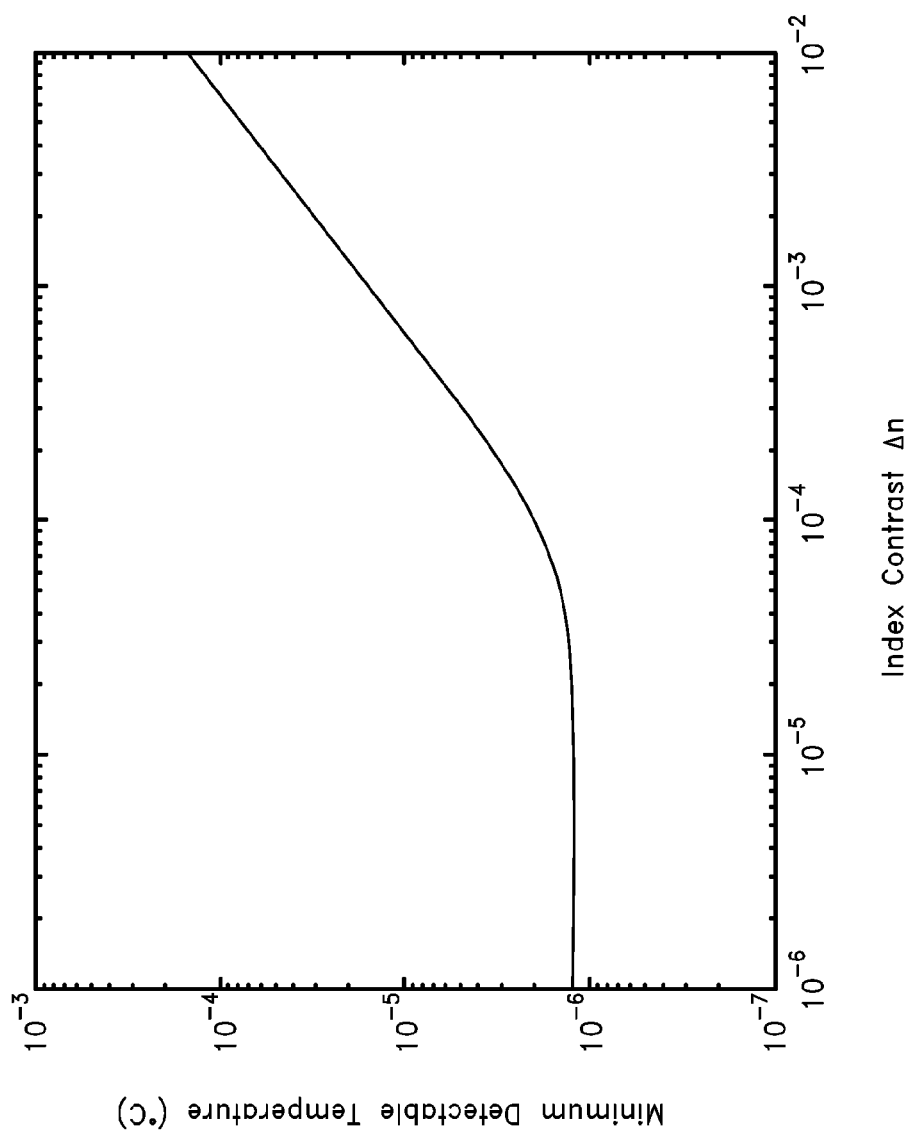
Figure 15A:
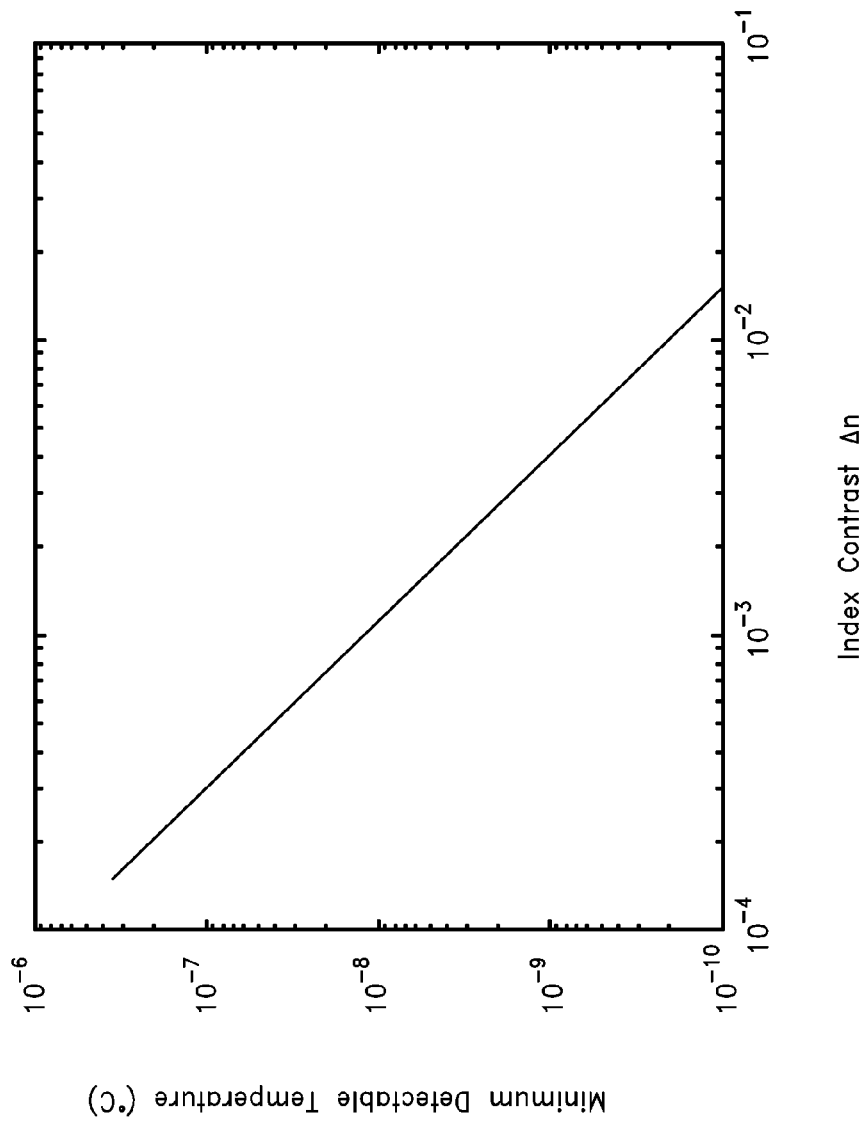
FIGS. 15A and 15B illustrate the calculated minimum detectable temperature change for an FBG of 1 cm in length for $\lambda_{Bragg}$=1.064 μm and 2 cm in length for $\lambda_{Bragg}$=1.55 μm used in the slow-light transmission mode in accordance with certain embodiments described herein as a function of index contrast Δn, calculated assuming a lossless grating.
Figure 15B:
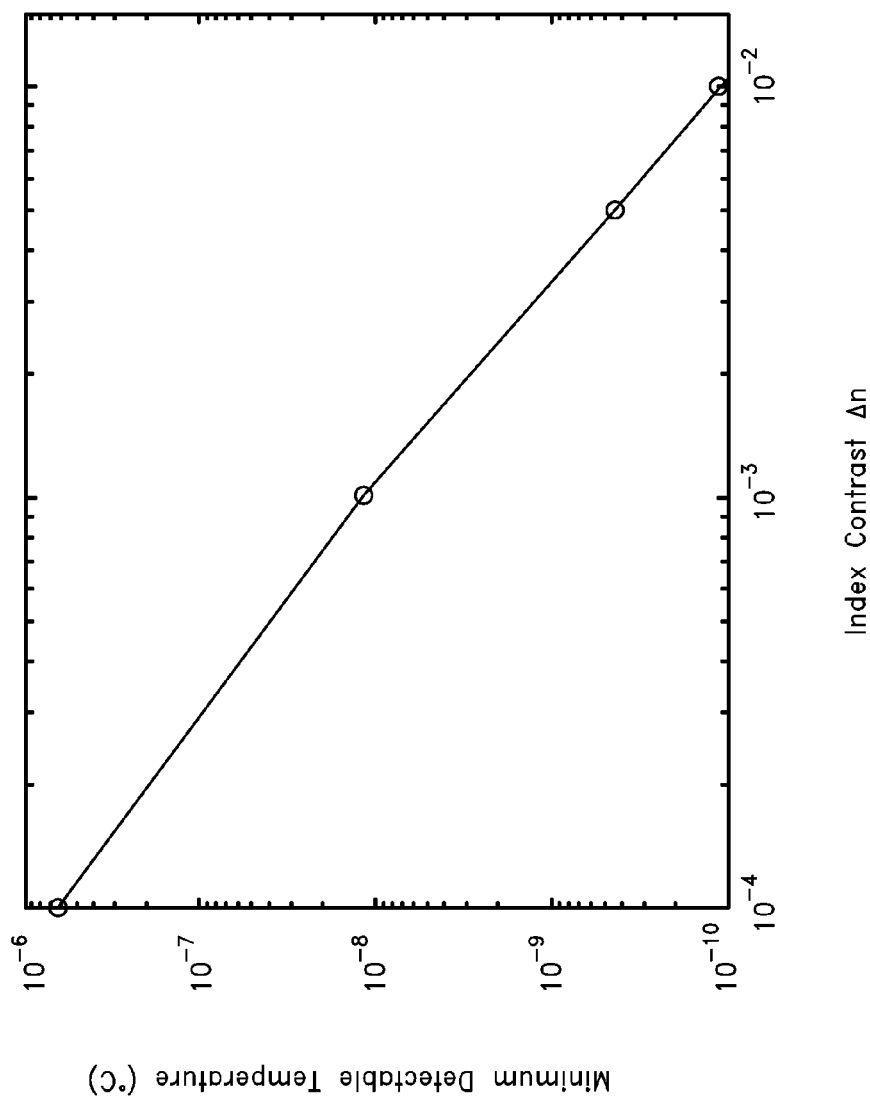

A further example of this principle is shown in FIGS. 14A and 14B, where the calculated minimum detectable temperature is plotted as a function of FBG index contrast for an FBG used in the Bragg-reflection mode for $\lambda_{Bragg}=1.064$ µm and for $\lambda_{Bragg}=1.55$ µm, respectively, calculated assuming a lossless grating. In this simulation, the grating length is 1 cm for $\lambda_{Bragg}=1.064$ µm, and 2 cm for $\lambda_{Bragg}=1.55$ µm, and the MZ interferometer was taken to have an MDP of 1 µrad. As predicted in earlier simulations, in particular from FIGS. 11A and 11B, as the index contrast increases, the sensitivity drops, and therefore the minimum detectable temperature increases. The same dependency is shown in FIGS. 15A and 15B for an FBG of same length (and MDP) operated in the slow-light transmission mode in accordance with certain embodiments described herein, calculated assuming a lossless grating. In sharp contrast to the Bragg-reflection mode, the minimum detectable temperature decreases monotonically as the index contrast increases, eventually reaching exceedingly small values.

This example clearly illustrates the benefits provided by certain embodiments described herein over the prior Bragg-reflection mode of operation. First, for both slow-light configurations in accordance with certain embodiments described herein, the sensitivity is considerably larger. Second, for the slow-light transmission configuration in accordance with certain embodiments described herein, the MZ interferometer does not need to be imbalanced, so both of its arms can have extremely short lengths, and can therefore be fairly stable against temperature changes. Third, for both slow-light configurations in accordance with certain embodiments described herein, the sensor can utilize a commercial laser as the source, unlike the reflection mode configuration of the prior art, which requires a broadband source in one case (see, e.g., Kersey et al.) and its own laser in the second case (see, e.g., Koo and Kersey). The commercial laser can be chosen in certain embodiments to have an extremely narrow linewidth and low noise limited by shot noise. In contrast, in the first case of the Bragg-reflection configuration (e.g., FIG. 1), a broadband source is much noisier, which will add phase and intensity noise to the output signals at the detection, and further increase the MDP (and thus the minimum detectable temperature). In the second case of the Bragg-reflection configuration (e.g., FIG. 2), the source is essentially a custom laser including an FBG, which would require precise wavelength stabilization in order to reduce laser line broadening and to keep the noise low. This can be done, but again it requires a fair amount of engineering, and it is more costly than commercial narrow-linewidth lasers, which are manufactured and sold in large quantities and benefit from an economy of scale.

This ability to detect a phenomenally small temperature is excessive for most applications. In practical applications, however, this high sensitivity can be traded for a shorter length. In the slow-light transmission mode example cited above for $\lambda_{Bragg}$=1.064 µm, the sensor has a sensitivity of $2.2 \times 10^7$ rad/° C. for a length of 10 cm. By reducing this FBG length to 800 µm, or a factor of ~125, according to the $L^{2.88}$ dependence, the sensitivity will drop by a factor of ~$1.77 \times 10^6$, down to 12.4 rad/° C. For the second slow-light transmission mode example operating at 1.55 µm, the sensor has a phase sensitivity of $4.8 \times 10^6$ rad/° C. for a length of 10 cm. By reducing this FBG length to 800 µm, the sensitivity will drop by a factor of approximately $1 \times 10^6$, down to 4.8 rad/° C. These sensors still have about the same sensitivity as an optimized FBG used in Bragg-reflection mode (see FIG. 4), but it is only 800 µm long instead of 10 cm, and therefore it is considerably more compact.

The above-described analysis was carried out for the case where temperature is the measurand. The same conclusions apply when the measurand is another quantity, such as a longitudinal strain applied directly to the FBG.

By using slow light, both the strain sensitivity and the temperature sensitivity are increased. Thus, one impact of a slow-light sensor in accordance with certain embodiments described herein is that while it is a more sensitive strain sensor, it is also more sensitive to temperature variations. While the sensor can be stabilized against temperature variations in certain embodiments, such stabilization may not be desirable. However, sensitivity and length can always be traded for one another. Hence, since the strain sensitivity and the temperature sensitivity are enhanced in approximately the same proportions in the slow-light sensor of certain embodiments described herein, then the physical length L of the grating can be reduced to bring the strain sensitivity and temperature sensitivity to the same levels as in a best-case Bragg-reflection FBG. The difference—and the benefit—of the slow-light configurations is that for equal sensitivity, the slow-light FBG is considerably shorter, which can be important for many applications where compactness is critical. Any compromise of length and sensitivity is also possible, by which the slow-light sensor is designed so has to be somewhat shorter than a conventional reflection grating, as well as more sensitive. In addition, the numerous engineering solutions that have been applied to discriminate between the change in strain and the change in temperature applied to a grating are applicable in the present configurations of slow-light sensors. In particular, for example, two gratings can be placed in parallel in the region where strain and temperatures are changing. One of the gratings is subjected to the strain, but not the other, while both are subjected to the (same) temperature change. Comparison between the readings of the two sensors can provide both the common temperature change and the strain change applied to one of the gratings.

Figure 16:
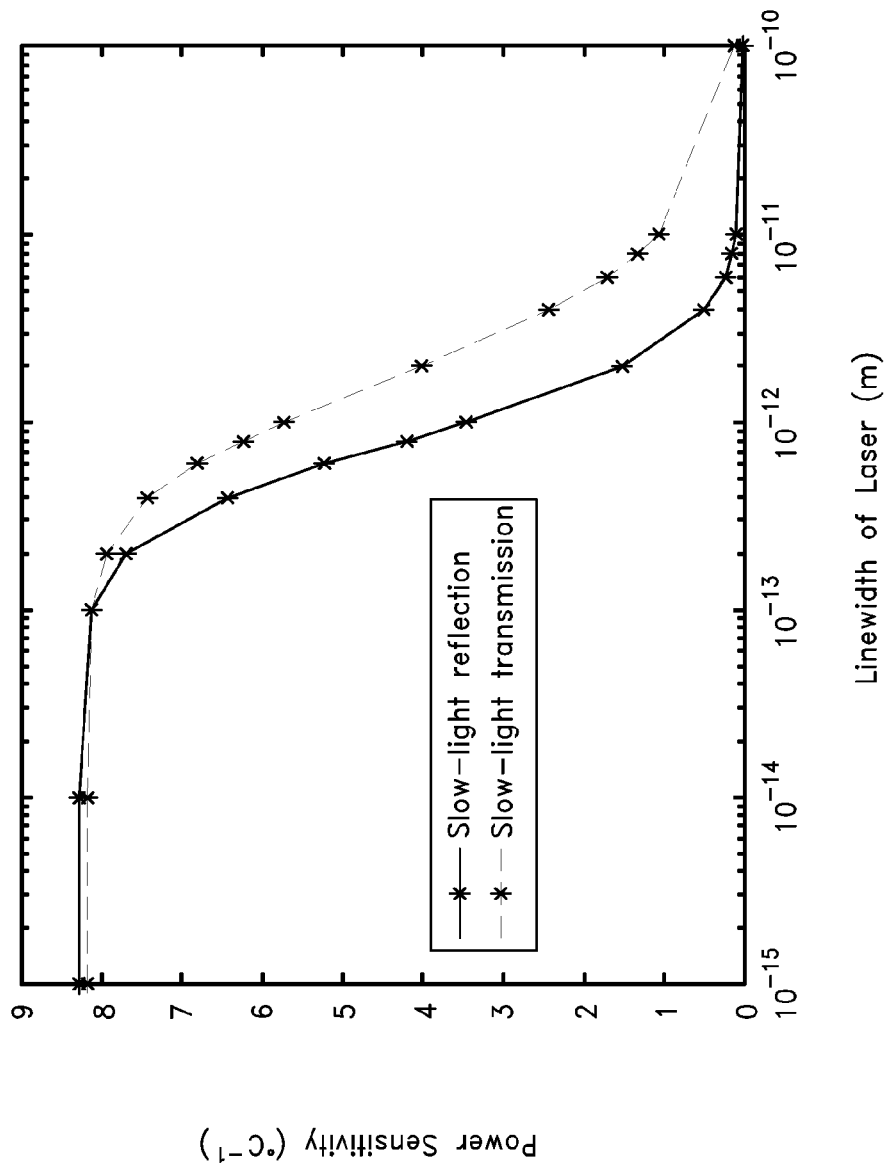
FIG. 16 shows the power sensitivity dependence of the linewidth of the laser for an FBG of 2 cm in length and $\Delta n=1.5\times10^{-4}$ in the slow-light reflection mode (solid line) and the slow-light transmission mode (dashed line) in accordance with certain embodiments described herein, calculated assuming a lossless grating.

Simulations also show that the linewidth of the source used to interrogate an FBG operated in either of the slow-light modes in certain embodiments described herein is quite reasonable. FIG. 16 illustrates this point with a plot of the power sensitivity dependence on the linewidth of the laser for a grating with a length L=2 cm and $\Delta n=1.5 \times 10^{-4}$ operated at $\lambda_{Bragg}$=1.064 microns, calculated assuming a lossless grating. As the laser linewidth increases, the sensitivity is constant up to a linewidth of about $10^{-13}$ m. Above this value, the sensitivity starts decreasing, because the laser signal is probing a wider spectral region that spans more than just the peak in the group index spectrum. In other words, some photons see a high group index (the ones at frequencies at and around the peak of the group index spectrum), and others see a lower group index (the ones at frequencies detuned from this peak). This curve indicates that in order to obtain a maximum sensitivity, the laser linewidth is advantageously selected to be no larger than about $10^{-13}$ m, or a frequency linewidth of 26 MHz. This is a linewidth that is readily available from a number of commercial semiconductor lasers, for example Er—Yb-doped fiber lasers from NP Photonics in Tucson, Ariz. A similar simulation carried out for an FBG of same length but large index contrast ($\Delta n=1.5 \times 10^{-3}$) yields a maximum value for the laser linewidth of about $2 \times 10^{-15}$ m (530 kHz). Such laser linewidth is also readily available commercially. The laser linewidth therefore can be decreased as the index contrast of the grating is increased, or its length increased.

All simulations were carried out for FBGs with a Bragg wavelength of either 1064 nm (the primary wavelength of Nd:YAG lasers) or 1.55 µm. These wavelengths were selected because they are commonly used. However, the wavelength has no bearing on the general trends outlined in certain embodiments described herein. The properties of similar FBGs centered at a different wavelength, for example around 1.3 µm, do not differ substantially from the properties presented herein, and they can be modeled using the same equations presented and cited herein. The relative benefits of the slow-light schemes in accordance with certain embodiments described herein over the Bragg-reflection described herein remain substantially unchanged.

Optimization Process

The characteristics of the transmission and group index spectra of a uniform grating can be uniquely determined by three parameters: index modulation, length, and loss. In a lossless grating, the case discussed above, the group index can be enhanced by increasing the index contrast and the length indefinitely. In practice, when light travels though a grating, it encounters loss from scattering, which induces coupling into a radiation mode. In the presence of loss, as the length of the grating is increased, the light travels over a longer distance in the grating and encounters correspondingly higher losses. This effect is enhanced when the group index of the FBG is large, because the light encounters more loss as it travels many more times back and forth through the grating. So for a given loss, as the grating length is increased, the group index first increases as described above. As the group index further increases, the loss starts to limit the maximum number of round trips, much like it does in a Fabry-Perot interferometer, and the group index starts to decrease with any further increase in length. For a given loss coefficient, there is consequently a grating length that maximizes the group index at the resonances. Similarly, as the length increases, the loss also limits the transmission of the grating at these resonances. When designing an FBG for slow light applications, it can be desirable to carry out an optimization study, using for example the aforementioned model, to determine the optimal length of a grating given its type of profile, index modulation, and loss. The loss coefficient of the FBG can be measured, using any number of standard techniques known to persons with ordinary skill in the art. The measured power loss coefficient of FBGs ranges from 1 $m^{-1}$ in a Ge-doped grating (Y. Liu, L. Wei, and J. Lit, "Transmission loss of phase-shifted fiber Bragg gratings in lossy materials: a theoretical and experimental investigation," Applied Optics, 2007) to more than 2 $m^{-1}$ in a hydrogen-loaded grating (D.

Johlen, F. Knappe, H. Renner, and E. Brinkmeyer, "UV-induced absorption, scattering and transition losses in UV side-written fibers," in Optical Fiber Communication Conference and the International Conference on Integrated Optics and Optical Fiber Communication, 1999 OSA Technical Digest Series (Optical Society of America, Washington, D.C., 1999), paper ThD1, pp. 50-52).

Figure 17:
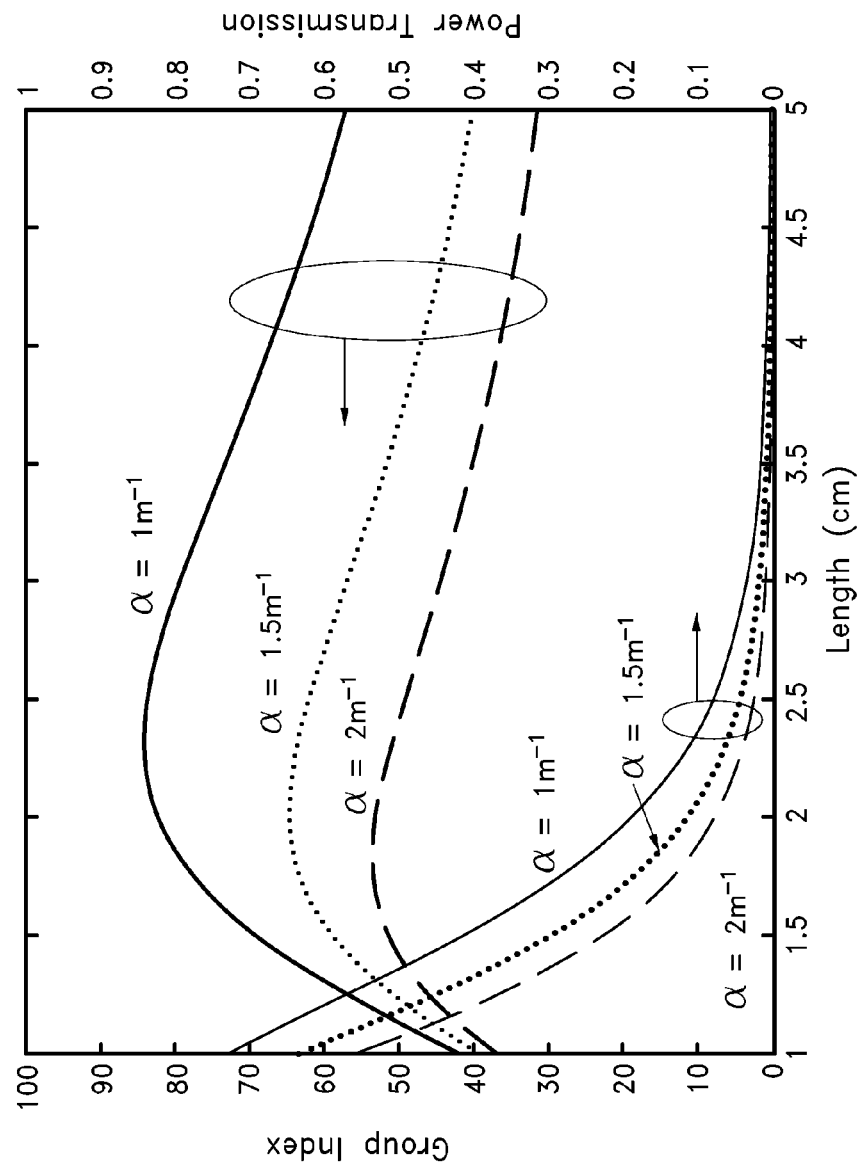
FIG. 17 shows the group index and power transmission as functions of length for different losses in an example of a strong uniform FBG ($\Delta n=1.0\times10^{-3}$).

This behavior is illustrated in FIG. 17 for an example uniform grating operated at 1.55 μm. This figure shows the dependence of the group index and transmission at the first resonance ($\lambda_1$) on length in a strong Ge-doped grating, e.g., a grating with a large index contrast ($\Delta n=1.0\times10^{-3}$ in this example) for a loss coefficient $\alpha$ varying between 1 $m^{-1}$ and 2 $m^{-1}$. For a given loss coefficient, when the length of the grating is short, the grating does not have sufficient periods and the group index is low. When the length is long, light encounters more loss as it travels through the grating and the group index decreases. Somewhere between these two limits, the group index is maximum. As shown in the example of FIG. 17, when the loss of the grating is 1 $m^{-1}$, the highest group index is 84 at a grating length of 2.25 cm, and the transmission is about 10%. When the loss increases to 2 $m^{-1}$, the highest group index decreases to 53 at a shorter optimum length of 1.8 cm; and the transmission at this length is about the same (11%). Also as explained above, the transmission decreases steadily as the length is increased. In applications where the highest group index is desirable and the transmission is of less concern, operation at or in the vicinity of the optimum length is preferable. In applications where the transmission is of more concern, a compromise can be made in order to achieve the highest group index possible without unduly reducing the transmission. A slow-light FBG designer can also select other resonance wavelengths besides the first resonance wavelength modeled in this example.

Figure 18:
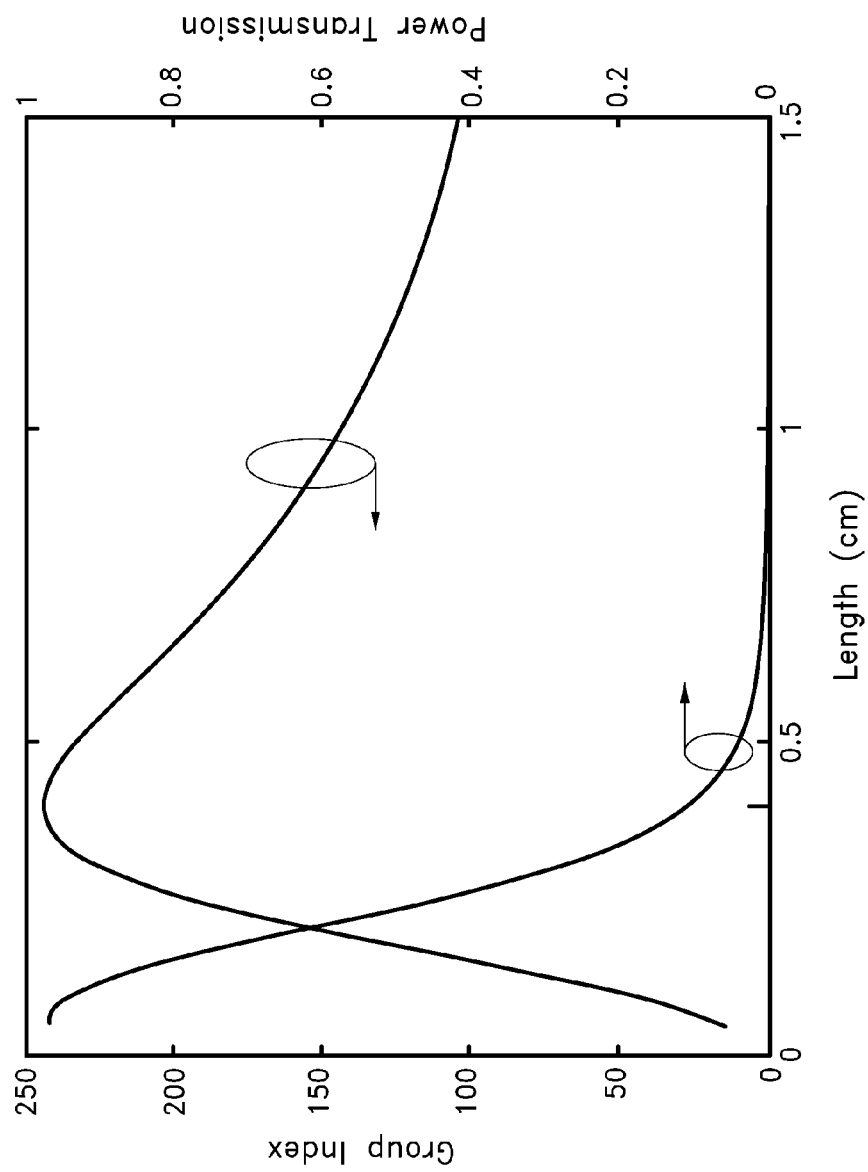
FIG. 18 shows the group index and power transmission as functions of length for a loss of 2 $m^{-1}$ in an example of a hydrogen-loaded FBG.

FIG. 18 shows the same dependencies calculated for an even stronger example FBG, fabricated in a hydrogen-loaded fiber. The value of $\Delta n$ used in this simulation is 0.01, a value reported for a grating written in a hydrogen-loaded fiber, and a loss coefficient of 2 $m^{-1}$. See P. J. Lemaire, R. M. Atkins, V. Mizrahi, and W. A. Reed, "High-pressure $H_2$-loading as a technique for achieving ultrahigh UV photosensitivity and thermal sensitivity in $GeO_2$-doped optical fibers," Electron. Left., 1993. The FBG was assumed to be uniform for this calculation. The highest group index for this example occurs for a length of 0.37, and it is equal to 243. The transmission of the grating at that group index is 12%.

Figure 19B:
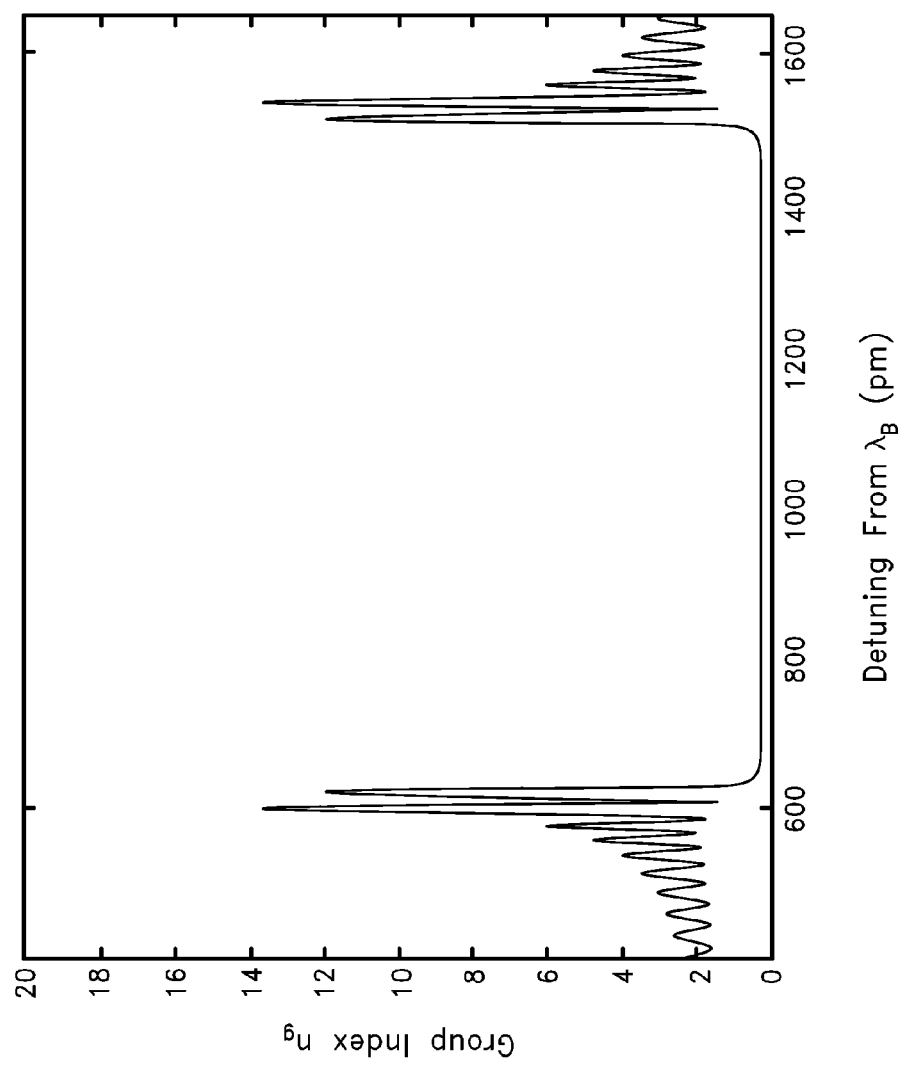
FIG. 19B shows the group index spectrum of a type A apodized grating.
Figure 19C:
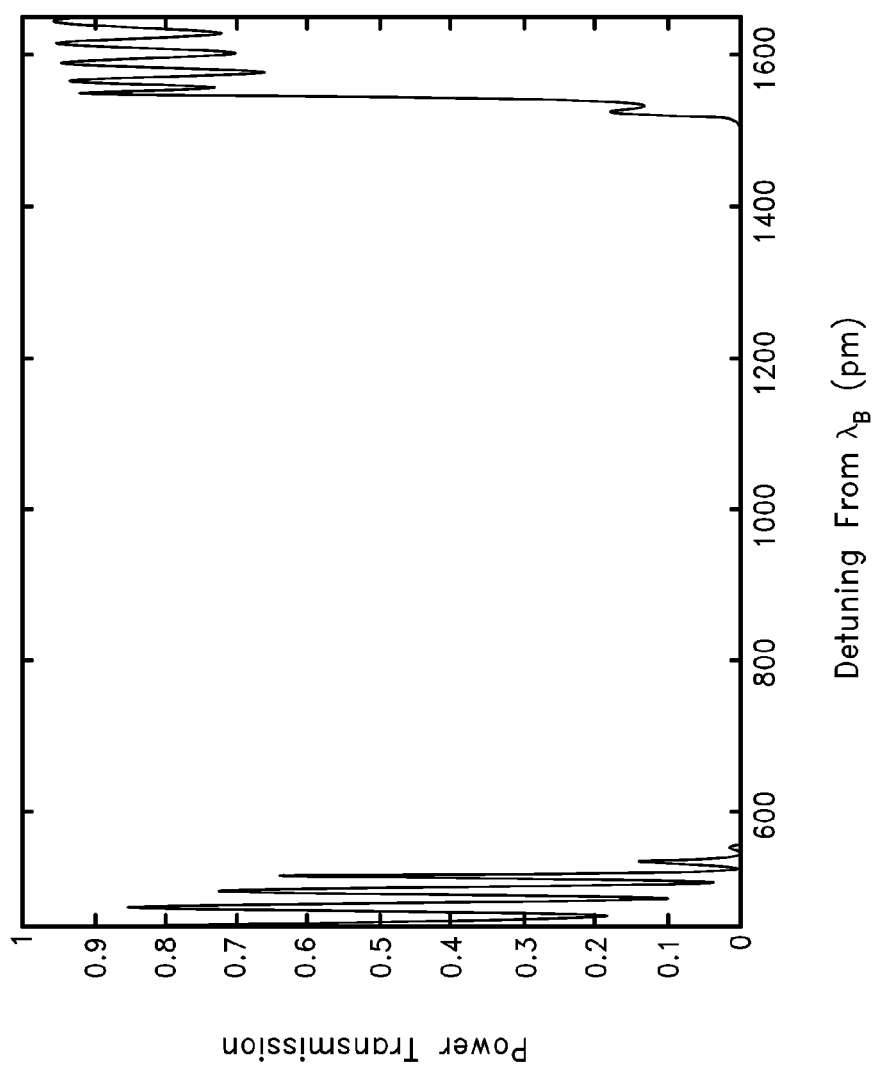
FIG. 19C shows a plot of an asymmetric spectrum of power for an example FBG.
Figure 19D:
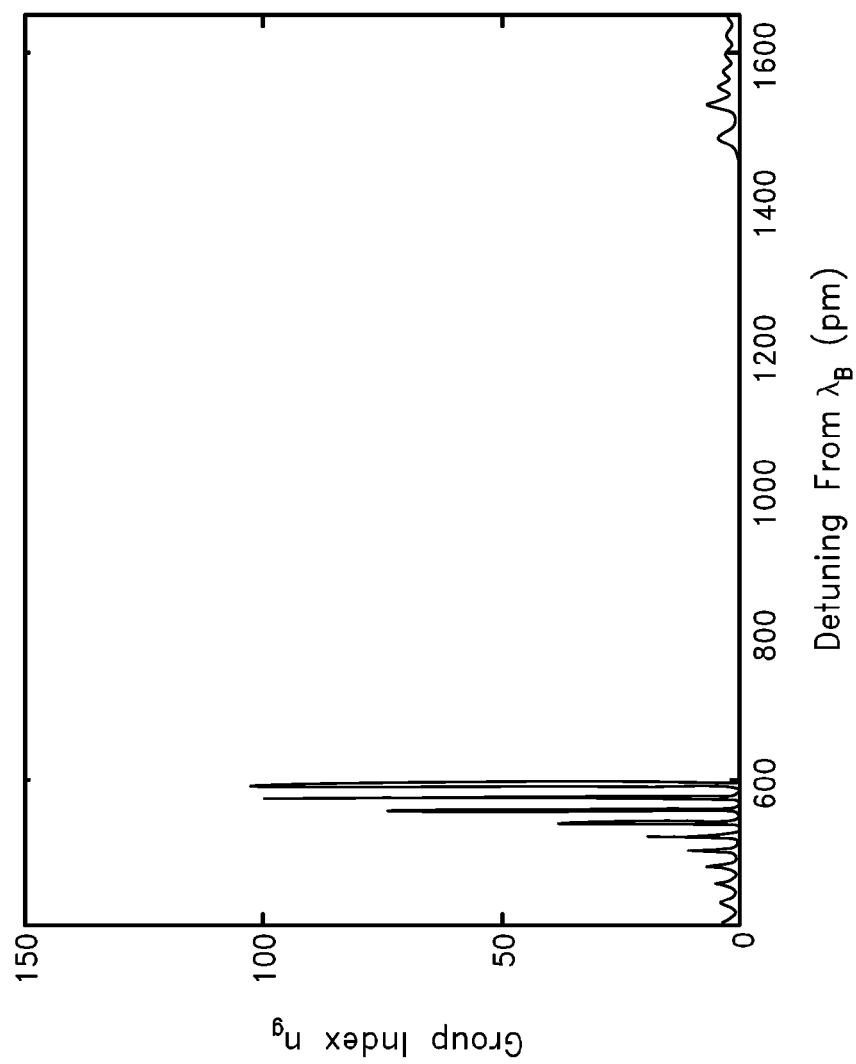
FIG. 19D shows a plot of an asymmetric spectrum of group index for the example FBG used in FIG. 19C.

Apodization also impacts the relationship between group index, transmission and length. Examples of two types of apodization, referred to herein as raised-Gaussian-apodized with zero-dc index change as type A and Gaussian-apodized as type B are shown in FIG. 19A. See T. Erdogan, "Fiber grating spectra," J. of Lightwave Technology, Vol. 15, pp. 1277-1294, 1997. As illustrated in FIG. 19A, in type A, the index profile is modulated above and below some mean index value. In type B, the index profile is modulated strictly above some mean value. In both types, the envelope of the index modulation can have any profile, e.g., cosine or Gaussian. In the following simulations, for both type A and type B FBGs the envelope is assumed to be a Gaussian with a full width at half maximum (FWHM) labeled W. FIG. 19B illustrates the group index spectrum calculated for a type-A apodized FBG with $\Delta n=1.0\times10^{-3}$, L=2 cm, a loss coefficient of 1.3 $m^1$, and W=2 L. The highest group index peak occurs at the second resonance, but the value is smaller than that of a uniform grating with the same index modulation, length and loss. There are four relevant parameters that control the slow-light behavior of such an apodized grating: the maximum index modulation, the length, the loss coefficient, and the full width at half maximum (FWHM) W of the index-profile envelope. Type B gratings produces asymmetric transmission and group index spectra as shown in FIG. 19C and FIG. 19D for $\Delta n=1.0\times10^{-3}$, L=2 cm, a loss=1.3 $m^{-1}$, and W=2 L. The highest group index occurs at the first resonance peak at the shorter wavelength side. With appropriate apodization, its value can be greater than that of a uniform grating with the same index modulation and length. This can be achieved in certain embodiments by the optimization process described below.

Figure 20:
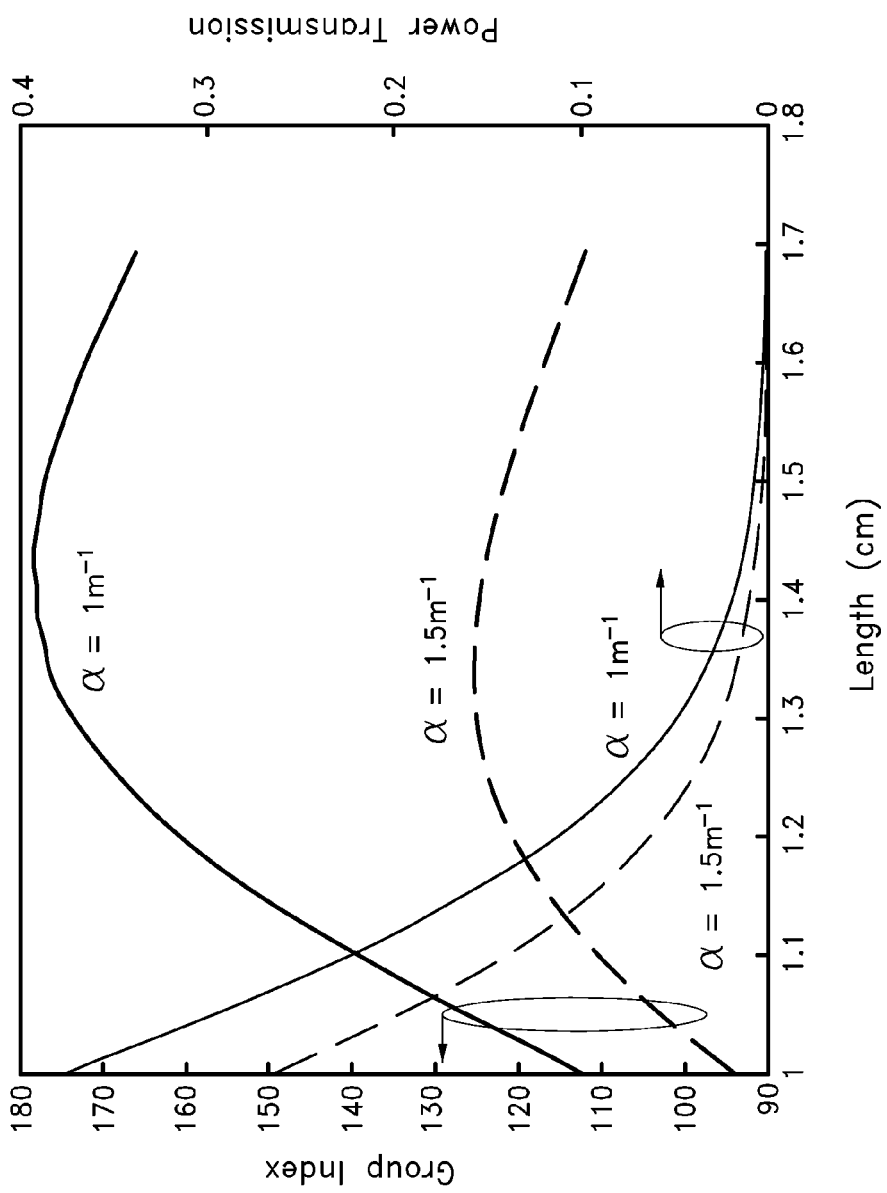
FIG. 20 shows the group index and power transmission as functions of length for different losses in an example of a strong apodized FBG of type B.

For a given maximum index contrast $\Delta n$ and a given loss coefficient, the two parameters that can be optimized to maximize the group index are the length and the FWHM W. In a most general approach well known in an optimization processes, one can carry out a straightforward two-dimensional parametric study. As an example, FIG. 20 shows that the relationship between group index, transmission, and length for a type-B apodized FBG in which the FWHM is equal to twice the length, the $\Delta n$ is $1.0\times10^{-3}$, and the loss coefficient is 1 $m^{-1}$. The optimum length for maximum group index is 1.43 cm. At this length, the group index is as high as 178. The transmission is then 1.4%. Increasing the loss to 1.5 $m^{-1}$ decreases the group index, and it reduces the optimum length, as expected. However, the transmission increases slightly, to about 1.7%. Comparison to FIG. 17, which modeled a uniform FBG with the same index contrast, shows that for the same length and index modulation, an apodized grating of type B with the same length and index modulation as a uniform grating produces a higher group index and a lower transmission than a uniform grating. Tailoring the index profile of the FBG therefore can have a significant impact on the design of certain embodiments described herein of an FBG used as a slow-light device.

Figure 21:
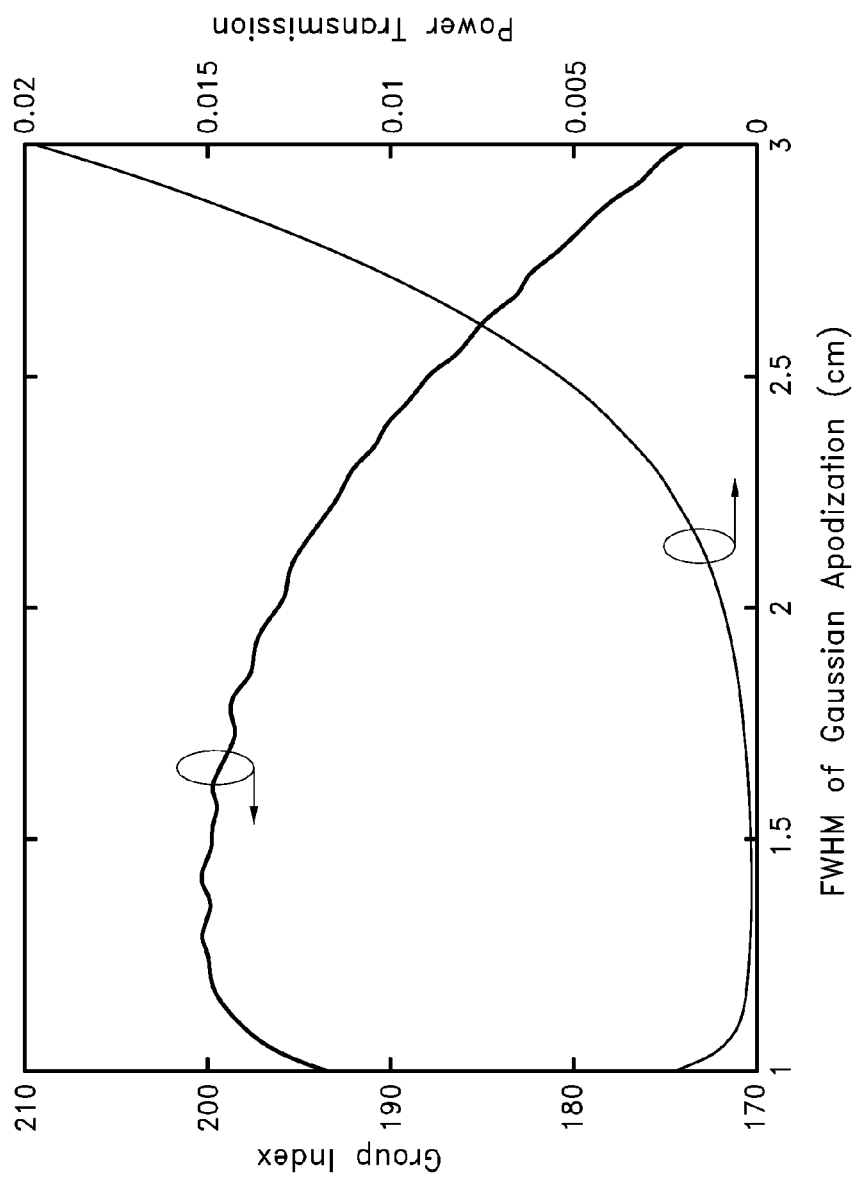
FIG. 21 shows the group index and power transmission as functions of the FWHM of Gaussian apodization in an example of a strong apodized FBG of type B.

The width of the apodization envelope also can play an important role in the group index and transmission. When the FWHM is small, the effective length of the grating becomes small, and it leads to a lower group index. When the FWHM is large, the grating profile becomes similar to a uniform grating. Therefore, in this limit, the group index and transmission dependences on length converge to their respective dependencies in the corresponding uniform grating. In FIG. 21, the group index and transmission are plotted against the FWHM W of the envelope in the example case of a loss coefficient of 1 $m^{-1}$, a maximum index contrast of $\Delta n=1.0\times10^{-3}$, and a length of 1.43 cm. The optimum FWHM for the maximum group index is 1.4 cm. At this FWHM, the group index is 200, which is even higher than in FIG. 20, but the power transmission is very low. Again, a compromise can be made to decide which optimum length to choose, depending on the application requirements, but curves such as FIGS. 20 and 21 clearly provide information which allows this choice to be made.

Figure 22:
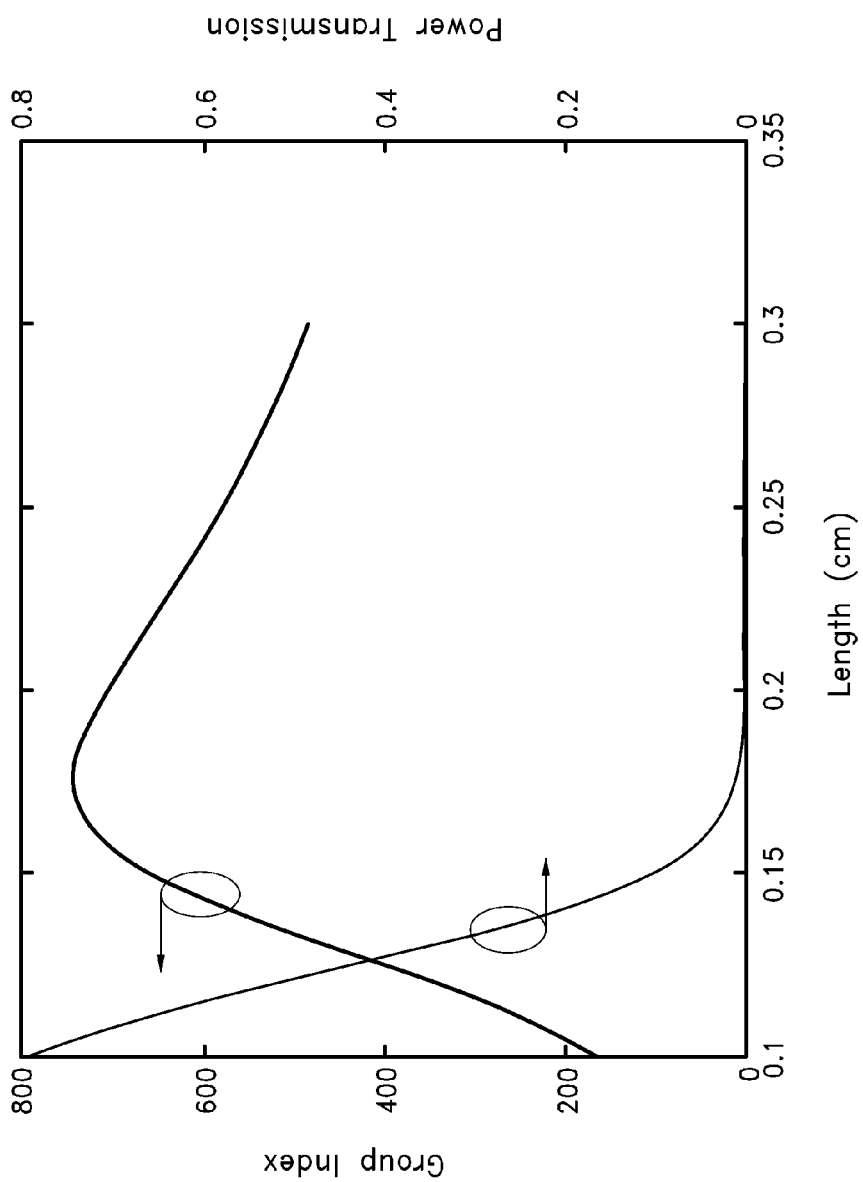
FIG. 22 shows the group, index and power transmission as functions of length in an example of a hydrogen-loaded FBG.

The same optimization process can be applied to an apodized hydrogen-loaded FBG of type B, as illustrated in FIG. 22. When the FWHM of the Gaussian envelope is equal to twice the length, the optimal length is 0.17 cm for a $\Delta n$ of $1.0\times10^{-2}$ and a loss coefficient of 2 $m^{-1}$. The group index for this example reaches 744 and the power transmission at this group index is 5%.

Figure 23:
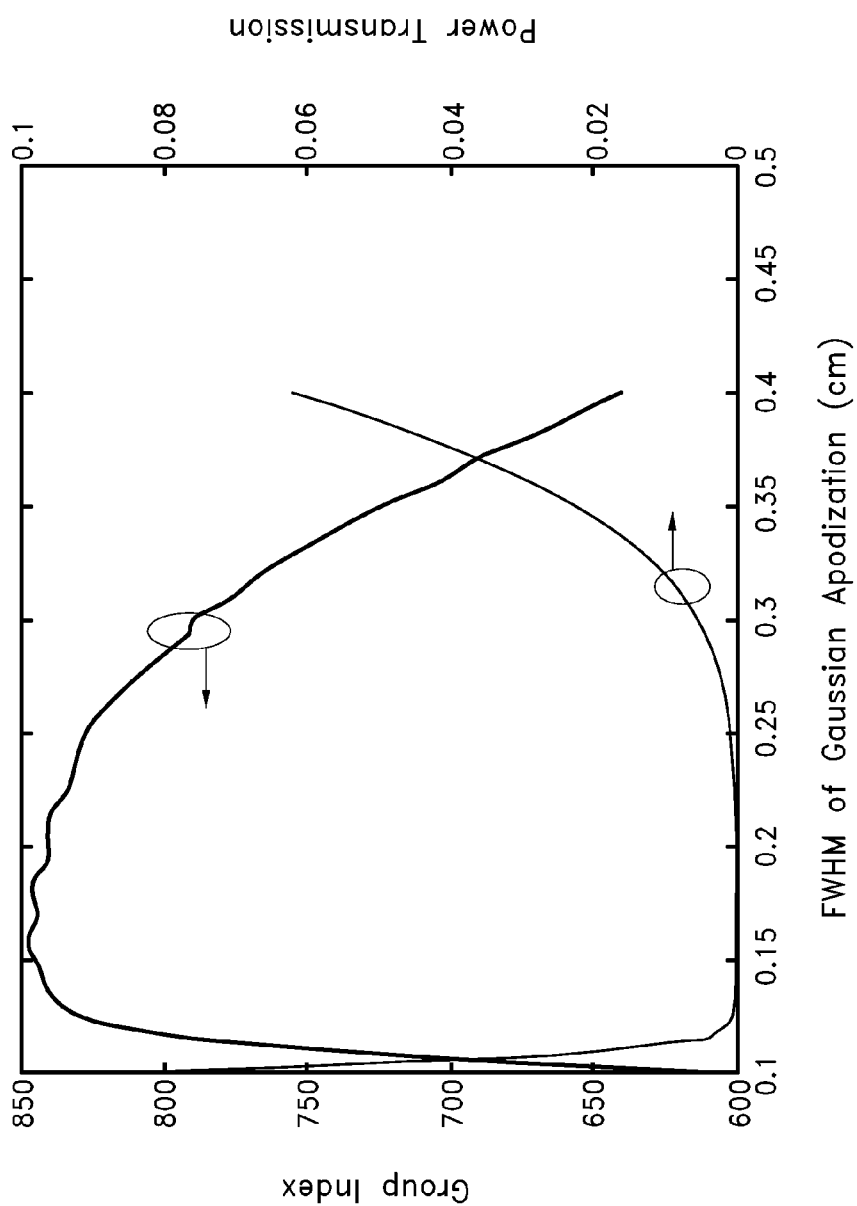
FIG. 23 shows the group index and power transmission as functions of the FWHM of Gaussian apodization in the example of a hydrogen-loaded FBG of FIG. 22.

For the hydrogen-loaded FBG modeled in FIG. 22, assuming its length is selected to be 0.17 cm, FIG. 23 shows that the optimum FWHM is 0.17 cm. At this FWHM, the group index reaches 868, but the power transmission at this point is very low. The FWHM that produces the highest group index is approximately equal to the length of the grating in this case. The advantage of this particular FWHM is a very high group index, and the drawback is a low power transmission. Here, as in all the other examples cited earlier, the tradeoff between the power transmission and group index is specific to each application.

Aside from uniform and apodized gratings, π-shifted grating is another type of a common grating profile that can produce slow-light. A π-shifted grating has a π phase shift located at the center of the grating profile. This type of grating opens a narrow transmission resonance at the Bragg wavelength, and it also broadens the transmission spectrum. The lowest group velocity for this type of grating is no longer located at the bandgap edge, but rather at the center of the bandgap $\lambda_\pi$. This is illustrated in FIGS. 29A and 29B which show the transmission and group index spectra calculated for a uniform π-shifted grating with $\Delta n=2.0\times10^{-4}$, $L=2$ cm, and zero loss.

These predictions were verified experimentally by measuring the group delay of light traveling through various FBGs with a Bragg wavelength near 1550 nm. Light that travels at a wavelength where a large group index occurs experiences a large group delay, proportional to the group index. The group delay was determined by measuring the time difference between the time of arrival of two signals of different wavelengths, both provided by the same tunable laser. The first wavelength was located far away (~2 nm) from the bandgap edge of the FBG, such that the light travels through the FBG at a normal group velocity. At this first wavelength, the group index is very close to the phase index, which is itself very close to the refractive index of the material $n_0$, e.g., about 1.45. The second wavelength was tuned to be close (within 200 pm) to the bandgap edge, where the group index, and therefore the group delay, are larger. The signals at the first wavelength and at the second wavelength were both modulated in amplitude, at the same frequency, before entering the FBG. The difference between the group delay measured at the two wavelengths provided a measure of the increase in group index induced by the FBG.

Figure 24:
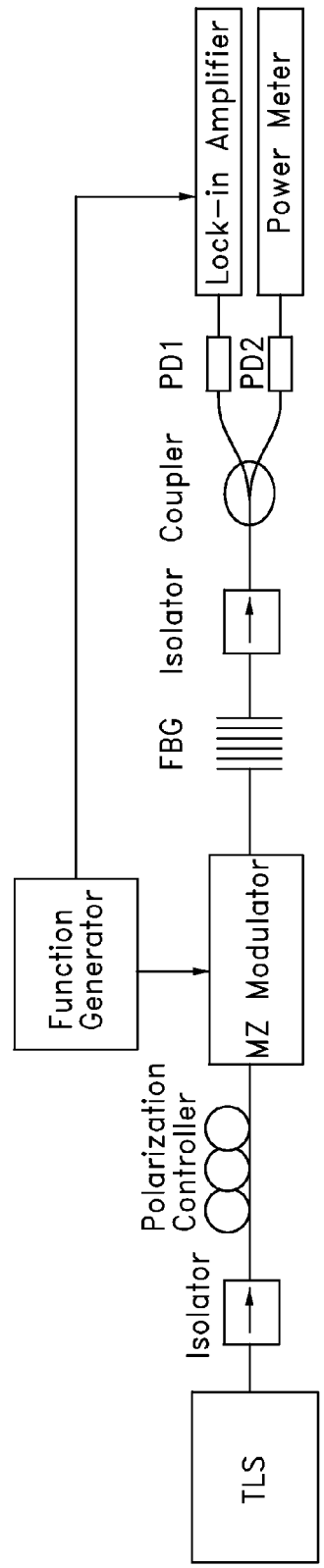
FIG. 24 shows an example experimental setup used to measure the group delay of an FBG.

The experiment setup used for this measurement is depicted in FIG. 24. The beam from a tunable laser (Hewlett-Packard HP 81689A) was sent through an optical isolator and a polarization controller, then through an amplitude modulator. The polarization controller was used to adjust the state of polarization (SOP) of light entering the modulator and hence maximize the power transmitted by the modulator (whose operation happened to be polarization dependent). A sinusoidal signal with a frequency $f_m$ between 25 MHz to 100 MHz from a function generator was fed into the modulator, which modulated the power of the laser signal. The sinusoidally modulated laser light was sent through the FBG under test. The signal exiting the FBG was split into two using a 50/50 fiber coupler. One of the output signals was sent to a power meter to measure its power, and thus (when varying the laser wavelength) the transmission spectrum of the FBG. The other beam was sent to a photodetector followed by a lock-in amplifier, which measured its phase. The first measurement was conducted at a wavelength of 1548.000 nm, which is far enough away from the bandgap edge (2 nm) that it does not experience slow light, and was thus used as a reference signal. The laser was then tuned to a slow-light wavelength close to the bandgap edge, and the phase measurement was repeated. The difference in group delay between the first wavelength and the second wavelength was calculated from the phase change $\Delta\phi$ measured between these two wavelengths using:

$$\Delta\tau_g = \frac{\Delta\phi}{2\pi f_m} \quad (8)$$

The group index at the second wavelength can be calculated from the differential group delay using:

$$n_g = \Delta\tau_g \frac{c}{L} + n_0 \quad (9)$$

Table 1 lists the commercial fiber Bragg gratings that have been tested. They were all manufactured by OE-Land in Canada. The table lists their lengths, whether they were athermal gratings, and whether the index profile of the grating was uniform, according to the manufacturer. It also lists the index contrast $\Delta n$ of each grating (the peak value in the case of a non-uniform FBG).

TABLE 1

| Grating | Manufacturer | Uniformity | Length | Δn | Highest measured $n_g$ |
|---|---|---|---|---|---|
| #1 | OE Land | Yes | 2 cm | $1.1 \times 10^{-4}$ | 3.7 |
| #2 | OE Land | Yes | 3 cm | $1.1 \times 10^{-4}$ | 4.9 |
| #3 | OE Land | No | 2 cm | $1.0 \times 10^{-3}$ | 69 |
| #4 | OE Land | No | 10 cm | $1.0 \times 10^{-3}$ | 16 |
| #5 | OE Land | No | 2 cm | $\sim 1.0 \times 10^{-3}$ | 34 |

Figure 25A:
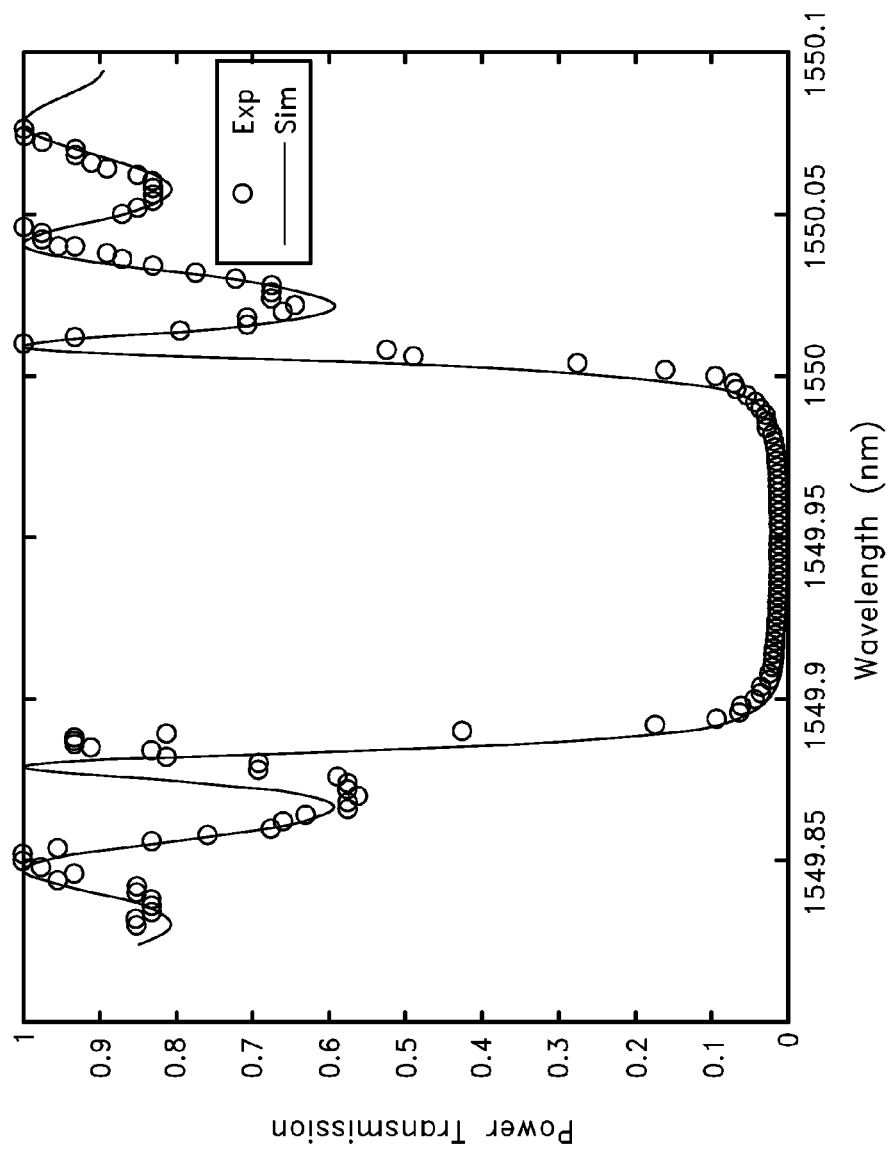
FIG. 25A shows the measured and theoretical transmission spectra of an example FBG.

FIG. 25A shows, as an example, the measured transmission spectrum of grating #1, which has a length of 3 cm and a nominally uniform index contrast with a value specified by the vendor of about $1\times10^{-4}$. The transmission spectrum exhibits the shape expected for a uniform grating, namely a narrow reflection peak centered at a Bragg wavelength (in this case $\lambda_{Bragg}\approx1549.948$ nm), surrounded on both sides by oscillations of diminishing amplitude away from this peak. The solid curve in FIG. 25A is the transmission spectrum calculated from theory for a uniform FBG. The index contrast is the only parameter that was adjusted to match the theoretical curve to the experiment. This fit was used because the value of the index contrast specified by the manufacturer was not accurate enough. The fitted value used to generate FIG. 25A, $\Delta n=1.10\times10^{-4}$, is close to the vendor value. These simulations assumed zero loss. These curves show that the presence, on both sides of the Bragg reflection peak, of transmission peaks with a transmission very close to 100%.

Figure 25B:
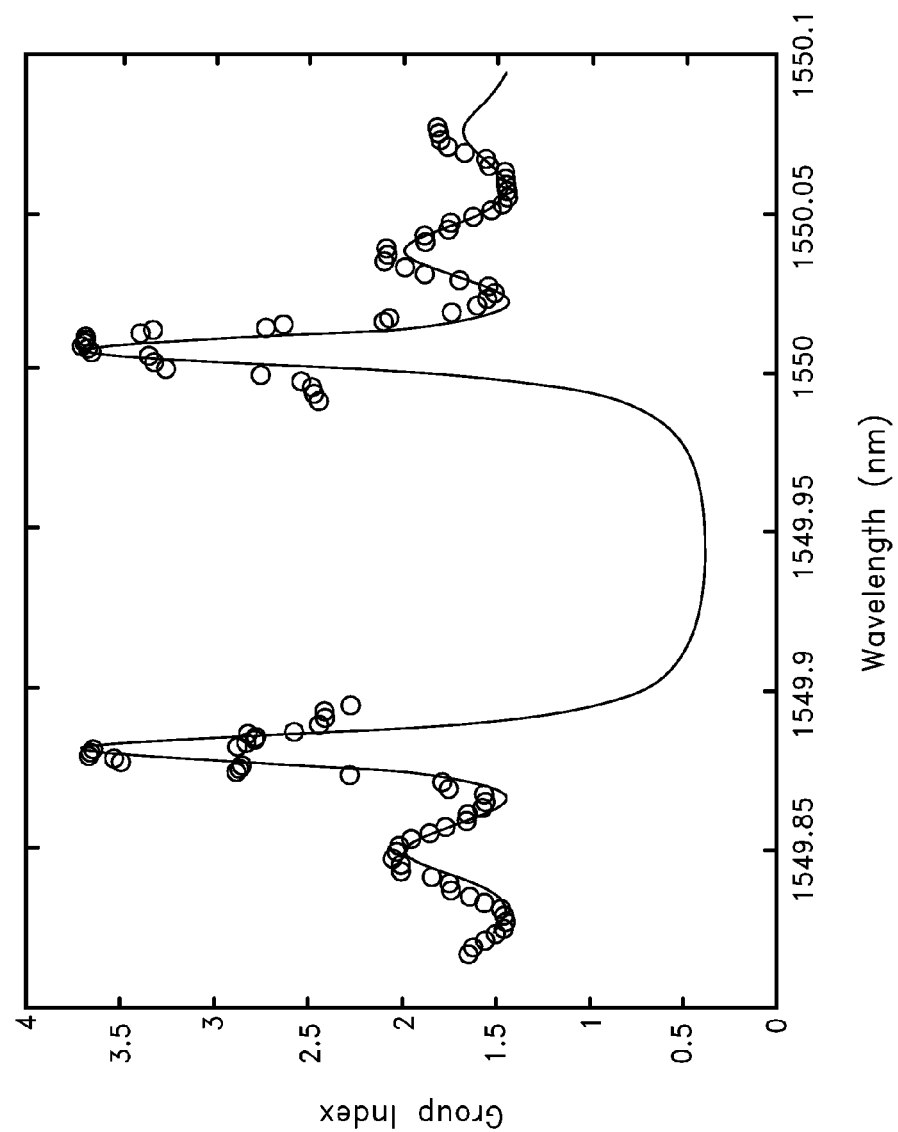
FIG. 25B shows the measured and theoretical group index spectra for the same example FBG used in FIG. 25A.

FIG. 25B shows the measured group index spectrum for the same grating (#1), as well as the theoretical spectrum calculated for the same Δn and length as the solid curve in FIG. 25A. The light is slowest at wavelengths $\lambda_1\approx1549.881$ nm and $\lambda'_1\approx1550.012$ nm, which are symmetrically located with respect to $\lambda_{Bragg}$, and also coincide with the first high transmission peaks on either side of the FBG's bandgap. The highest measured value of the group index at these two wavelengths is ~3.7, which is in excellent agreement with the predicted values. As in FIG. 25A, there is a very good match between theory and experiment.

Figure 26A:
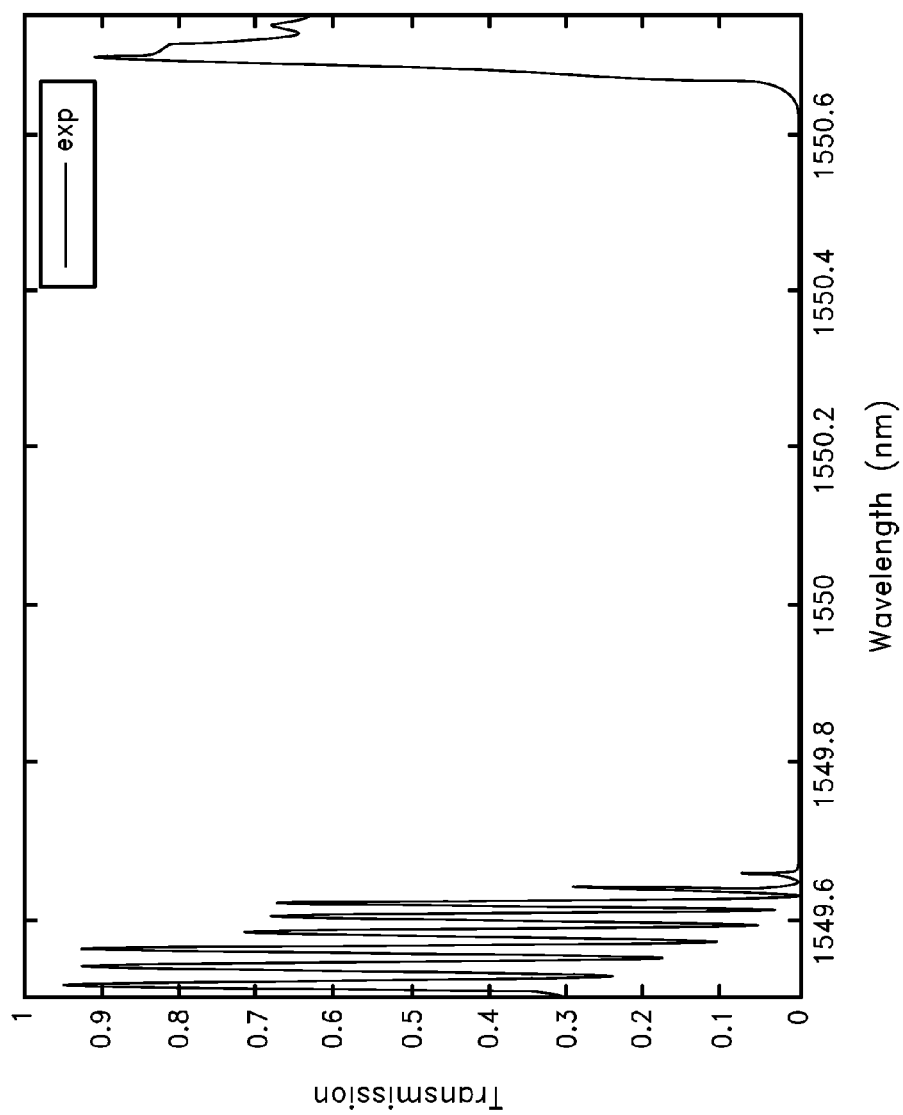
FIG. 26A shows the full measured transmission spectrum for an example FBG.
Figure 26B:
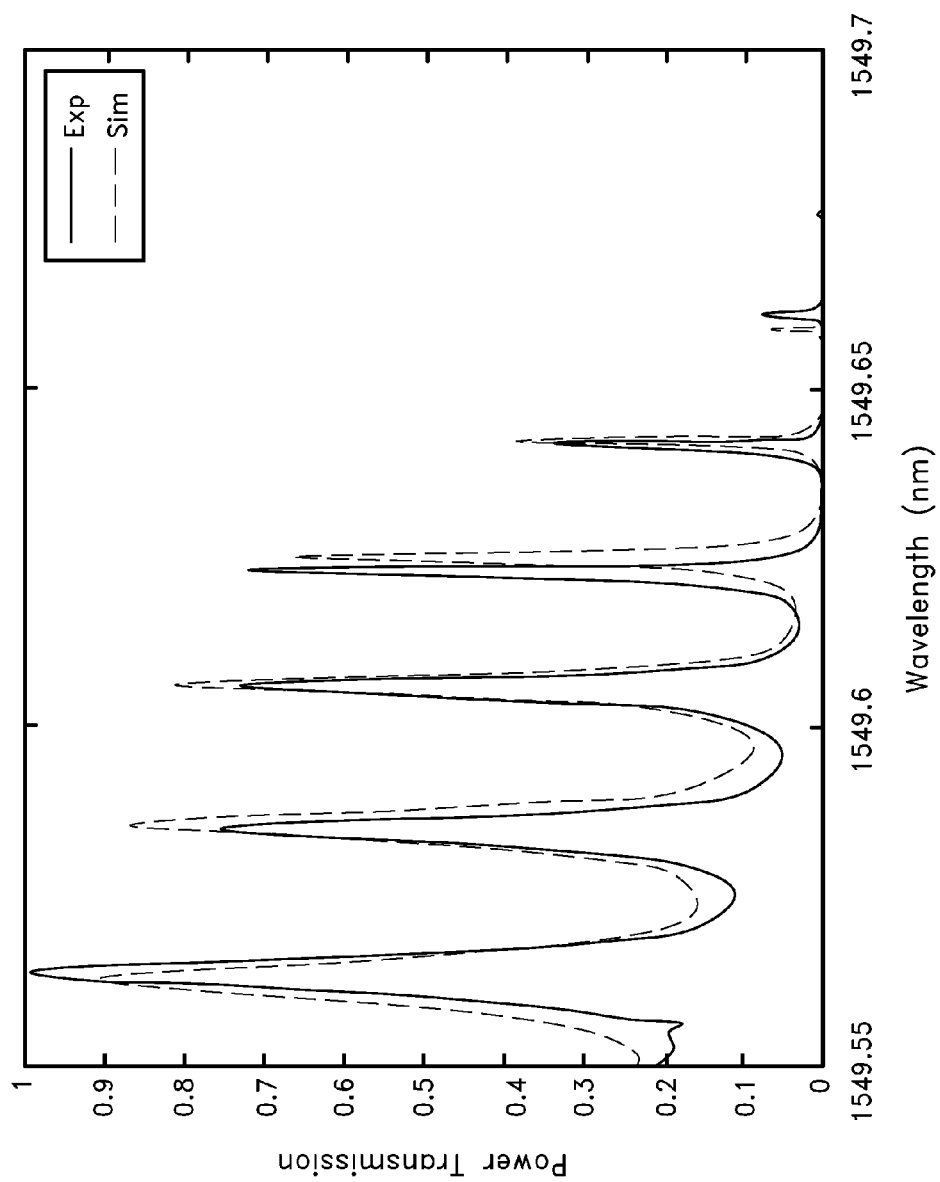
FIG. 26B shows the short-wavelength portion of the measured and theoretical transmission spectra shown in FIG. 26A.
Figure 26C:
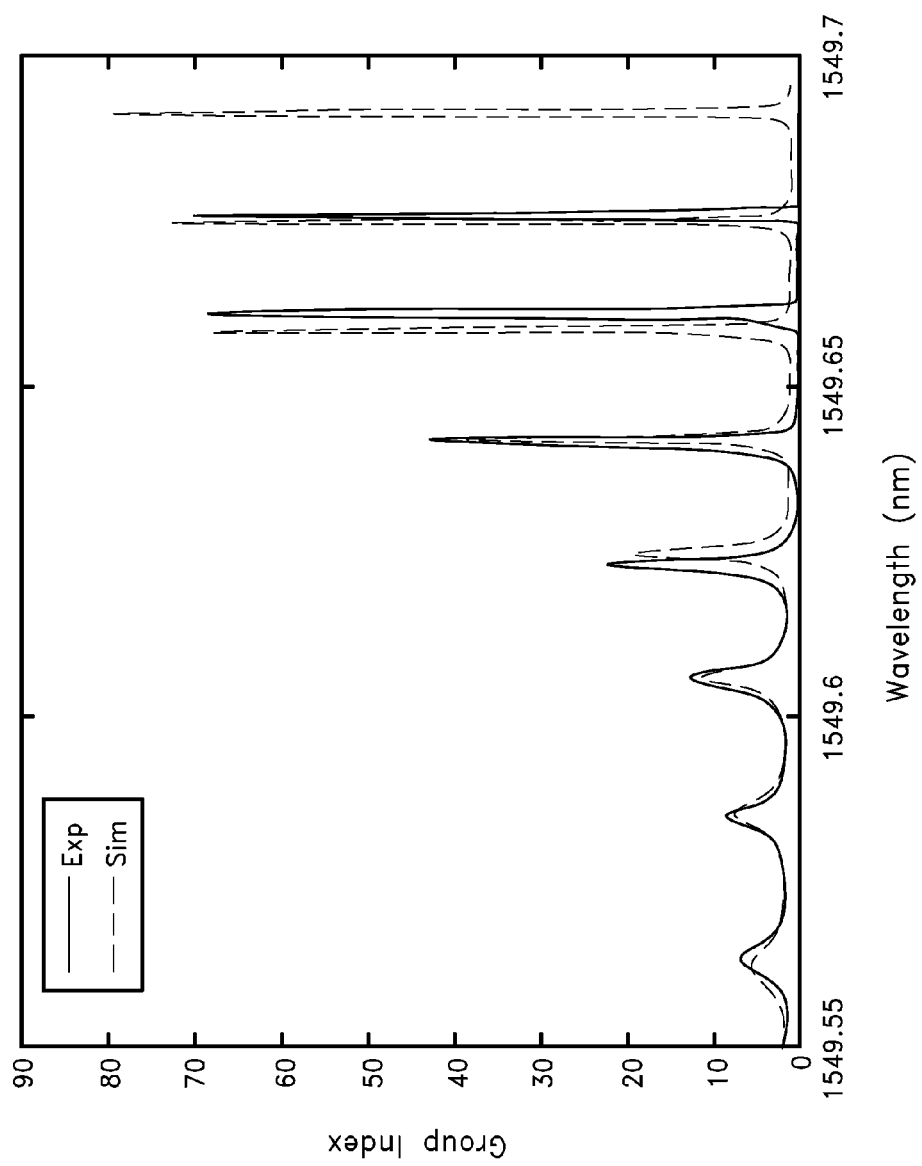
FIG. 26C shows the measured and theoretical group index spectra for the example FBG used in FIG. 26A.

FBGs with a higher index contrast were tested, and as expected they provided a higher maximum group index. As an example, FIGS. 26A-26C show the corresponding curves for grating #3, which had a length of 2 cm and a Δn of ~$1.0\times10^{-3}$. FIG. 26A shows that the full measured transmission spectrum is not symmetric about the Bragg wavelength, which is indicative of an apodized grating, as discussed above. FIG. 26B shows the short-wavelength portion of the same measured transmission spectrum, magnified for convenience. Superposed to this measured spectrum is the fitted transmission spectrum predicted by the model, fitting four parameters, namely the index contrast ($\Delta n=1.042\times10^{-3}$), length (L=20 mm), FWHM of Gaussian apodization (W=42 mm) and the loss coefficient ($\gamma=1.6$ m$^{-1}$) to obtain the nominally best fit to the measured spectrum. Again the agreement between measurements and theory is excellent. The fitted group index $\Delta n$ is close to the value specified by the manufacturer, and the loss coefficient is within the range of reported values for FBGs. FIG. 26C exhibits the measured group index spectrum for this grating, as well as the predicted spectrum, calculated for the same fitted parameter values as used in FIG. 26B. The maximum measured group index occurs at the second slow-light peak (wavelength $\lambda_2$) and is 69, which is the highest value reported to data in a fiber Bragg grating (the previous record was ~5, as reported in J. T. Mok, C. Martijn de Sterke, I. C. M. Littler and B. J. Eggleton, "Dispersionless slow-light using gap solitons," *Nature Physics* 2, 775-780 (2006), and the highest reported value in an optical fiber (the previous record was ~10, as reported in C. J. Misas, P. Petropoulos, and D. J. Richardson, "Slowing of Pulses to c/10 With Subwatt Power Levels and Low Latency Using Brillouin Amplification in a Bismuth-Oxide Optical Fiber", *J. of Lightwave Technology*, Vol. 25, No. 1, January 2007). It corresponds to a group velocity of ~4,350 km/s, by far the lowest value reported to date in an optical fiber. The fit between the experimental and the theoretical spectra are excellent. This value of $n_g=69$ was observed at the second slow light peak from the Bragg wavelength (wavelength $\lambda_2$). The first slow-light peak could not be measured because, as shown in FIG. 26B, the first peak (around a wavelength of $\lambda_1=1549.692$ nm) was too weak to be measured. The FBG transmission at the second peak was ~0.5%. The group index measured at the third peak (wavelength $\lambda_3$) was only slightly lower (~68), but the FBG transmission was significantly higher, about 8%. The corresponding values for the fourth peak (wavelength $\lambda_4$) were $n_g\approx43$ and a transmission of 32%. FIG. 26C also shows that the bandwidth of the slow-light peaks increases as the order i of the slow light peak increases. This illustrates again that a given FBG can give a wide range of group index/group index bandwidth/transmission combination, which the user can select based on the desired performance for the intended application(s).

The last column in Table 1 summarizes the maximum $n_g$ values measured in the five gratings that were tested. In all cases except grating #4, the agreement between predicted and measured values was excellent. In the case of grating #4, the length was so long that the calculation failed to converge and provide a reliable value.

The linewidths of the slow light peaks tend to decrease as the group index increases, e.g., as the index contrast or the length of the grating are increased. To obtain the maximum benefit from a slow-light FBG sensor, or from a slow-light FBG used for other purposes, a laser can be selected with a linewidth that is smaller than the linewidth of the slow-light peak that is being used. If the linewidth of the laser is greater than the linewidth of the slow-light peak, the laser photons at the peak maximum experience maximum sensitivity, but photons detuned from the peak experience a lower sensitivity. The average sensitivity will therefore be reduced. This can be illustrated with the laser linewidths used in the measurements. For grating #1, which has a modest maximum group index, the group-index linewidth of this slow-light peak ($\lambda_1$) was relatively broad, and its transmission and group index spectra (FIGS. 25A and 25B) could be probed with a laser of linewidth equal to ~1 pm. For grating #3, which has a much higher maximum group index, the group-index linewidths of the slow-light peaks ($\lambda_2$, $\lambda_3$, and $\lambda_4$) were much narrower, and its transmission and group index spectra (FIGS. 26B and 26C) were probed with a laser of linewidth equal to ~0.8 fm (100 kHz in frequency). The linewidth of a slow-light peak can readily be calculated using the theoretical model described above, as has been illustrated with FIGS. 25 and 26. From this linewidth prediction, it is straightforward to compute the sensitivity of a sensor as a function of laser linewidth. The sensor can alternatively be operated with a broader linewidth, the disadvantage being a lower sensitivity (as per FIG. 16) but the advantage being a greater stability against temperature changes.

Temperature affects the slow light spectrum. As the temperature of the FBG changes, its period $\Lambda$, effective mode index, and length all vary due to a combination of thermal expansion and/or the temperature dependence of the index of refraction dependence of the fiber materials. These effects are well-known, and can readily be predicted using well-established mathematical models. As an example, the application of these basic effects to an FBG with L=2 cm, $\Delta n 1.5\times10^{-4}$, and $\lambda_{Bragg}=1.55$ μm predicts a relative temperature sensitivity of the first transmission peak wavelengths ($\lambda_1$ and $\lambda'_1$) of approximately $\Delta\lambda_1/\lambda_1=10$ pm per ° C. If the FBG is used as a strain sensor for example, as the temperature of the grating changes, the sensitivity to strain will generally vary because the transmission peak wavelengths vary with temperature. This can be avoided in practice by controlling the temperature of the FBG, to a degree that depends on the group index at the wavelength of operation (the higher the group index, in general the tighter the temperature control). Alternatively, one can use an athermal FBG, commercial devices in which the inherent temperature dependence of the FBG spectrum has been partially compensated by properly packaging the grating. Such devices are commercially available, for example from OE Land or Teraxion in Canada.

Fiber Bragg gratings can be subject to phase or amplitude disorder, namely, random variations along the grating longitudinal axis z in either the period of the grating or in the index contrast of the grating. It is well known that the presence of such disorder alters the properties of the FBG. In particular, generally such disorder results in broadening of the reflection peak and reduction of its power reflection coefficient. Similarly, phase or amplitude disorder will result in modification of the slow-light spectrum of an FBG, in particular in general towards reducing the transmission and group index of the slow-light peaks. If these effects are deemed deleterious for the application considered, measures may be taken to minimize phase or amplitude disorder during the fabrication of a slow-light FBG.

Figure 27:
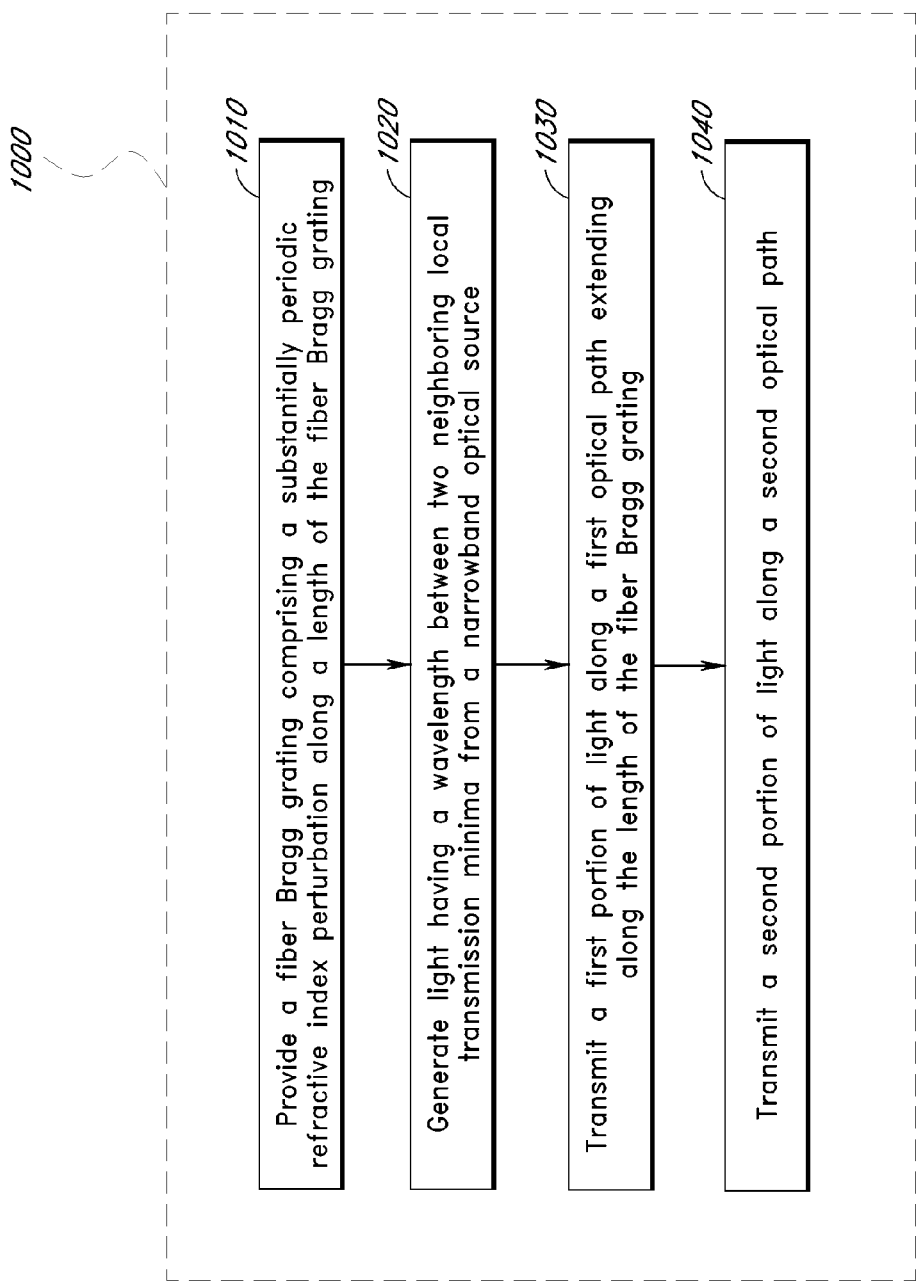
FIGS. 27-28 are flowcharts of example methods for optically sensing in accordance with certain embodiments described herein.

FIG. 27 is a flowchart of an example method 1000 for using a fiber Bragg grating in accordance with certain embodiments described herein. The method 1000 comprises providing an FBG 20 comprising a substantially periodic refractive index perturbation along a length of the FBG 20, as shown in operational block 1010. The FBG 20 has a power transmission spectrum comprising a plurality of local transmission minima. Each pair of neighboring local transmission minima has a local transmission maximum therebetween. The local transmission maximum has a maximum power at a transmission peak wavelength. The method 1000 also comprises generating light having a wavelength between two neighboring local transmission minima from a narrowband optical source, as shown in operational block 1020 of FIG. 28. In certain embodiments, the generated light has a linewidth that is narrower than the linewidth of the transmission peak. The method 1000 further comprises transmitting a first portion 33a of light along a first optical path 31 extending along and through the length of the FBG 20 in operational block 1030, and transmitting a second portion 33b of light along a second optical path 32 in operational block 1040. In certain embodiments in which the FBG is used in an optical sensor, the method 1000 further comprises detecting the first portion 33a, the second portion 33b, or both the first and second portions 33a 33b with an optical detector 30 in operational block 1050.

In certain embodiments of the method 1000, the substantially periodic refractive index perturbation has a constant period along the length of the FBG 20. In certain other embodiments, the substantially periodic refractive index perturbation has a period which varies along the length of the FBG 20 such that the FBG 20 is a chirped grating. In some embodiments, the substantially periodic refractive index perturbation has an amplitude which varies along the length of the FBG 20 such that the FBG 20 is an apodized grating.

In certain embodiments of the method 1000, the method 1000 further comprises recombining and transmitting the first and second portions 33a 33b to an optical detector 40. For example, in certain embodiments, the method 1000 comprises providing a first fiber coupler 51 in optical communication with the narrowband light source 30, the first optical path 31, and the second optical path 32; and providing a second fiber coupler 52 in optical communication with the first optical path 31 and the second optical path 32. In these embodiments, the method 1000 includes splitting the light generated by the narrowband optical source 30 by the first fiber coupler 51 into the first portion 33a and the second portion 33b. Thus, in these embodiments, recombining and transmitting are accomplished by the second fiber coupler 52. Also, in these embodiments, detecting 1050 comprises detecting a phase difference between the first portion 33a and the second portion 33b. In certain embodiments, the first optical path 31 and the second optical path 32 form a nominally balanced Mach-Zehnder interferometer.

In certain embodiments, the phase difference is indicative of an amount of strain applied to the FBG 20. In some embodiments, the phase difference is indicative of a temperature of the FBG 20.

In certain embodiments of the method 1000, transmitting 1040 a second portion 33b of light along a second optical path 32 comprises reflecting the second portion 33b from the FBG 20. In these embodiments, detecting 1050 can comprise detecting an optical power of the first portion 33a, the second portion 33b, or both the first and second portions 33a 33b. In some embodiments, the detected optical power is indicative of an amount of strain applied to the FBG 20. In some embodiments, the detected optical power is indicative of a temperature of the FBG 20. In certain embodiments of the method 1000, the first portion 33a transmitted along the FBG 20 has a first group velocity less than a second group velocity of light having a wavelength outside a reflected range of wavelengths transmitted along the FBG 20. In some of these embodiments, the ratio of the first group velocity to the second group velocity is equal to or less than 1/3. In some embodiments, the ratio of the first group velocity to the second group velocity is equal to or less than 1/10.

Figure 28:
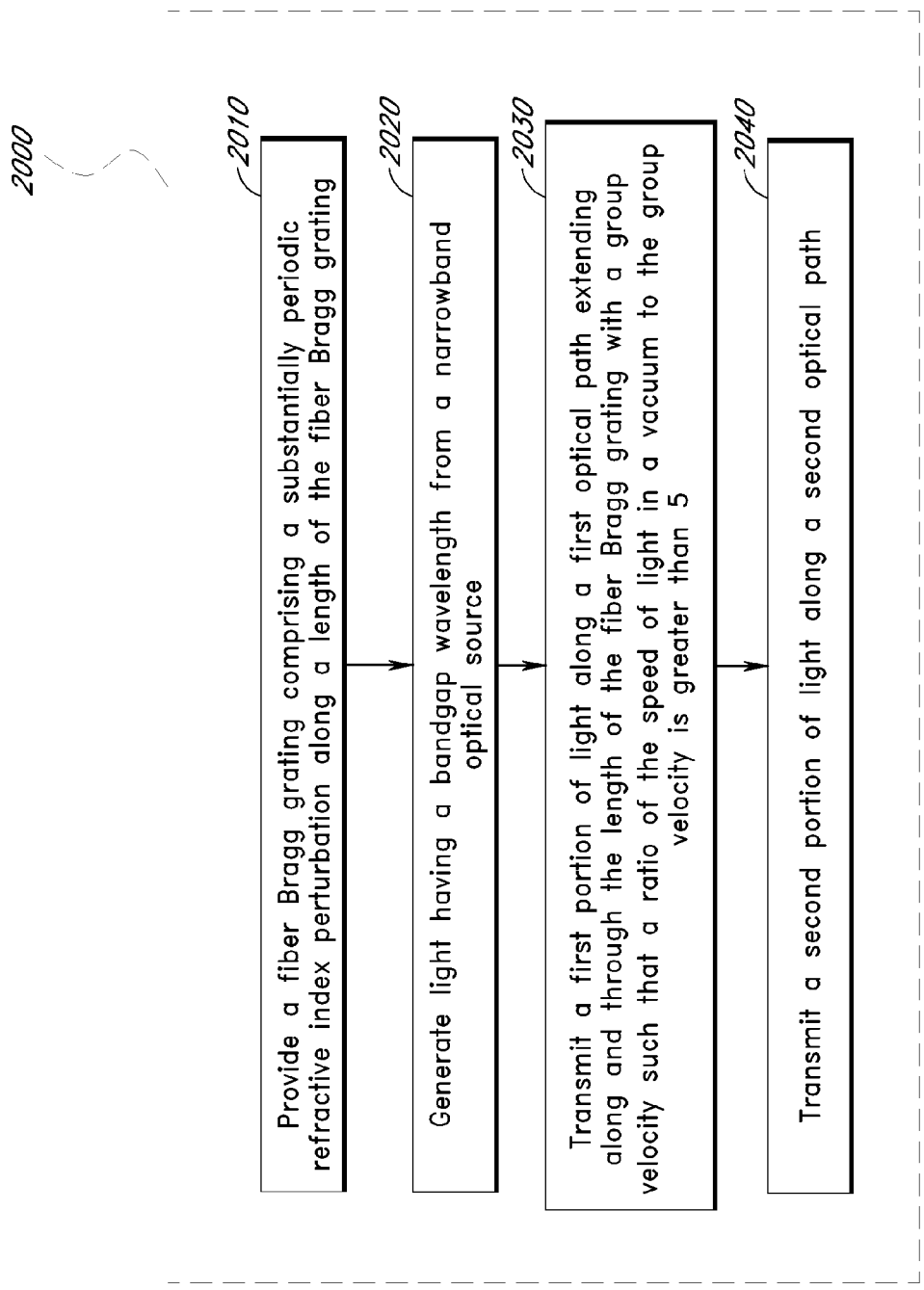

FIG. 28 is a flowchart of another embodiment of a method 2000 for using a fiber Bragg grating in accordance with certain embodiments described herein. The method 2000 comprises providing an FBG 20 comprising a substantially periodic refractive index perturbation along a length of the FBG 20, as shown in operational block 2010. In certain embodiments of the method 2000, the method 2000 comprises generating light having a wavelength from a narrowband optical source 30, as shown in operational block 2020. In certain embodiments, the wavelength is in the vicinity of a slow-light peak of the FBG 20. The method 2000 further comprises transmitting a first portion 33a of light along a first optical path 31 extending along and through the length of the FBG 20 with a group velocity such that a ratio of the speed of light in vacuum to the group velocity is greater than 5 in operational block 2030, and transmitting a second portion 33b of light along a second optical path 32 in operational block 2040. In certain embodiments in which the FBG 20 is used for optical sensing, the method 2000 further comprises detecting the first portion 33a, the second portion 33b, or both the first and second portions 33a 33b with an optical detector 40 in operational block 2050.

Optimization with Figures of Merit

The operation of certain embodiments of a novel type of fiber sensor utilizing a fiber Bragg grating (FBG) as the sensing element is described herein and in U.S. patent application Ser. No. 12/792,631, filed on Jun. 2, 2010, which is incorporated in its entirety by reference herein. A difference with other FBG sensors reported to date in the literature is that certain embodiments described herein sense with slow light. Slow light can be excited in the FBG by launching light of a particular wavelength into the FBG. In certain embodiments implementing this concept, this wavelength can be selected in the vicinity of one of the high-transmission peaks that exist for certain FBGs on the edges of the FBG's bandgap. On the short-wavelength side of the bandgap as shown in FIGS. 9A and 9E, these wavelengths can be labeled $\lambda_j$, where j is an integer greater or equal to 1, the peak j=1 being the peak closest to the bandgap. On the long-wavelength side of the bandgap, these wavelengths can be labeled $\lambda'_j$, where j is an integer greater or equal to 1, the peak j=1 being the peak closest to the bandgap. At these wavelengths, the FBG can support slow light, characterized by a group velocity that can be substantially lower than that of light normally traveling in an optical fiber. This low group velocity $v_g$ can be characterized by a high group index $n_g = c/v_g$, where c is the speed of light in vacuum.

When a perturbation (e.g., a strain) to be sensed is applied to a phase sensor in accordance with certain embodiments, the resulting perturbation of the phase of the light traveling through the sensor is proportional to the reciprocal of the group velocity. Consequently, in these embodiments, operating an FBG in the vicinity of one of these transmission peaks can result in an increased sensitivity to a measurand. This can be true in particular, but not limited to, temperature, strain, displacement, and relative rotation. In certain embodiments of FBG sensors utilizing slow light, the sensitivity to the measurand can therefore scale like the group index. Thus, in certain embodiments, with everything else being the same, the higher the group index, or the slower the group velocity, the higher the sensitivity.

As disclosed in certain embodiments described herein and in U.S. patent application Ser. No. 12/792,631, light generally can have the lowest group velocity at the first (j=1) peak. For example, certain embodiments of a uniform FBG can have the lowest group velocity on both sides of the bandgap, namely at both $\lambda_1$ and $\lambda'_1$. As another example, certain embodiments of an apodized FBG described herein and in U.S. patent application Ser. No. 12/792,631, can have the lowest group velocity on the short-wavelength side of the bandgap, namely at $\lambda_1$. Owing to the asymmetry of the spectral response of these particular apodized gratings, certain embodiments may exhibit little to substantially no pronounced high transmission peaks on the long-wavelength side of the bandgap.

Figure 30:
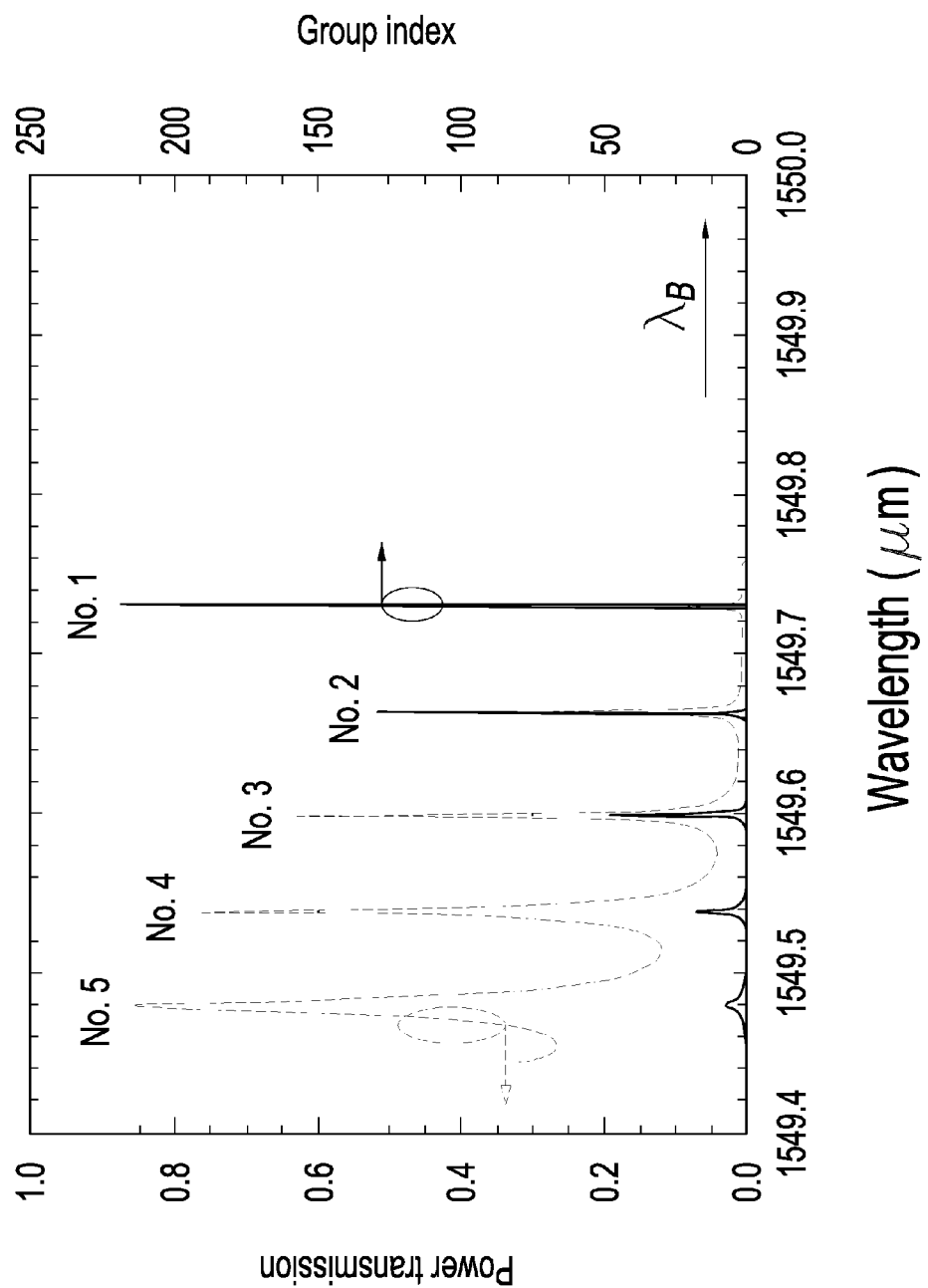
FIG. 30 shows an example transmission spectrum calculated and the calculated group index spectrum for the example apodized grating for an example apodized grating.

FIG. 30 shows an example transmission spectrum calculated for an example apodized grating. The example transmission spectrum was calculated for an apodized grating with a length L=1.2 cm, a loss of 1 m$^{-1}$, and a Gaussian index profile envelop with a peak index modulation Δn=1.04×10$^{-3}$ and a full width at half maximum (FWHM) W=0.98 cm. Its peak index modulation is 0.06 cm away from the center position of the grating at 0.6 cm. With the apodization shift the $n_g$ in peak No. 1 in FIG. 30 is 218.6 and in peak No. 2 is 126.8. Without the shift, the $n_g$ in peak No. 1 is 225.2 and in peak No. 2 is 148.4. Shifting the peak index modulation from the center position of the grating will reduce the $n_g$, but in this case, the change in group index is not significant because the shift is small compared to the length of the grating. For clarity, only the short-wavelength side of the spectrum is shown. As described above for certain embodiments, the transmission spectrum exhibits sharp peaks on the edge of the bandgap. In FIG. 30, $\lambda_B$ points to the location of the Bragg wavelength of the FBG, located outside of the figure at a wavelength of 1550.176 nm in this example. In this example, the transmission peaks have peak transmission values that increase with the peak number j. In this example, the transmission peaks also broaden as the peak number increases.

FIG. 30 also shows the calculated group index spectrum of the example apodized grating. Again, for clarity, only the short-wavelength side is shown. As discussed for certain embodiments described herein and in U.S. patent application Ser. No. 12/792,631, this spectrum also can exhibit sharp resonances, centered at wavelengths that fall very close to the wavelengths $\lambda_j$ and $\lambda'_j$ of the transmission peaks. In certain embodiments, the first peak (j=1) exhibits the highest $n_g$, e.g., the slowest group velocity. In these embodiments, the maximum value of the group index of subsequent slow-light peaks decreases as the number of the peak (j) increases.

Based on these concepts, two general classes of sensors in accordance with certain embodiments are disclosed herein and in U.S. patent application Ser. No. 12/792,631. In certain embodiments of the first class, referred to as the transmission mode, the FBG is placed in one of the arms of a nominally balanced Mach-Zehnder (MZ) interferometer, and the interferometer can be probed at a wavelength in the vicinity of a slow-light peak of the FBG. An example diagram of this approach is described above and shown in FIG. 7. In certain embodiments of the second class of sensors, the wavelength can be selected to fall on either side of a slow light peak, at or in the vicinity of the wavelengths where the slope of the group index spectrum is maximum. These sensors can be then used in the reflection mode, as described above and shown in FIG. 8.

Based on the proportionality of the sensitivity to group index alone, one may be inclined to conclude that to achieve the highest possible sensitivity, one may probe the sensor at a wavelength in the vicinity of the maximum of the first slow-light peak. However, for certain embodiments, this may not necessarily be the case, as will be described below.

a. Transmission Configuration

Figure 31:
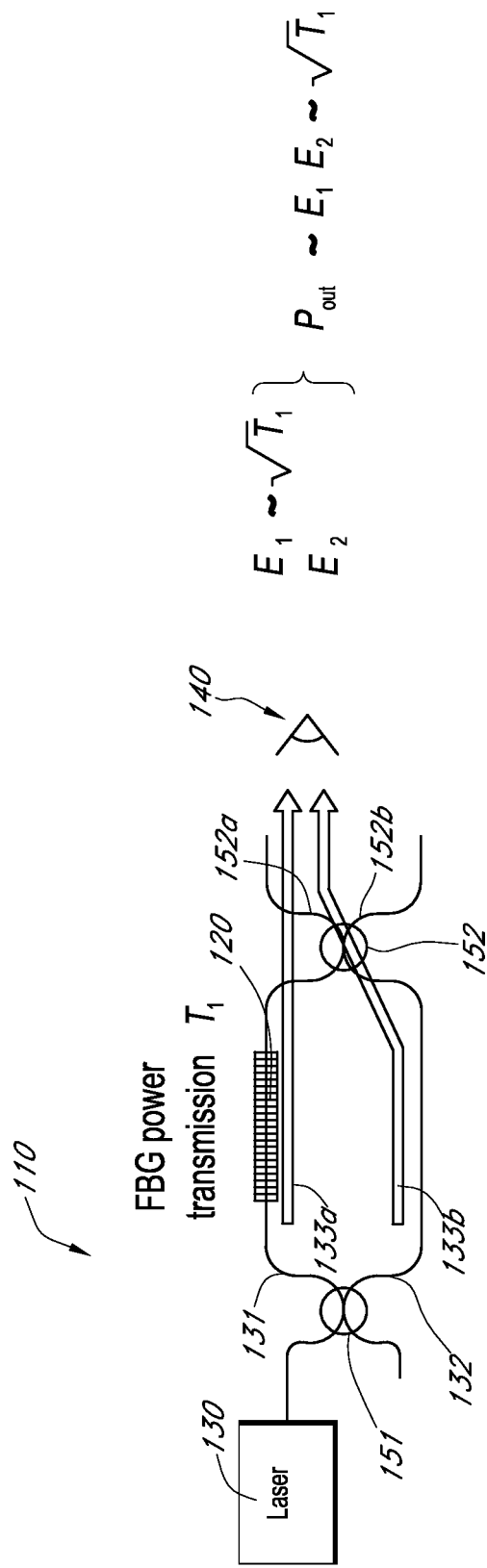
FIG. 31 shows a diagram of an example implementation of an apparatus utilizing an FBG used in the slow-light transmission mode in accordance with certain embodiments described herein.

FIG. 31 shows a diagram of an example implementation of an apparatus utilizing an FBG used in the slow-light transmission mode in accordance with certain embodiments described herein. As shown in FIG. 31, the optical device 110 can comprise an FBG 120 comprising a substantially periodic refractive index modulation along a length of the FBG 120. The FBG 120 can have a power transmission spectrum comprising a plurality of local transmission maxima, the local transmission maxima each having a maximum power at a transmission peak wavelength. The FBG 120 has a group index spectrum as a function of wavelength. The optical device 110 can comprise a narrowband optical source 130 in optical communication with a first optical path 131 and a second optical path 132. The narrowband optical source 130 can be configured to generate light, which can be configured to be split into a first portion 133a and a second portion 133b. The first portion 133a can be transmitted along the first optical path 131 extending along and through the length of the FBG 120 at a group velocity. The light can have a wavelength at or in the vicinity of a wavelength at which the product of the group index spectrum and the square root of the power transmission spectrum is at a maximum value (e.g., higher than for any other wavelengths in the vicinity of an edge of the bandgap of the FBG 120).

In certain embodiments, the FBG 120 can be similar to the FBG 20 as described herein. For example, the FBG 120 can be fabricated by exposing the core of an optical fiber to a spatially modulated UV beam. The index modulation can take any number of spatial distributions. The optical fiber can be a conventional single-mode fiber or a multimode fiber. The optical fiber can be doped with special elements such that exposure to spatially varying light can induce a desired modulation in the refractive index. The spatially periodic refractive index modulation in the FBG 120 can have a constant period along the length of the FBG 120, as in uniform gratings, can have a period that varies along the length of the FBG 120, as in chirped gratings, or can have the amplitude of the index modulation vary along the length of the FBG 120, as in apodized gratings. As shown in FIGS. 9A and 9E, the FBG 120 can have a power transmission spectrum comprising a plurality of local transmission maxima, the local transmission maxima each having a maximum power at a transmission peak wavelength.

In certain embodiments, the narrowband optical source 130 can be similar to the narrowband optical source 30 described herein. For example, the narrowband optical source 130 can comprise a semiconductor laser, or a fiber laser, e.g., Er-doped fiber laser with a wavelength range between approximately 1530 nm and 1565 nm. As another example, the narrowband optical source 130 can comprise a Nd:YAG laser with a wavelength of 1064.2 nm. In some embodiments, the narrowband optical source 130 can have a narrow linewidth, e.g., less than or equal to 10$^{-13}$ m.

The narrowband optical source 130 can be in optical communication with a first optical path 131 and a second optical path 132. The light generated by the narrowband optical source 130 can be split into a first portion 133a and a second portion 133b. In certain embodiments, the first portion 133a can be transmitted along the first optical path 131 extending along and through the length of the FBG 120 at a group velocity. In certain embodiments, the second portion 133b can be transmitted along the second optical path 132 not extending along the length of the FBG 120. In certain embodiments, the first optical path 131 can be different from the second optical path 132, as shown in FIG. 31. In other embodiments, the first optical path 131 and the second optical path 132 may at least partially overlap one another. The first optical path 131 and the second optical path 132 may transverse free space or various optical elements. For example, the first optical path 131 and/or the second optical path 132 may transverse an optical element, e.g., a fiber coupler as will be discussed below. In certain embodiments, the light generated by the narrowband optical source 130 can have a wavelength at or in the vicinity of a wavelength at which the product of the group index and the square root of the power transmission is the highest, as also will be discussed more fully below.

In certain embodiments, the optical device 110 can comprise at least one optical detector 140. The optical detector 140 can be configured to be in optical communication with the FBG 120. The optical detector 140 can be configured to receive and detect an optical power of the first portion 133a of light, the second portion 133b of light, or both the first portion 133a and the second portion 133b of light. In FIG. 31, the optical detector 140 can receive and detect both the first portion 133a and the second portion 133b of light. In certain embodiments, the optical detector 140 can be similar to the optical detector 40 described herein. For example, the optical detector 140, can be a general purpose low-noise photodetector.

In certain embodiments, the optical device 110 can comprise a first fiber coupler 151 in optical communication with the narrowband light source 130, the first optical path 131, and the second optical path 132. As show in FIG. 31, the light generated by the narrowband optical source 130 can be split by the first fiber coupler 151, e.g., a 3-dB fiber coupler, into the first portion 133a and the second portion 133b. The first portion 133a can be transmitted along the first optical path 131. The second portion 133b can be transmitted along the second optical path 132. The first portion 133a can propagate along the FBG 120 while the second portion 133b may not substantially interact with the FBG 120. The first portion 133a in this embodiment can include information regarding the perturbation of the FBG 120, while the second portion 133b in this embodiment can remain unaffected by the perturbation.

The optical sensor 110 further can comprise a second fiber coupler 152, e.g., a 3-dB fiber coupler, in optical communication with the first optical path 131 and the second optical path 132. The first portion 133a and the second portion 133b can be recombined by the second fiber coupler 152 and transmitted to at least one optical detector 140. As discussed herein, this recombination can allow the first portion 133a and the second portion 133b to interfere with one another, producing a combined signal that can contain information regarding the phase difference between the first portion 133a and the second portion 133b. As shown in FIG. 31, the optical detector 140 can comprise a single optical detector at one of the output ports of the second fiber coupler 152. In certain other embodiments, as schematically illustrated by FIG. 7, the optical detector 140 can comprise a first optical detector 40a at one output port of the second fiber coupler 52 and a second optical detector 40b at the other output port of the second fiber coupler 52. In certain embodiments, the phase difference can be indicative of an amount of strain applied to the FBG 120. In certain other embodiments, the phase difference can be indicative of the temperature of the FBG 120.

As described above, the light generated by the narrowband optical source 130 can have a wavelength at or in the vicinity of a wavelength at which the product of the group index and the square root of the power transmission is the highest. For example, as shown in FIG. 31, the optical device 110 can be an optical sensor in a transmission mode of operation, e.g., a MZ interferometer as described herein. The signal at the output of the optical device, e.g., a MZ interferometer, can be the coherent sum of the field $E_1$ transmitted into port 152a by the first optical path 131, and the field $E_2$ transmitted into port 152b by the second optical path 132. These fields can be written as:

$$E_1 = E_0 \sqrt{1-\eta} \exp(i\phi_1) t_1 \sqrt{1-\eta} \quad (10)$$

-continued
$$E_2 = E_0 \sqrt{\eta} \exp\left(i\frac{\pi}{2}\right) \exp(i\phi_2) t_2 \sqrt{\eta} \exp\left(i\frac{\pi}{2}\right)$$

where $E_0$ is the field produced by the narrowband optical source 130 and incident on the first fiber coupler 151, $\sqrt{\eta}$ is the field coupling coefficient of the first optical coupler 151, or equivalently $\eta$ is the power coupling coefficient of the first optical coupler 151, $\phi_1$ and $\phi_2$ are the phase accumulated by light propagation through the first optical path 131 and the second optical path 132, respectively, and $t_1$ and $t_2$ are the field transmission of the first optical path 131 and the second optical path 132, respectively. The $\exp(i\pi/2)$ phase terms account for the well-known $\pi/2$ phase shift that light picks up when it is coupled across a coupler. At the upper output port 152a of the optical device 110, the field is given as the coherent sum of $E_1$ and $E_2$, and the output power $P_{out}$ is proportional to the square of the modulus of this total field. Hence:

$$P_{out} = P_0 |\sqrt{1-\eta} \exp(i\phi_1) t_1 \sqrt{1-\eta} + \sqrt{\eta} \exp(i\phi_2) t_2 \sqrt{\eta} \exp(i\pi)|^2 \quad (11)$$
$$= P_0 |(1-\eta) t_1 - \eta t_2 \exp(i\Delta\phi)|^2$$

where $P_0$ is the power incident on the first fiber coupler 151 of the optical device 110, and $\Delta\phi = \phi_2 - \phi_1$ is the difference between the phases experienced by the two signals in the two optical paths 131, 132. Expanding the square in the last equality of Equation 11 gives:

$$P_{out} = P_0((1-\eta)^2 t_1^2 + \eta^2 t_2^2) - 2P_0 \eta(1-\eta) t_1 t_2 \cos(\Delta\phi) \quad (12)$$

The first term in the right hand side of Equation 12 is a DC term independent of the phase and of the phase perturbation applied to the FBG 120. The second term contains the interference term between the two waves, and therefore the one that can contain important phase information.

In accordance with certain embodiments, when a perturbation $\delta\psi$ is applied to the FBG 120 in the optical device 110 of FIG. 31, this perturbation can induce a change in the phase of the signal propagating through the FBG 120. This phase perturbation can be proportional to the perturbation (for small enough perturbations) and as seen above, to the group index of the light in the FBG 120. It may therefore be written as:

$$\delta\phi \propto \frac{2\pi}{\lambda} n_g \delta\psi \quad (13)$$

The phase difference $\Delta\phi$ in Equation 12 is the sum of a constant term, which is the built-in phase difference between the two optical paths 131, 132, and this phase perturbation $\delta\phi$. When this built-in phase difference is selected to be $\pi/2$ (modulo $\pi$), the output power $P_{out}$ depends maximally on a small perturbation $\delta\psi$. The phase-dependent portion of the output power (second term in the right hand side of Equation 12) can then be written as:

$$P_{out}(\delta\phi) = -2P_0 \eta(1-\eta) t_1 t_2 \cos\left(\frac{\pi}{2} + \delta\phi\right) \quad (14)$$
$$= 2P_0 \eta(1-\eta) t_1 t_2 \sin(\delta\phi)$$

In certain embodiments, if the phase perturbation is small (as when attempting to measure extremely small perturbations applied to the FBG 120), $\sin(\delta\phi) \approx \delta\phi$, and Equation 14 becomes:

$$P_{out}(\delta\phi) \approx 2P_0\eta(1-\eta)t_1t_2\delta\phi \propto 2P_0\eta(1-\eta)t_1t_2\frac{2\pi}{\lambda}n_g\delta\psi \qquad (15)$$

using Equation 13 to replace $\delta\phi$ in the rightmost side of the equation.

Thus, in certain embodiments, the output power, which is the signal provided by the optical device 110, e.g., MZ interferometer, as a result of the perturbation applied to the FBG 120, is proportional to $\eta(1-\eta)t_1t_2n_g$. To maximize this signal, and therefore the sensitivity of the optical device 110 in accordance with certain embodiments described herein, one can first maximize the product $\eta(1-\eta)$. This can be achieved when $\eta=0.5$. The sensitivity of the optical device 110, e.g., a MZ interferometer, is maximum when the first fiber coupler 151 and the second fiber coupler 152 have a 50% power coupling coefficient. The second item that can be maximized to maximize the output power is the product $t_1t_2n_g$. This can be achieved by first maximizing the transmission $t_2$ of the second optical path 132, e.g., the reference arm of a MZ interferometer. The second step is to maximize the product $t_1n_g$. The field transmission $t_1$ of the first optical path 131 can be more conveniently expressed as $\sqrt{T_1}$, where $T_1$ is the power transmission of the first optical path 131. The sensitivity of the optical device of FIG. 31 in accordance with certain embodiments can therefore be maximized not simply when $n_g$ is highest, but when the product $n_g\sqrt{T_1}$ is the highest. The relevant figure of merit that is maximized to maximize the sensitivity of this optical device 110 is therefore $F_t=n_g\sqrt{T_1}$.

Figure 32:
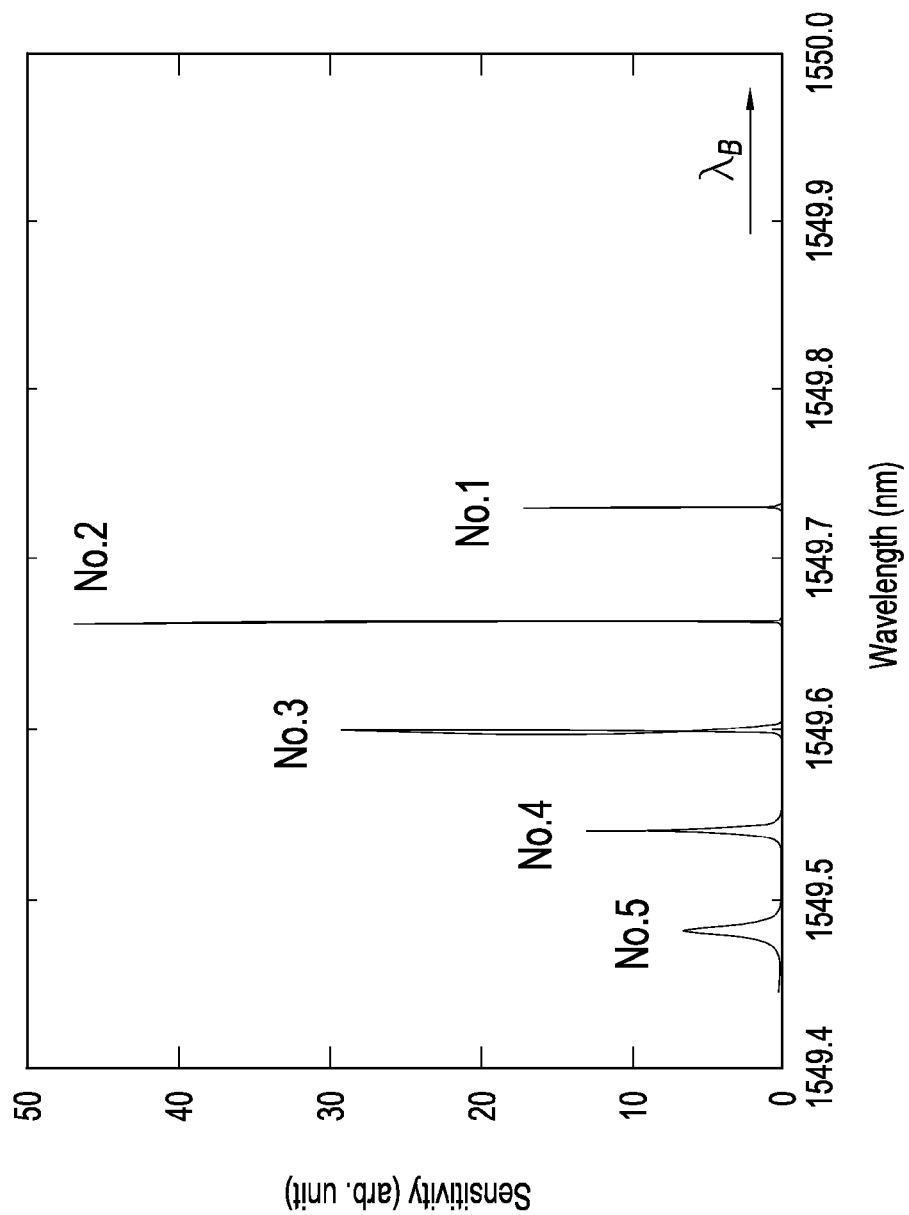
FIG. 32 shows an example figure of merit, which is the product of the square root of the transmission spectrum by the group index spectrum of FIG. 30.

FIG. 32 shows an example figure of merit, which is the product of the square root of the transmission spectrum of FIG. 30 by the group index spectrum of FIG. 30. As discussed earlier, both $T_1$ (plotted in FIG. 30) and $n_g$ (plotted in FIG. 30) depend strongly on wavelength. The figure of merit $F_t$ is therefore also strongly wavelength dependent, as shown in FIG. 32. FIG. 32 shows that in this particular example of an apodized FBG, the figure of merit (or sensitivity) is not maximum at the wavelength of the first slow-light peak. As shown in FIG. 30, at the first slow-light peak, $n_g$ is highest but $T_1$ is very weak for this example. On the other hand, at the second peak, $n_g$ is only marginally smaller, but $T_1$ is significantly higher, hence $F_t$ is higher at the second peak than at the first peak for this example. In this example, for subsequent slow-light peaks, $n_g$ decreases more than $T_1$ increases, so the figure of merit at these other peaks is lower than at the second peak. The net result is that operating at the second peak (wavelength $\lambda_2$) yields in this particular example the highest figure of merit, and hence the most sensitive optical device 110. Plotting figures such as FIGS. 30 and 32 can be helpful to figure out, for a particular FBG 120, the optimum wavelength of operation for maximum sensitivity.

Plotting figures, such as FIGS. 30 and 32 may not be necessary in certain embodiments. For example, in certain embodiments using a uniform grating, the peaks in the transmission spectrum all have a maximum value of 1. The wavelengths of maximum sensitivity are dictated by the group index spectrum, and they coincide approximately with the wavelengths $\lambda_j$ and $\lambda'_j$. The wavelengths that provide the highest sensitivity in these embodiments are therefore the ones that maximize the group index, which are $\lambda_1$ and $\lambda'_1$. However, in order to determine the bandwidth of certain embodiments of the slow-light sensor, or equivalently the maximum perturbation it can detect, it can be advantageous to plot the spectrum of the figure of merit F, since it contains the spectral, and therefore the bandwidth information of the detected signal.

b. Reflection Configuration

Certain embodiments described herein utilize an FBG used in the slow-light reflection mode, e.g., as shown in FIG. 8. The optical device 10 can comprise a narrowband optical source 30 in optical communication with a first optical path 31 and a second optical path 32. The narrowband optical source 30 can be configured to generate light, which is configured to be split by the FBG 20 into a first portion 33a and a second portion 33b. The light can have a wavelength at or in the vicinity of a wavelength at which the slope of the product of the group index spectrum and one minus the power transmission spectrum as a function of wavelength is a maximum value (e.g., higher than for any other wavelengths in the vicinity of an edge of the bandgap of the FBG 20). In certain embodiments, the light can have a wavelength at or in the vicinity of a wavelength at which the slope of the product of the group index spectrum and the power transmission spectrum as a function of wavelength is a maximum value (e.g., higher than for any other wavelengths in the vicinity of an edge of the bandgap of the FBG 20).

In addition, as discussed above, certain embodiments of the optical device 10 shown in FIG. 8 further can comprise at least one optical detector 40a and/or 40b. The optical device 10 of FIG. 8 also can include at least one fiber coupler 51.

In certain embodiments, the light generated by the narrowband optical source 30 can be split by the FBG 20 into a first portion 33a and a second portion 33b. In certain embodiments, at least one optical detector 40a and/or 40b can be configured to receive the first portion 33a, the second portion 33b, or both the first and second portions 33a, 33b of light.

In certain embodiments, the FBG 20 can be interrogated with a narrowband optical source 30, the light generated by the narrowband optical source 30 can be split by the FBG 20 into the first portion 33a and the second portion 33b. The wavelength of the light interrogating the FBG 20 can be at or in the vicinity of a wavelength at which the slope of the product of the group index and one minus the power transmission as a function of wavelength is a maximum, discussed more fully below. In certain embodiments, the wavelength of the light interrogating the FBG 20 can be at or in the vicinity of a wavelength at which the slope of a product of the group index and the power transmission as a function of wavelength is a maximum, discussed more fully below.

As discussed above, when an external perturbation is applied to the FBG 20, the reflection peak can shift in wavelength. This shift of $\lambda_{Bragg}$ can result in a change in the first portion 33a of light transmitted by the FBG 20 and in the second portion 33b of light reflected by the FBG 20, for example, in the power of the reflected light at the wavelength of the light incident on the FBG 20.

In the case of the reflection mode of operation (e.g., FIG. 8), the output power of the optical device 10 in accordance with certain embodiments is proportional to $n_g$, as in the transmission mode, e.g., FIG. 31, times the power reflection coefficient of the FBG 20, which is $R_1=1-T_1$ when the output power is the power reflected by the FBG 20. The relevant figure of merit is then $F_r=(1-T_1)n_g$. When the output power is the power transmitted by the FBG 20, the relevant figure of merit is $F'_r=T_1n_g$. Plots similar to FIG. 32 can be plotted to obtain the spectrum of either $F_r$ or $F'_r$, depending on which output is measured as the output of the optical device 10. The wavelength of operation that maximizes the sensitivity is then given by the wavelength at which the slope of the figure of merit is maximum.

c. Further Example Embodiments

Figure 33A:
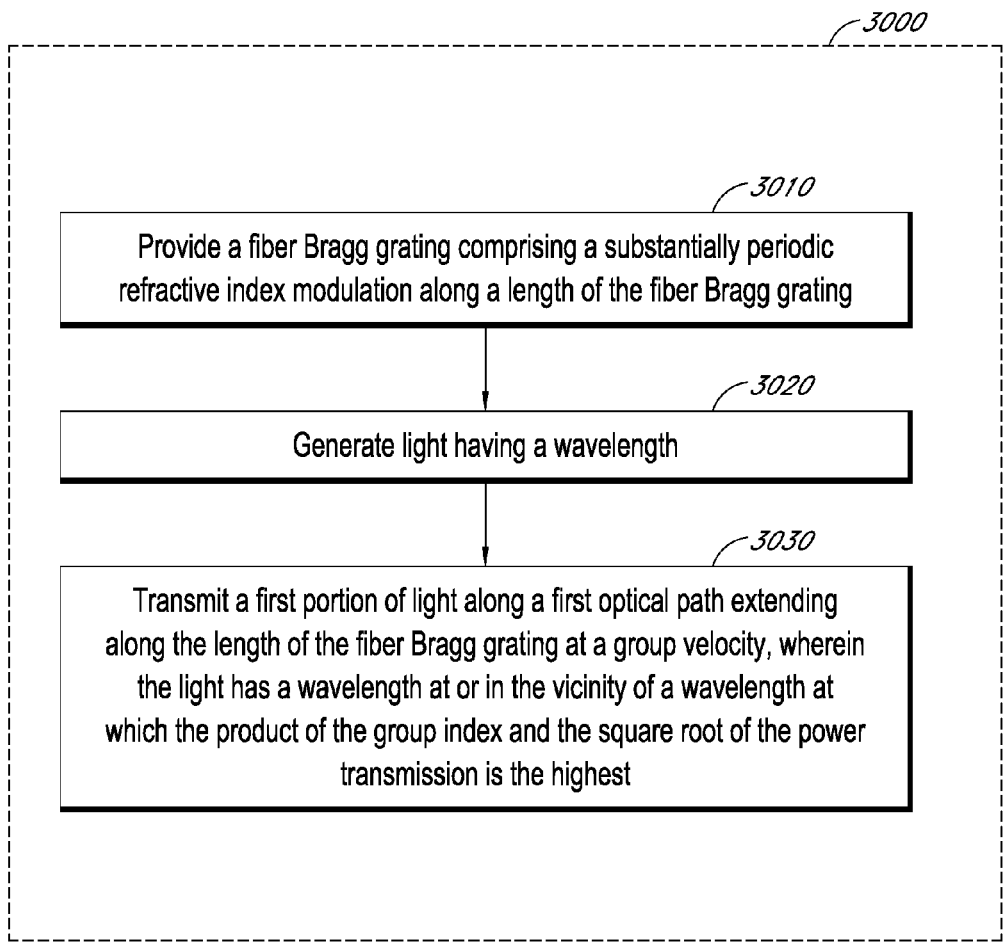
FIGS. 33A-33C are flowcharts of example methods for optically sensing in accordance with certain embodiments described herein.

FIG. 33A is a flowchart of an example method 3000 for using a fiber Bragg grating in accordance with certain embodiments described herein. The method 3000 comprises providing an FBG 20 comprising a substantially periodic refractive index perturbation along a length of the FBG 20, as shown in operational block 3010. The FBG 20 can have a power transmission spectrum comprising a plurality of local transmission maxima. The local transmission maxima each has a maximum power at a transmission peak wavelength. The method 3000 also comprises generating light, as shown in operational block 3020 of FIG. 33A. The light can be generated by a narrowband optical source 30. In certain embodiments, the narrowband optical source 30 is in optical communication with a first optical path 31 and a second optical path 32. The light is also split into a first portion 33a of light and a second portion 33b of light. The method 3000 further can comprise transmitting a first portion 33a of light along a first optical path 31 extending along and through the length of the FBG 20 at a group velocity in operational block 3030. In certain embodiments, the light can have a wavelength at or in the vicinity of a wavelength at which the product of the group index and the square root of the power transmission is at a maximum value (e.g., higher than for any other wavelengths in the vicinity of an edge of the bandgap of the FBG 20).

Certain embodiments of the method 3000 further can comprise receiving the first portion 33a, the second portion 33b, or both the first portion 33a and the second portion 33b of light with an optical detector 40; and detecting an optical power of the first portion 33a, the second portion 33b, or both the first portion 33a and the second portion 33b of light. The method 3000 further can comprise transmitting the second portion 33b of light along the second optical path 32. The second optical path 32 might not extend along and through the FBG 20. In various embodiments, the method 3000 further can comprise providing a first fiber coupler 51 in optical communication with the narrowband optical source 30, the first optical path 31, and the second optical path 32. Furthermore, the method 3000 can comprise providing a second fiber coupler 52 in optical communication with the optical detector 40, the first optical path 31, and the second optical path 32.

In certain embodiments of the method 3000, the method 3000 further can comprise recombining and transmitting the first and second portions 33a, 33b of light to the optical detector 40. In these embodiments, the method 3000 can include splitting the light generated by the narrowband optical source 30 by the first fiber coupler 51 into the first portion 33a and the second portion 33b. Thus, in these embodiments, recombining and transmitting can be accomplished by the second fiber coupler 52. Also, in these embodiments, detecting can comprise detecting a phase difference between the first portion 33a and the second portion 33b. In certain embodiments, the first optical path 31 and the second optical path 32 can form a nominally balanced Mach-Zehnder interferometer. In certain embodiments, the phase difference can be indicative of an amount of strain applied to the FBG 20. In other embodiments, the phase difference can be indicative of a temperature of the FBG 20.

In certain embodiments of the method 3000, the substantially periodic refractive index perturbation can have a constant period along the length of the FBG 20. In certain other embodiments, the substantially periodic refractive index perturbation can have a period which varies along the length of the FBG 20 such that the FBG 20 is a chirped grating. In some embodiments, the substantially periodic refractive index perturbation can have an amplitude which varies along the length of the FBG 20 such that the FBG 20 is an apodized grating.

Figure 33B:
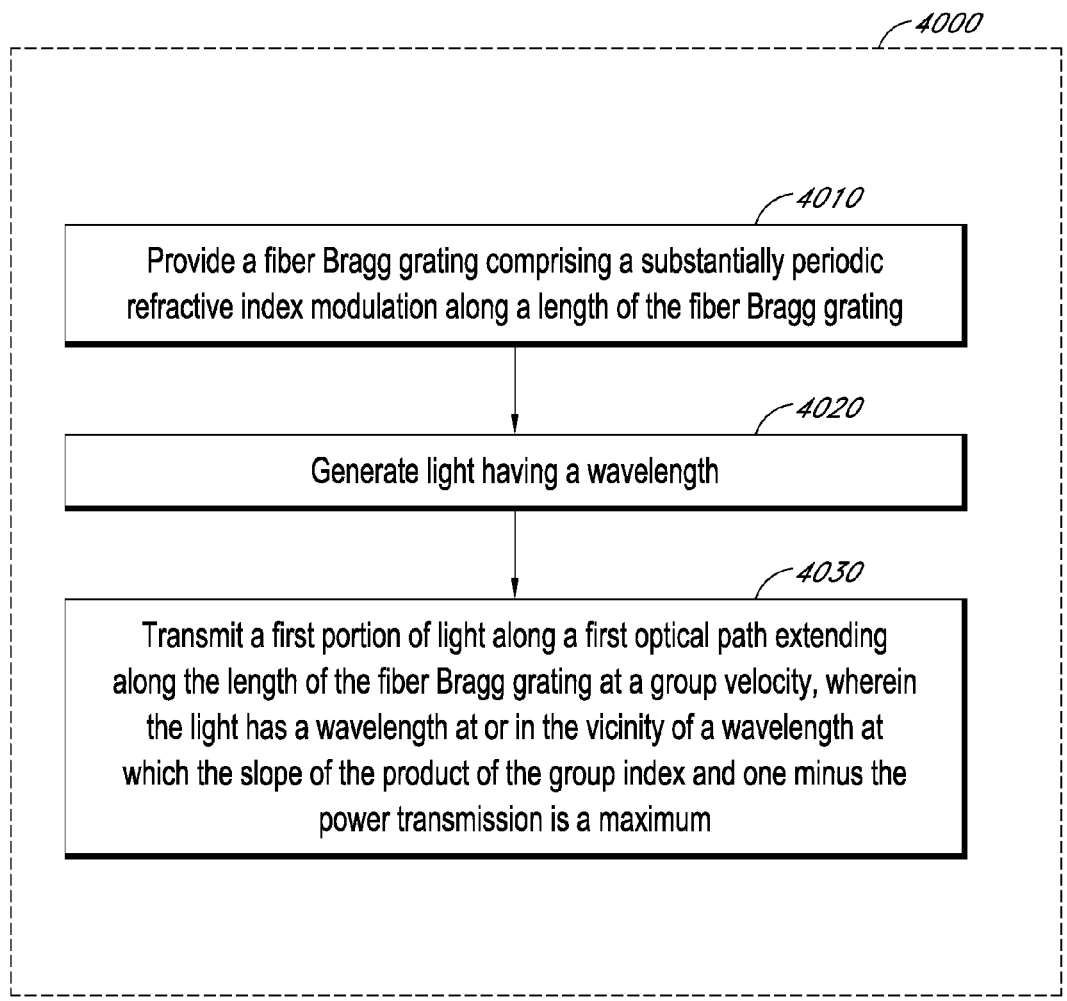

FIG. 33B is a flowchart of another embodiment of a method 4000 for using a fiber Bragg grating in accordance with certain embodiments described herein. The method 4000 can comprise providing an FBG 20 comprising a substantially periodic refractive index perturbation along a length of the FBG 20, as shown in operational block 4010. In certain embodiments of the method 4000, the method 4000 can comprise generating light having a wavelength, as shown in operational block 4020. The light can be generated from a narrowband optical source 30. In certain embodiments, the narrowband optical source 30 can be in optical communication with a first optical path 31 and a second optical path 32. The light can also split into a first portion 33a of light and a second portion 33b of light. The method 4000 further can comprise transmitting a first portion 33a of light along a first optical path 31 extending along and through the length of the FBG 20 at a group velocity in operational block 4030. In certain embodiments, the light has a wavelength at or in the vicinity of a wavelength at which the slope of a product of the group index and one minus the power transmission as a function of wavelength is a maximum (e.g., a maximal value compared to the values of this quantity for any other wavelengths in the vicinity of an edge of the bandgap of the FBG 20).

Certain embodiments of the method 4000 further can comprise receiving the first portion 33a, the second portion 33b, or both the first portion 33a and the second portion 33b of light with an optical detector 40; and detecting an optical power of the first portion 33a, the second portion 33b, or both the first portion 33a and the second portion 33b of light. The method 4000 further can comprise reflecting the second portion 33b of light along the second optical path 32.

In certain embodiments of the method 4000, the substantially periodic refractive index perturbation has a constant period along the length of the FBG 20. In certain other embodiments, the substantially periodic refractive index perturbation has a period which varies along the length of the FBG 20 such that the FBG 20 is a chirped grating. In some embodiments, the substantially periodic refractive index perturbation has an amplitude which varies along the length of the FBG 20 such that the FBG 20 is an apodized grating.

Figure 33C:
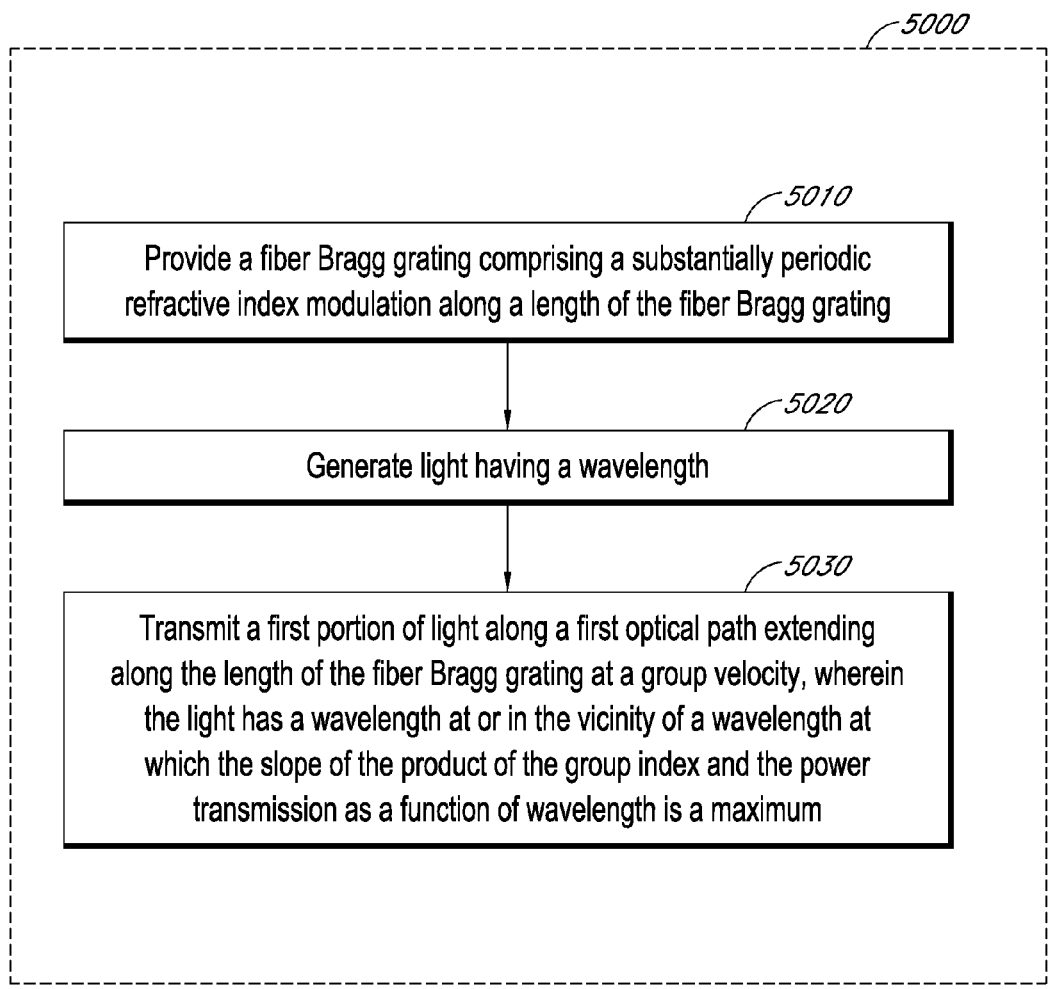

FIG. 33C is a flowchart of another embodiment of a method 5000 for using a fiber Bragg grating in accordance with certain embodiments described herein. The method 5000 can comprise providing an FBG 20 comprising a substantially periodic refractive index perturbation along a length of the FBG 20, as shown in operational block 5010. In certain embodiments of the method 5000, the method 5000 can comprise generating light having a wavelength, as shown in operational block 5020. The light can be generated from a narrowband optical source 30. In certain embodiments, the narrowband optical source 30 can be in optical communication with a first optical path 31 and a second optical path 32. The light can also split into a first portion 33a of light and a second portion 33b of light. The method 5000 further can comprise transmitting a first portion 33a of light along a first optical path 31 extending along and through the length of the FBG 20 at a group velocity in operational block 5030. In certain embodiments, the light has a wavelength at or in the vicinity of a wavelength at which the slope of a product of the group index and the power transmission as a function of wavelength is a maximum (e.g., a maximal value compared to the values of this quantity for any other wavelengths in the vicinity of an edge of the bandgap of the FBG 20).

Certain embodiments of the method 5000 further can comprise receiving the first portion 33a, the second portion 33b, or both the first portion 33a and the second portion 33b of light with an optical detector 40; and detecting an optical power of the first portion 33a, the second portion 33b, or both the first portion 33a and the second portion 33b of light. The method 5000 further can comprise reflecting the second portion 33b of light along the second optical path 32.

In certain embodiments of the method 5000, the substantially periodic refractive index perturbation has a constant period along the length of the FBG 20. In certain other embodiments, the substantially periodic refractive index perturbation has a period which varies along the length of the FBG 20 such that the FBG 20 is a chirped grating. In some embodiments, the substantially periodic refractive index perturbation has an amplitude which varies along the length of the FBG 20 such that the FBG 20 is an apodized grating.

EXAMPLES

FIG. 24 shows an example experimental setup used to measure the transmission and group index spectra of an FBG. This optimization using a figure of merit was reduced to practice by testing an FBG with a nominal $\Delta n$ of $1.035 \times 10^{-3}$, a length L=1.2 cm, an inferred loss coefficient of $1.16 \, m^{-1}$, and a Gaussian apodized index profile with a FWHM W=0.9 cm. The group delay and the group index were measured as described above in relation to FIG. 24 and Equations 8 and 9.

Figure 34A:
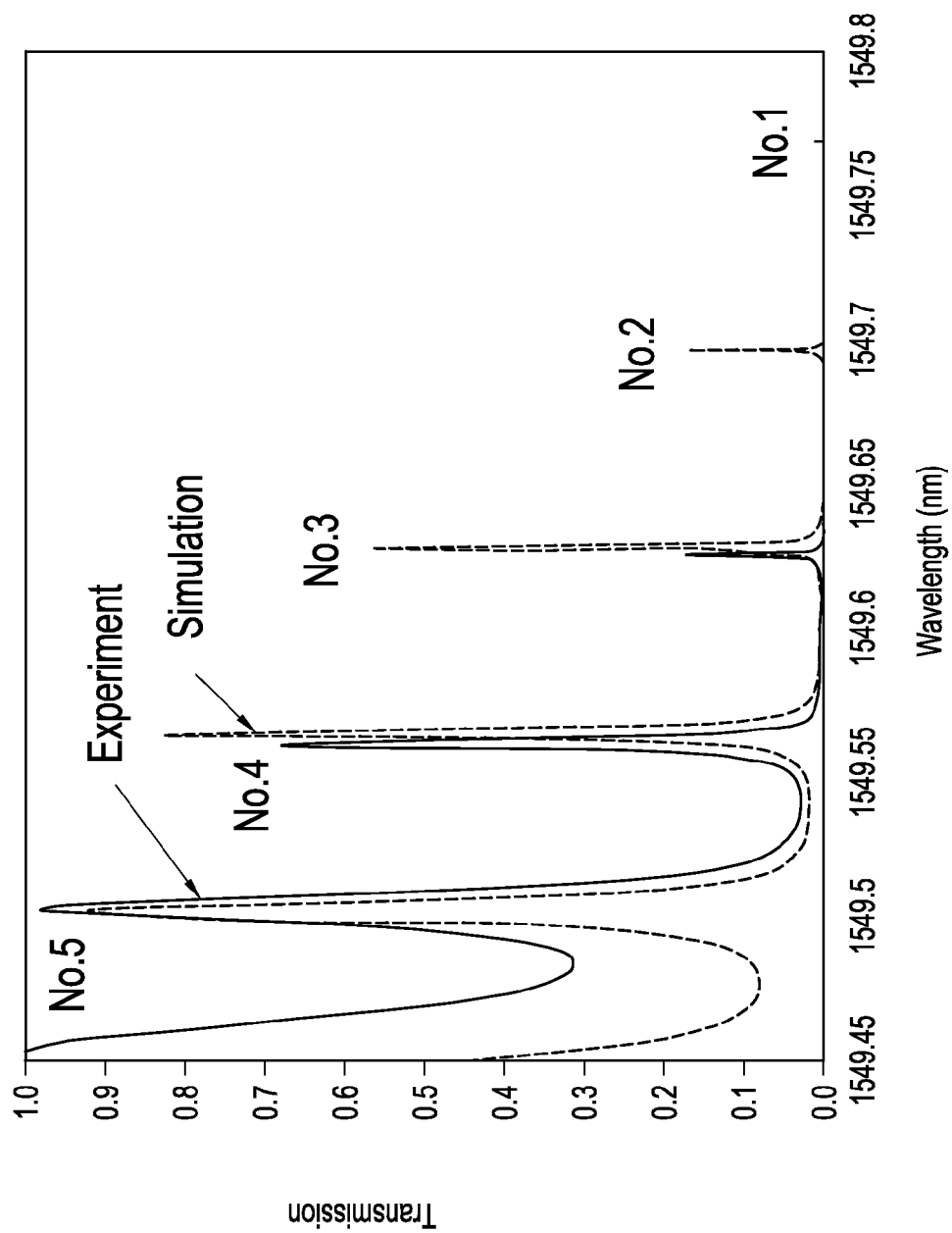
FIG. 34A shows a measured transmission spectrum for an example FBG.
Figure 34B:
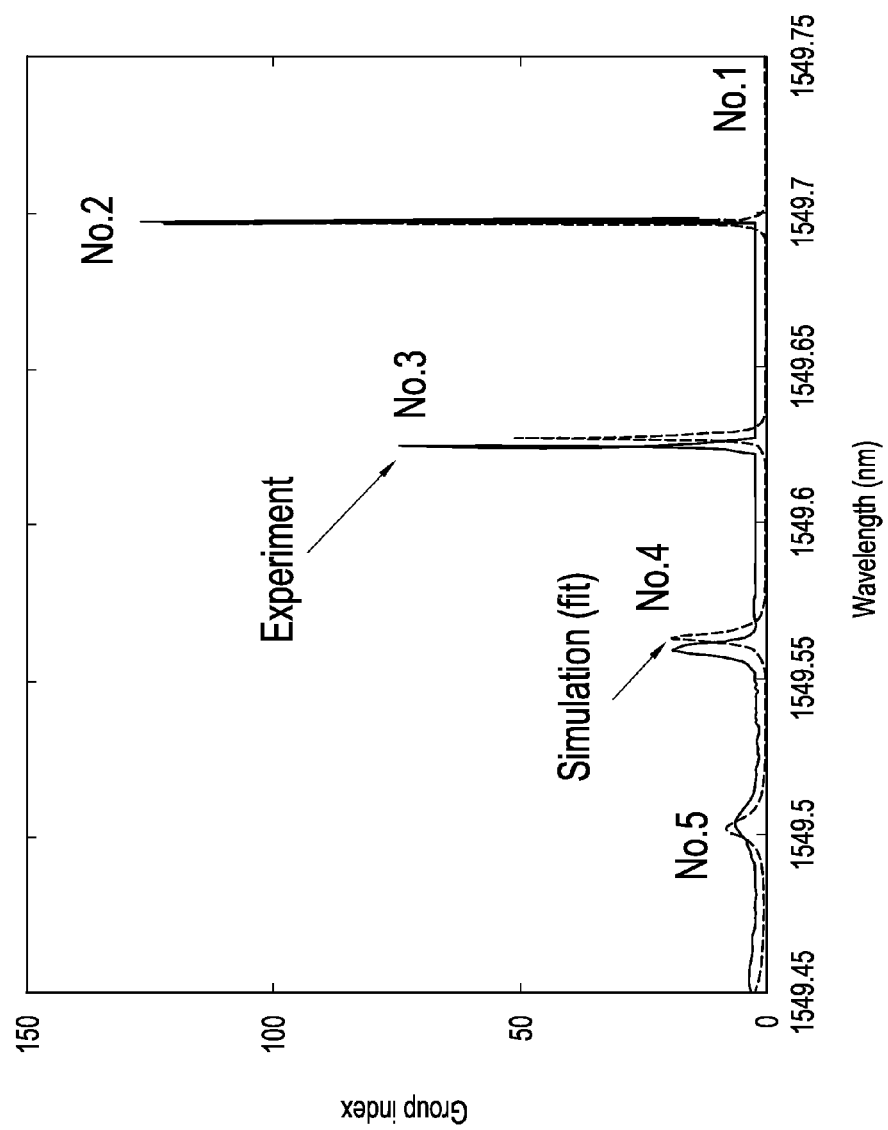
FIG. 34B shows a group index spectrum for the example FBG used in FIG. 36A.

FIG. 34A shows the measured transmission spectrum and FIG. 34B the measured group index spectrum of the signal transmitted by the FBG. The corresponding solid curves are theoretical predictions calculated with a model after adjusting $\Delta n$, W, and $\alpha$ to best fit them to the experimental spectra. The fitted values are $\Delta n = 1.035 \times 10^{-3}$, W=0.9 cm, and $\alpha = 1.16 \, m^{-1}$. The former agrees well with the manufacturer's estimated value. Both measured spectra exhibit multiple ripples that agree well with theory. The maximum measured group index occurs in the vicinity of the second transmission peak ($\lambda \approx 1549.6976$ nm) and is equal to 127. The transmission at this wavelength is 0.8%. To date, this is one of the slowest group velocity (2,362 km/s) reported in either an FBG or in an optical fiber. The peak closest to the band edge ($\lambda \approx 1.54974$ μm) should have an even higher group index (~217), but in this example, it could not be measured because the transmitted power at this peak was too small to detect.

Figure 35:
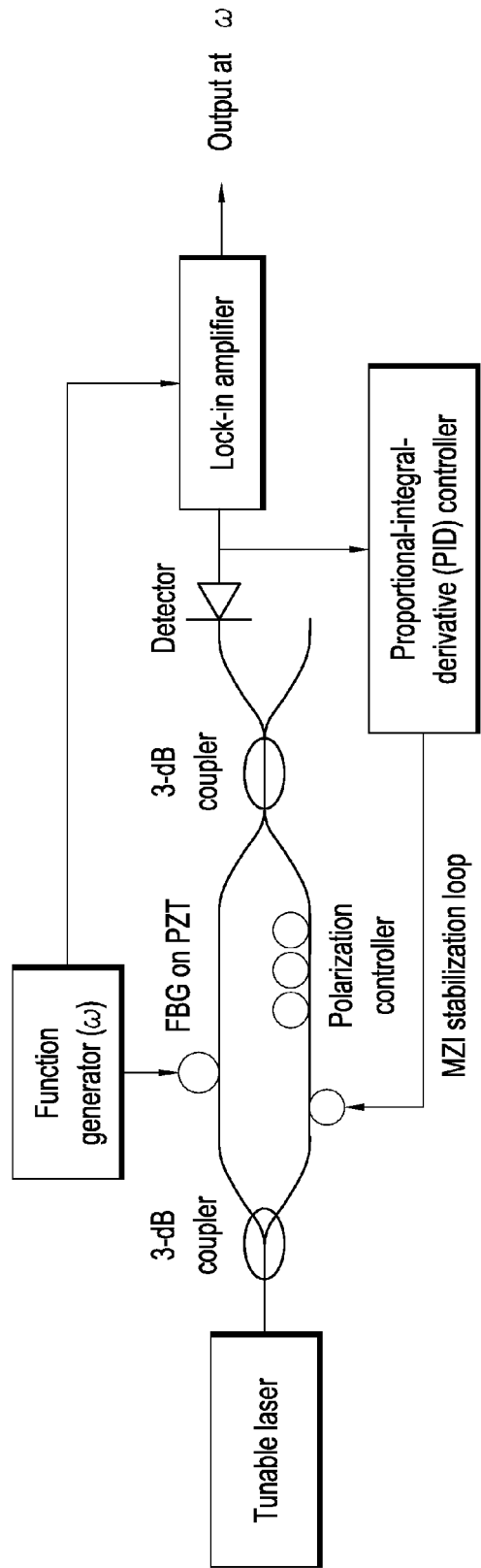
FIG. 35 shows an example experimental setup utilizing an FBG in a Mach-Zehnder interferometer to test its performance as a slow-light sensor.

To apply a controlled and calibrated strain to this FBG, it was mounted on a piezoelectric (PZT) ring, and an AC voltage was applied to the ring, which applied a sinusoidal stretch to the FBG. The PBF was then placed in an MZ interferometer, as shown in FIG. 35, to test its performance as a slow-light sensor. Care was applied to make sure that the two arms of the MZ interferometer had the same length to minimize conversion of laser phase noise into intensity noise by the MZ interferometer, which would have increased the minimum detectable strain. The arm length difference, inferred from independent interferometric measurements, was 1-3 mm. A function generator applied a voltage of known amplitude at frequency $\omega = 25$ kHz to the PZT. The output detector measured the output of the MZ interferometer. This output contains a slowly varying component induced by a slowly varying phase difference between the two arms due to temperature variations. This variable signal was sent to a proportional-integral-derivative (PID) controller. The latter applied just the right voltage to a second PZT placed in the lower arm to cancel out this slow drift. The purpose of this closed loop was to stabilize the interferometer, and to keep its phase bias (the phase difference between the two arms, in the absence of a modulation applied to the FBG/sensing arm) equal to $\pi/2$ for maximum sensitivity, as discussed earlier. Another portion of the detector output was sent to a lock-in amplifier, which extracted from it the component of the output that was modulated at $\omega$. This output component was the sensor signal. By varying the wavelength of the tunable laser, as in this example, one can measure the response of the sensor to the same perturbation (strain) amplitude and frequency applied to the FBG as a function of wavelength.

The PZT on which the FBG was attached had been previously calibrated using a common technique. A known length of fiber was wrapped around it. This fiber was placed inside an MZ interferometer, and the amount of phase shift occurring in this fiber was measured with this interferometer as a function of the voltage applied to the PZT.

Figure 36:
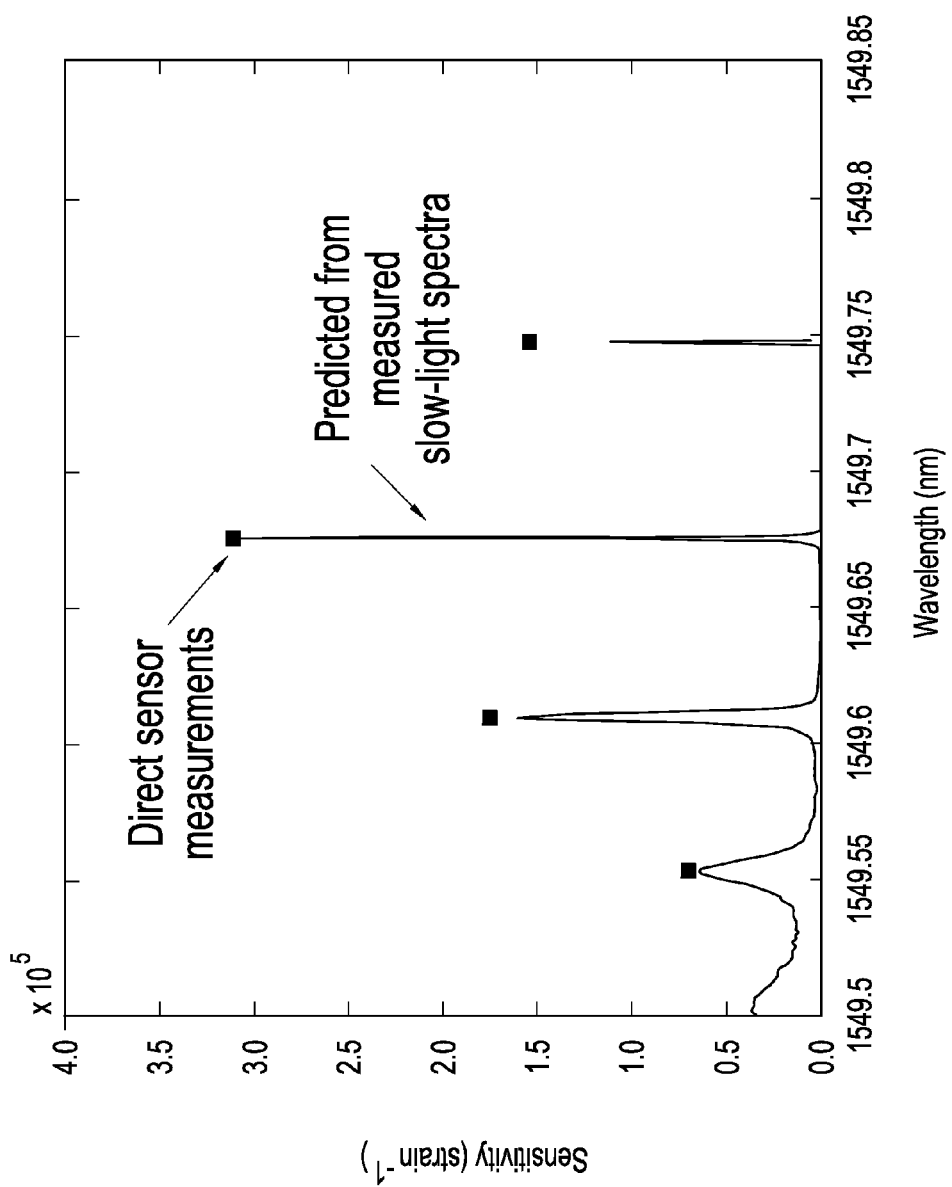
FIG. 36 shows the sensitivity measured at the four slow light peaks measured in the example experimental setup of FIG. 35.

Based on the foregoing, the sensitivity of the example sensor of FIG. 35 has a spectrum that is proportional to $F_r(\lambda) = n_g(\lambda)\sqrt{T_1(\lambda)}$, where $n_g(\lambda)$ is the measured group index spectrum (e.g., FIG. 34B) and $T_1(\lambda)$ is the transmission spectrum (e.g., FIG. 34A) of the FBG. The spectrum $F_r(\lambda)$ calculated from these two measured spectra can be plotted, e.g., as shown in FIG. 36. As demonstrated earlier in relation to FIG. 32, the sensitivity can be expected to be maximum in the vicinity of the peak j=3 (the first peak, j=1, is not shown because as pointed out earlier it was too weak to be measured). The sensitivity of the sensor to a strain can be defined as $$S = \frac{1}{P_0} \frac{dP_{out}}{d\varepsilon} \quad (16)$$

where $dP_{out}$ is the change in power at the output of the MZ interferometer resulting from a change in strain $d\varepsilon$. S is in units of reciprocal strain. Using Equation 15, it can be seen that the sensitivity is proportional to $$S \propto 2\eta(1-\eta)\sqrt{T_1 T_2} \frac{2\pi}{\lambda} n_g \quad (17)$$

where $T_2$ is the power transmission of the reference arm. The proportionality factor not shown in Equation 17 depends on the signal processing used to extract the $\omega$ component of the signal from the output signal using well-known art.

The result of the strain-sensing experiment utilizing the setup of FIG. 35 is also plotted in FIG. 36 in the form of the sensitivity measured at the four observed slow light peaks. The measured sensitivities agree reasonably well with the values shown by the spectrum, which again was predicted from the measured group index and transmission spectra of the grating. Thus, in certain embodiments, the sensitivity of the slow-light sensor in accordance with certain embodiments in the transmission mode scales like the figure of merit $F_r(\lambda) = n_g(\lambda)\sqrt{T_1(\lambda)}$, as predicted by theory. In addition, slow light can play a prominent role in increasing the sensitivity of the sensor to a strain in certain embodiments. The maximum measured value shown in FIG. 36, approximately $3.14 \times 10^5$ strain$^{-1}$, is quite possibly the largest ever reported for a strain sensor.

The minimum strain that can be measured with the sensor of FIG. 35 in accordance with certain embodiments can be calculated from the sensitivity. At the power used in our measurements (a mean detected power of $P_0 = 36$ μW), the total noise in the output of the sensor (measured in the absence of strain applied to it) ranged from about $1.0$ μV/√Hz at 3 kHz to about $0.45$ μV/√Hz at 30 kHz, or, after calibration, a noise power in the range of $P_{noise} \approx 25$ pW to ~11 pW. At this output power level, this noise was composed of laser relative intensity noise (RIN) and photodetector noise at higher frequencies, as well as dominant lock-in amplifier noise at lower frequencies. Laser phase noise was a negligible component because the MZ interferometer, as mentioned earlier, was very nearly balanced, and phase noise was consequently not converted into significant intensity noise. The minimum detectable strain is the strain that produces a variation in output power $P_{out}$ just equal to the noise. From the definition of the sensitivity (Equation 18), the minimum detectable strain (MDS) can be written as:

$$\varepsilon_{min} = \frac{1}{S} \frac{P_{noise}}{P_0} \quad (18)$$

From the measured noise power (25 pW), input power (36 μW), and the maximum sensitivity of $3.14 \times 10^5$ strain$^{-1}$ measured at the most sensitive peak (j=3, see, FIG. 36), the MDS is ~2.2 picostrain (p∈) at 3 kHz and ~1 picostrain at 30 kHz. In comparison, an MDS of 5 p∈ at frequencies larger than 100 kHz was reported in a π-shifted FBG operated in reflection (D. Gatti, G. Galzerano, D. Janner, S. Longhi, and P. Laporta, "Fiber strain sensor based on a π-phase-shifted Bragg grating and the Pound-Drever-Hall technique," *Optics Express*, Vol. 16, No. 3, 1945-50 (Feb. 4, 2008)). Both of these devices were passive. These two references are likely the lowest minimum detectable strain ever reported prior to the present application for a passive sensor based on an FBG. The Gatti et al. reference does not mention "slow light" at all, and it is mere speculation whether it utilized slow light. In K. P. Koo and A. D. Kersey, "Bragg grating-based laser sensors systems with interferometric interrogation and wavelength division multiplexing," *J. Lightwave Technol.*, Vol. 13, No. 7, 1243-49 (July 1995), an MDS of 56 femtostrain (or 0.056 p∈) was reported in a fiber laser using an FBG as reflectors. That sensor was an active device that required pump power (~70 mW) and a strongly imbalanced MZ interferometer (~100 m of arm length difference), which meant that the MZ interferometer used in the readout was very difficult to stabilize against external temperature variations. In contrast, the device in accordance with certain embodiments described herein used considerably less power (only 36 μW), and its MZ interferometer is nominally balanced, which implies that it is much more thermally stable.

Figure 37:
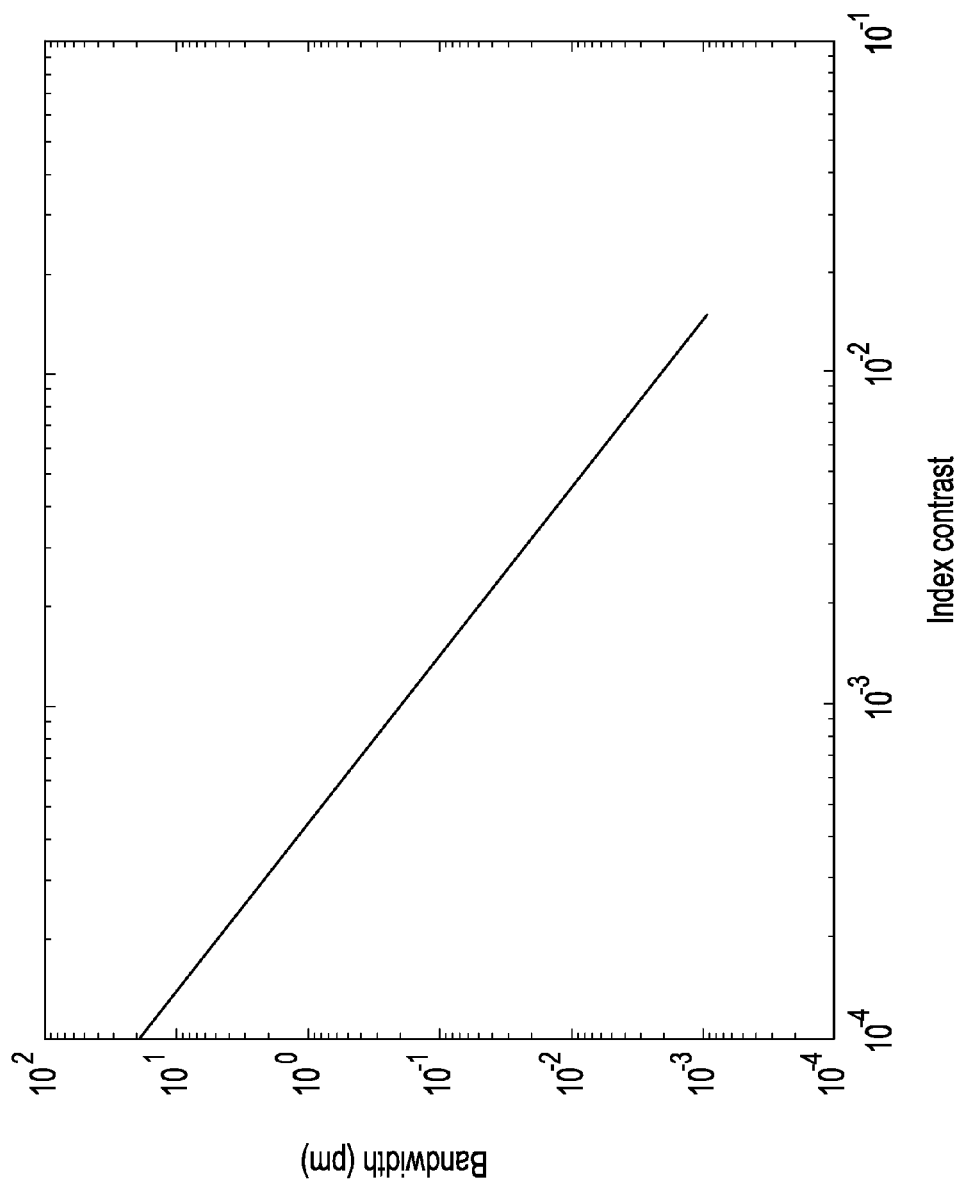
FIG. 37 shows the FWHM bandwidth as a function of the index contrast in an example uniform grating with a length L=2 cm and no loss.

FIG. 37 shows the full width at half maximum bandwidth of the first slow-light peak predicted from the model, as a function of the index contrast, in a uniform grating with a length L=2 cm and substantially no loss. This diagram shows that the bandwidth ranges in this example from about 20 pm for a weak grating (index contrast of $10^{-4}$) to about 1 fm for a strong grating (index contrast of $1.5 \times 10^{-2}$). At 1.55 μm, the Bragg wavelength of this FBG example, for certain embodiments, the linewidth of the laser used to probe the sensor should be lower than this bandwidth value, and of the order of 1 fm (or lower) to 10 pm (or greater), depending on the index contrast of the grating. Such lasers are readily available from a large number of manufacturers, such as Redfern Integrated Optics Inc. (RIO) and Agilent Technologies, both headquartered in Santa Clara, Calif. This bandwidth depends on a large number of parameters, and it can advantageously be either calculated or measured experimentally in order to determine the linewidth of the laser to be used in certain embodiments of the sensor. FIG. 37 is shown as an illustration of the process that could be used to determine this linewidth.

Figure 38:
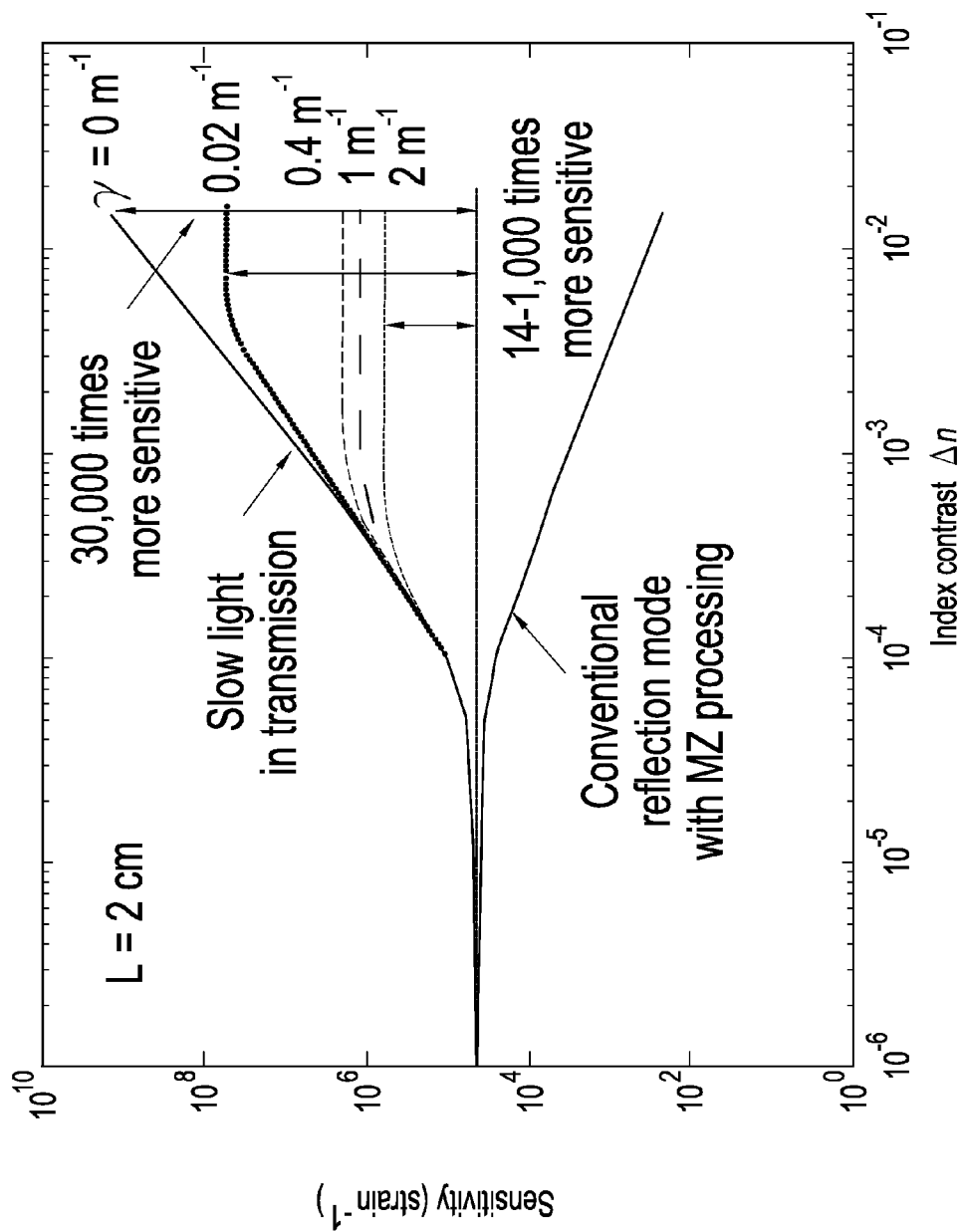
FIG. 38 illustrates the relationship between sensitivity to strain as a function of index contrast for an FBG with a length L=2 cm and no loss utilized in the slow-light transmission mode (upper solid line), in accordance with certain embodiments described herein, with loss utilized in the slow-light transmission mode (various dotted and dashed lines), in accordance with certain embodiments described herein, and the conventional reflection mode with Mach-Zehnder (MZ) processing (lower solid line).

FIG. 38 illustrates the relationship between sensitivity to strain as a function of index contrast for an FBG with a length L=2 cm and no loss utilized in the slow-light transmission mode (upper solid line), in accordance with certain embodiments described herein, and the conventional reflection mode (lower solid line) with MZ processing. As shown in FIG. 38, for the conventional FBG sensor, as the index contrast increases, the reflection peak broadens and the resolution worsens. On the other hand, in both slow-light sensors, sensitivity can increase, e.g., to 30,000 times more sensitive, as the index contrast (and group index) increases. Enhancement can be several orders of magnitude for even modest L, e.g., centimeters, and modest index contrast (e.g., $10^{-3}$). FIG. 38 illustrates a different numerical example than does FIG. 11B, and models strain sensitivity, as opposed to the temperature sensitivity of FIG. 11B.

FIG. 38 also illustrates the relationship between sensitivity to strain as a function of index contrast for an FBG with a length L=2 cm and with loss utilized in the slow-light transmission mode (dotted and dashed lines), in accordance with certain embodiments described herein. As shown in FIG. 38, even with loss, e.g., loss in the range of 0.02 m$^{-1}$ to 2 m$^{-1}$, certain embodiments of sensors described herein can expect sensitivity improvements of 14-1000.

Certain embodiments have demonstrated that very slow light can be supported in FBGs. Group index can increase dramatically with length of the FBG, e.g., $L^{2.9}$, and index contrast, e.g., $\Delta n^{1.8}$. Certain apodized FBGs can provide slower light. In addition, values of 10,000 and more have been predicted in low-loss FBGs. As described herein, the largest group index, e.g., 127 in a 1.2 cm FBG, reported in an optical fiber, e.g., compare to approximately 5 in silica fiber and approximately 10 in a Bragg fiber, has been shown. This value of group index corresponds to a group velocity as low as 2,360 km/s. Thus, certain embodiments of FBG sensors described herein utilizing slow light have enhanced sensitivity with a low minimum detectable strain, e.g., about 1 p∈ in a passive FBG sensor.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined herein.

What is claimed is:

1. An optical device comprising:
    a fiber Bragg grating comprising a substantially periodic refractive index modulation along a length of the fiber Bragg grating, wherein the fiber Bragg grating has a power transmission spectrum as a function of wavelength comprising a plurality of local transmission maxima, the local transmission maxima each having a maximum power at a transmission peak wavelength, the fiber Bragg grating having a group index spectrum as a function of wavelength; and
    a narrowband optical source in optical communication with a first optical path and a second optical path, the narrowband optical source configured to generate light, the device configured to split the light into a first portion and a second portion, the first portion transmitted along the first optical path extending along and through the length of the fiber Bragg grating at a group velocity,
    wherein the light has a wavelength at or in the vicinity of a wavelength at which one or more of the following quantities is at a maximum value: (a) the product of the group index spectrum and a square root of the power transmission spectrum, (b) the slope of a product of the group index spectrum and one minus the power transmission spectrum, and (c) the slope of a product of the group index spectrum and the power transmission spectrum.

2. The optical device of claim 1, further comprising at least one optical detector configured to receive and to detect an optical power of the first portion, the second portion, or both the first and second portions.

3. The optical device of claim 2, wherein the second portion is transmitted along the second optical path, the second optical path not extending along and through the fiber Bragg grating.

4. The optical device of claim 3, further comprising:
a first fiber coupler in optical communication with the narrowband optical source, the first optical path, and the second optical path; and
a second fiber coupler in optical communication with the at least one optical detector, the first optical path, and the second optical path, wherein the at least one optical detector is configured to detect a change in power resulting from a change in a phase difference between the first portion and the second portion.

5. The optical device of claim 4, wherein the phase difference is indicative of an amount of strain applied to the fiber Bragg grating.

6. The optical device of claim 4, wherein the phase difference is indicative of a temperature of the fiber Bragg grating.

7. The optical device of claim 4, wherein the first fiber coupler, second fiber coupler, first optical path, and second optical path form a nominally balanced Mach-Zehnder interferometer.

8. The optical device of claim 2, wherein the detected optical power is indicative of an amount of strain applied to the fiber Bragg grating.

9. The optical device of claim 2, wherein the detected optical power is indicative of a temperature of the fiber Bragg grating.

10. The optical device of claim 2, wherein the second portion is reflected from the fiber Bragg grating.

11. The optical device of claim 10, wherein the detected optical power is indicative of an amount of strain applied to the fiber Bragg grating.

12. The optical device of claim 10, wherein the detected optical power is indicative of a temperature of the fiber Bragg grating.

13. The optical device of claim 1, wherein the substantially periodic refractive index modulation has a constant period along the length of the fiber Bragg grating.

14. A method of using a fiber Bragg grating comprising:
providing a fiber Bragg grating comprising a substantially periodic refractive index modulation along a length of the fiber Bragg grating, wherein the fiber Bragg grating has a power transmission spectrum as a function of wavelength comprising a plurality of local transmission maxima, the local transmission maxima each having a maximum power at a transmission peak wavelength, the fiber Bragg grating having a group index spectrum as a function of wavelength;
generating light from a narrowband optical source, the narrowband optical source in optical communication with a first optical path and a second optical path, wherein the light is split into a first portion and a second portion; and
transmitting the first portion of light along the first optical path extending along and through the length of the fiber Bragg grating at a group velocity,
wherein the light has a wavelength at or in the vicinity of a wavelength at which one or more of the following quantities is at a maximum value: (a) the product of the group index spectrum and a square root of the power transmission spectrum, (b) the slope of a product of the group index spectrum and one minus the power transmission spectrum, and (c) the slope of a product of the group index spectrum and the power transmission spectrum.

15. The method of claim 14, further comprising:
receiving the first portion, the second portion, or both the first and second portions with at least one optical detector; and
detecting an optical power of the first portion, the second portion, or both the first and second portions.

16. The method of claim 15, further comprising transmitting the second portion along the second optical path, the second optical path not extending along and through the fiber Bragg grating.

17. The method of claim 16, further comprising:
providing a first fiber coupler in optical communication with the narrowband optical source, the first optical path, and the second optical path; and
providing a second fiber coupler in optical communication with the optical detector, the first optical path, and the second optical path,
wherein detecting comprises detecting a phase difference between the first portion and the second portion.

18. The method of claim 17, wherein the phase difference is indicative of an amount of strain applied to the fiber Bragg grating.

19. The method of claim 17, wherein the phase difference is indicative of a temperature of the fiber Bragg grating.

20. The method of claim 17, wherein the first fiber coupler, second fiber coupler, first optical path, and second optical path form a nominally balanced Mach-Zehnder interferometer.

21. The optical device of claim 15, wherein the detected optical power is indicative of an amount of strain applied to the fiber Bragg grating.

22. The optical device of claim 15, wherein the detected optical power is indicative of a temperature of the fiber Bragg grating.

23. The method of claim 15, further comprising reflecting the second portion from the fiber Bragg grating.

24. The method of claim 23, wherein the detected optical power is indicative of an amount of strain applied to the fiber Bragg grating.

25. The method of claim 23, wherein the detected optical power is indicative of a temperature of the fiber Bragg grating.

26. The method of claim 14, wherein the substantially periodic refractive index modulation has a constant period along the length of the fiber Bragg grating.

27. The method of claim 14, wherein the substantially periodic refractive index modulation has a period that varies along the length of the fiber Bragg grating such that the fiber Bragg grating is a chirped grating.

28. The method of claim 17, wherein the substantially periodic refractive index modulation has an amplitude which varies along the length of the fiber Bragg grating such that the fiber Bragg grating is an apodized grating.

* * * * *

UNITED STATES PATENT AND TRADEMARK OFFICE
CERTIFICATE OF CORRECTION

PATENT NO. : 8,797,540 B2  
APPLICATION NO. : 13/224985  
DATED : August 5, 2014  
INVENTOR(S) : Michel J. F. Digonnet et al.

Page 1 of 1

It is certified that error appears in the above-identified patent and that said Letters Patent is hereby corrected as shown below:

In the Specification

In column 17 at line 60, Change "reaches short" to --reaches--.

In column 18 at line 5, Change "$\lambda a, \lambda b, \lambda d,$" to --$\lambda a, \lambda b, \lambda c, \lambda d,$--.

In column 26 at line 39, Change "though" to --through--.

In the Claims

In column 48 (Claim 21) at line 37 (approx.), Change "The optical device of claim 15" to --The method of claim 15--.

In column 48 (Claim 22) at line 40 (approx.), Change "The opticl device of claim 15" to --The method of claim 15--.

Signed and Sealed this  
Twenty-fourth Day of March, 2015

Michelle K. Lee  
*Director of the United States Patent and Trademark Office*